(12) United States Patent
Ukita et al.

(10) Patent No.: US 7,872,992 B2
(45) Date of Patent: Jan. 18, 2011

(54) NETWORK SYSTEM AND RELAY DEVICE

(75) Inventors: Yosuke Ukita, Osaka (JP); Hironori Nakae, Osaka (JP); Hiroshi Hayashino, Hyogo (JP); Yoshitaka Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 200 days.

(21) Appl. No.: 12/093,898

(22) PCT Filed: Dec. 8, 2006

(86) PCT No.: PCT/JP2006/324577

§ 371 (c)(1),
(2), (4) Date: May 15, 2008

(87) PCT Pub. No.: WO2007/066766

PCT Pub. Date: Jun. 14, 2007

(65) Prior Publication Data

US 2009/0238196 A1  Sep. 24, 2009

(30) Foreign Application Priority Data

Dec. 9, 2005 (JP) .............................. 2005-355827
Apr. 14, 2006 (JP) .............................. 2006-111758

(51) Int. Cl.
*H04L 12/28* (2006.01)
*H04L 12/56* (2006.01)
*G06F 15/173* (2006.01)

(52) U.S. Cl. .................. 370/256; 370/395.41; 370/408; 709/226

(58) Field of Classification Search .................. 370/408
See application file for complete search history.

(56) References Cited

U.S. PATENT DOCUMENTS

| 6,178,448 | B1 * | 1/2001 | Gray et al. ................... 709/224 |
| 6,278,712 | B1 * | 8/2001 | Takihiro et al. ............. 370/400 |
| 6,370,121 | B1 * | 4/2002 | Hausman ..................... 370/256 |
| 7,027,406 | B1 * | 4/2006 | Shabtay et al. .............. 370/252 |
| 2004/0179524 | A1 * | 9/2004 | Sasagawa et al. ........... 370/389 |

FOREIGN PATENT DOCUMENTS

| JP | 10-336226 | 12/1998 |
| JP | 11-355337 | 12/1999 |
| JP | 2005-102012 | 4/2005 |
| JP | 2005-167539 | 6/2005 |

OTHER PUBLICATIONS

International Search Report issued Jan. 30, 2007 in the International (PCT) Application of which the present application is the U.S. National Stage.

* cited by examiner

*Primary Examiner*—Daniel J Ryman
*Assistant Examiner*—Cassandra Decker
(74) *Attorney, Agent, or Firm*—Wenderoth, Lind & Ponack, L.L.P.

(57) ABSTRACT

When a network system of the present invention performs a bandwidth-guaranteed communication, a terminal device collects information on one or more relay devices on a path to another terminal device via a bandwidth request packet transmitted to the another terminal. When the bandwidth cannot be allocated, a detour path is searched according to the collected relay device information so as to perform the bandwidth-guaranteed communication via the detour path.

9 Claims, 36 Drawing Sheets

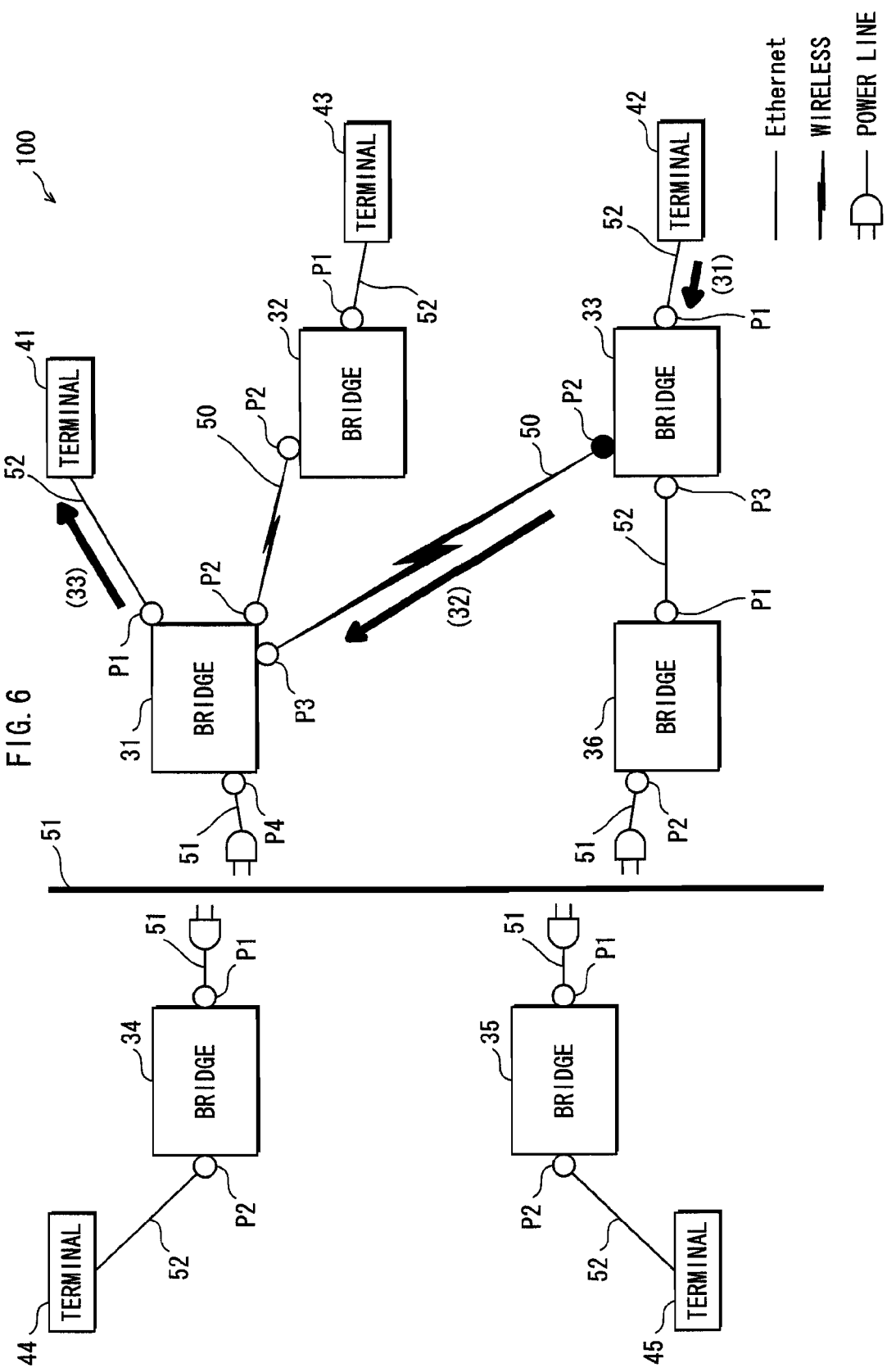

FIG. 7A

| RELAY DEVICE ADDRESS |
|---|
| BRIDGE31MAC |

FIG. 7B

| FINAL DESTINATION ADDRESS | PORT NUMBER | ADJACENT RELAY DEVICE ADDRESS |
|---|---|---|
| TERMINAL41MAC | P1 | TERMINAL41MAC |
| TERMINAL42MAC | P4 | BRIDGE36MAC |
| TERMINAL43MAC | P2 | BRIDGE32MAC |
| TERMINAL44MAC | P4 | BRIDGE34MAC |
| TERMINAL45MAC | P4 | BRIDGE35MAC |

FIG. 7C

| PORT NUMBER | PORT TYPE (F)/(B) | ADJACENT RELAY DEVICE ADDRESS |
|---|---|---|
| P1 | F | TERMINAL41MAC |
| P2 | F | BRIDGE32MAC |
| P3 | F | BRIDGE33MAC |
| P4 | F | BRIDGE36MAC |
|  |  | BRIDGE34MAC |
|  |  | BRIDGE35MAC |

FIG. 7D

| SOURCE ADDRESS | RECEIVING PORT NUMBER | DESTINATION ADDRESS | TRANSMITTING PORT NUMBER | BANDWIDTH REQUEST ID (NORMAL/DETOUR) | DATA CATEGORY | GUARANTEED BANDWIDTH (bps) |
|---|---|---|---|---|---|---|
| TERMINAL41MAC | P1 | BRIDGE36MAC | P4 | NORMAL001 | AP001 | 10000 |
| TERMINAL41MAC | P1 | BRIDGE33MAC | P3 | DETOUR001 | AP001 | 10000 |

FIG. 8A

| | 2510 |
|---|---|
| RELAY DEVICE ADDRESS | |
| BRIDGE36MAC | |

| FINAL DESTINATION ADDRESS (2521) | PORT NUMBER (2522) | ADJACENT RELAY DEVICE ADDRESS (2523) |
|---|---|---|
| TERMINAL41MAC | P2 | BRIDGE31MAC |
| TERMINAL42MAC | P1 | BRIDGE33MAC |
| TERMINAL43MAC | P2 | BRIDGE31MAC |
| TERMINAL44MAC | P2 | BRIDGE34MAC |
| TERMINAL45MAC | P2 | BRIDGE35MAC |

| PORT NUMBER (2531) | PORT TYPE (F)/(B) (2532) | ADJACENT RELAY DEVICE ADDRESS (2533) |
|---|---|---|
| P1 | F | BRIDGE33MAC |
| P2 | F | BRIDGE31MAC<br>BRIDGE34MAC<br>BRIDGE35MAC |

| SOURCE ADDRESS (2541) | RECEIVING PORT NUMBER (2542) | DESTINATION ADDRESS (2543) | TRANSMITTING PORT NUMBER (2544) | BANDWIDTH REQUEST ID (NORMAL/DETOUR) (2545) | DATA CATEGORY (2546) | GUARANTEED BANDWIDTH (bps) (2547) |
|---|---|---|---|---|---|---|
| BRIDGE31MAC | P2 | BRIDGE33MAC | P1 | NORMAL001 | AP001 | 10000 |
| | | | | | | |

FIG. 9A

| RELAY DEVICE ADDRESS |
|---|
| BRIDGE33MAC |

| FINAL DESTINATION ADDRESS | PORT NUMBER | ADJACENT RELAY DEVICE ADDRESS |
|---|---|---|
| TERMINAL41MAC | P3 | BRIDGE36MAC |
| TERMINAL42MAC | P1 | TERMINAL42MAC |
| TERMINAL43MAC | P3 | BRIDGE36MAC |
| TERMINAL44MAC | P3 | BRIDGE36MAC |
| TERMINAL45MAC | P3 | BRIDGE36MAC |

| PORT NUMBER | PORT TYPE (F)/(B) | ADJACENT RELAY DEVICE ADDRESS |
|---|---|---|
| P1 | F | TERMINAL42MAC |
| P2 | B | BRIDGE31MAC |
| P3 | F | BRIDGE36MAC |

| SOURCE ADDRESS | RECEIVING PORT NUMBER | DESTINATION ADDRESS | TRANSMITTING PORT NUMBER | BANDWIDTH REQUEST ID (NORMAL/DETOUR) | DATA CATEGORY | GUARANTEED BANDWIDTH (bps) |
|---|---|---|---|---|---|---|
| BRIDGE36MAC | P3 | TERMINAL42MAC | P1 | NORMAL001 | AP001 | 10000 |
| BRIDGE31MAC | P2 | TERMINAL42MAC | P1 | DETOUR001 | AP001 | 10000 |

| RELAY DEVICE ADDRESS | PORT NUMBER | PORT TYPE (F)/(B) | ADJACENT RELAY DEVICE ADDRESS |
|---|---|---|---|
| BRIDGE31MAC | P2 | F | BRIDGE32MAC |
|  | P3 | F | BRIDGE33MAC |
|  | P4 | F | BRIDGE34MAC |
|  | P4 | F | BRIDGE35MAC |
| BRIDGE33MAC | P2 | B | BRIDGE31MAC |

FIG. 31A
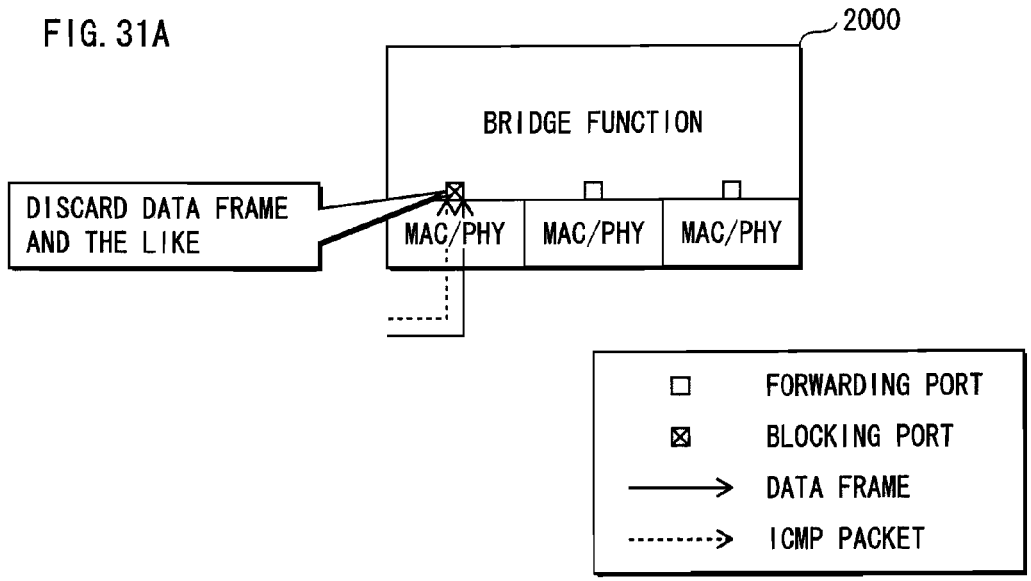
FIG. 31B
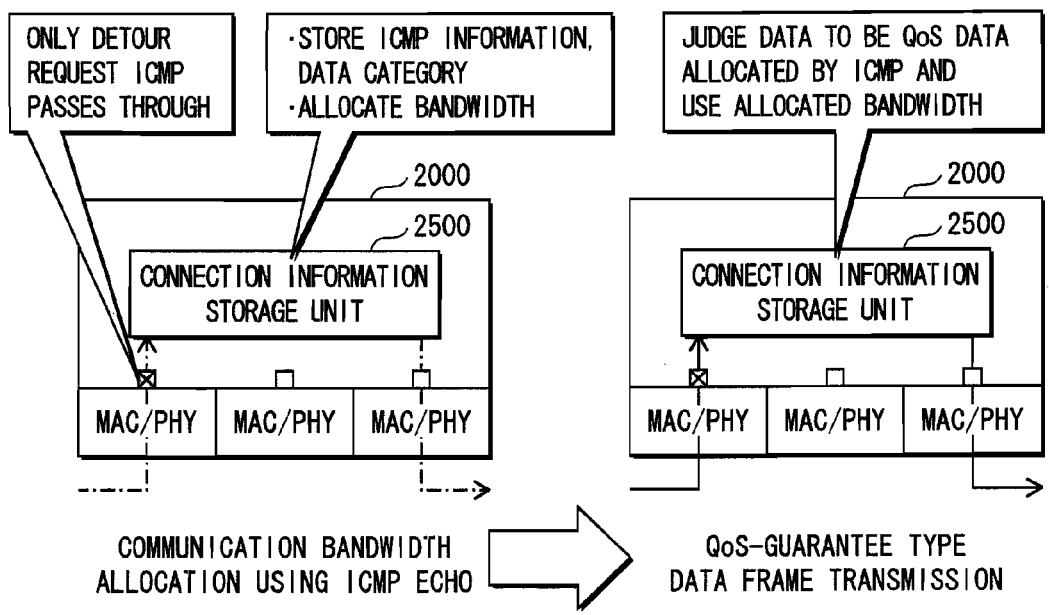
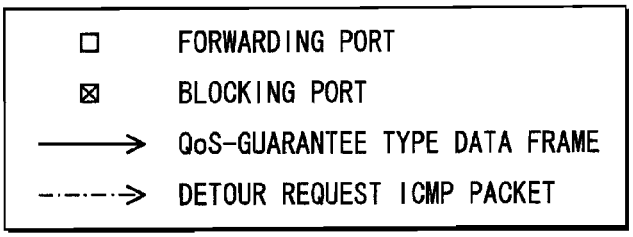

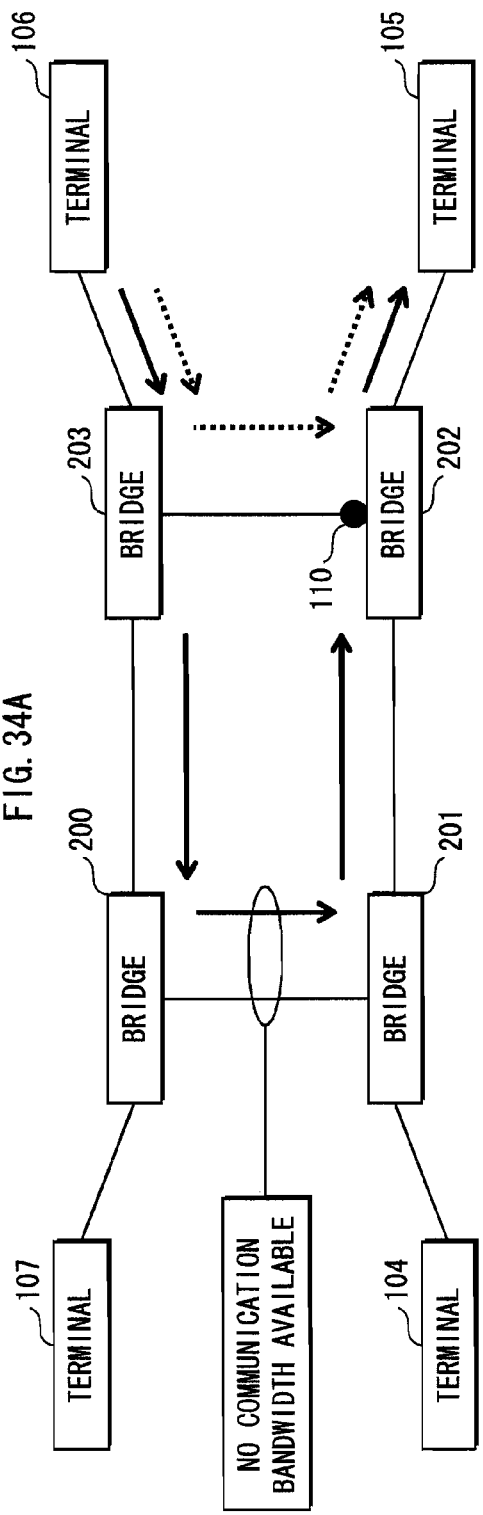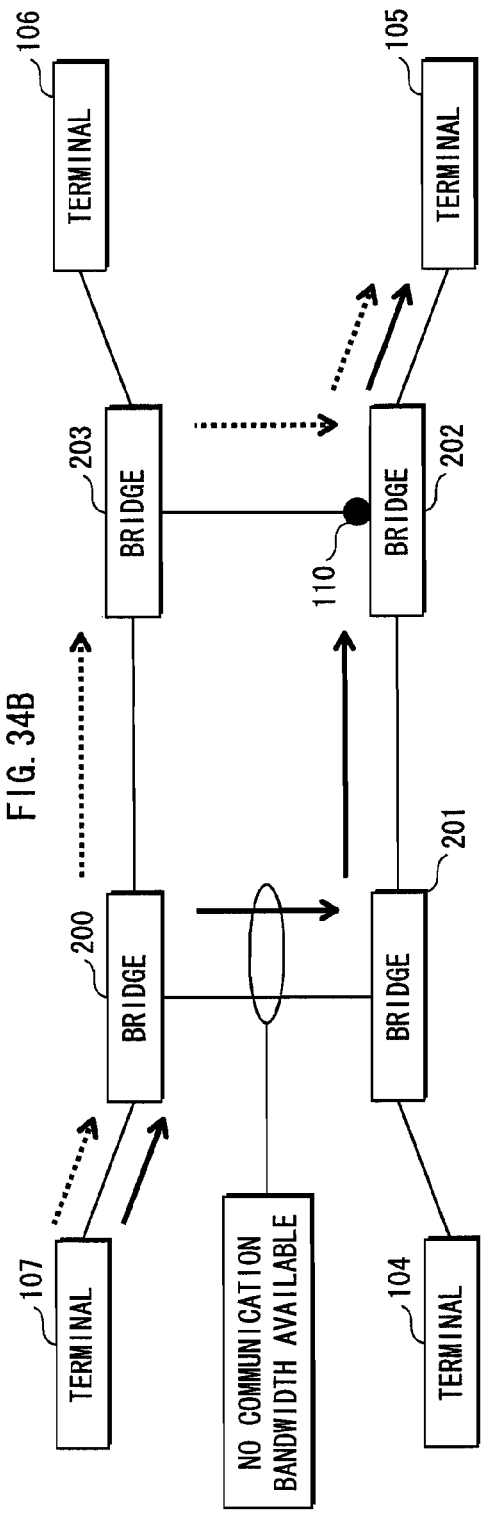

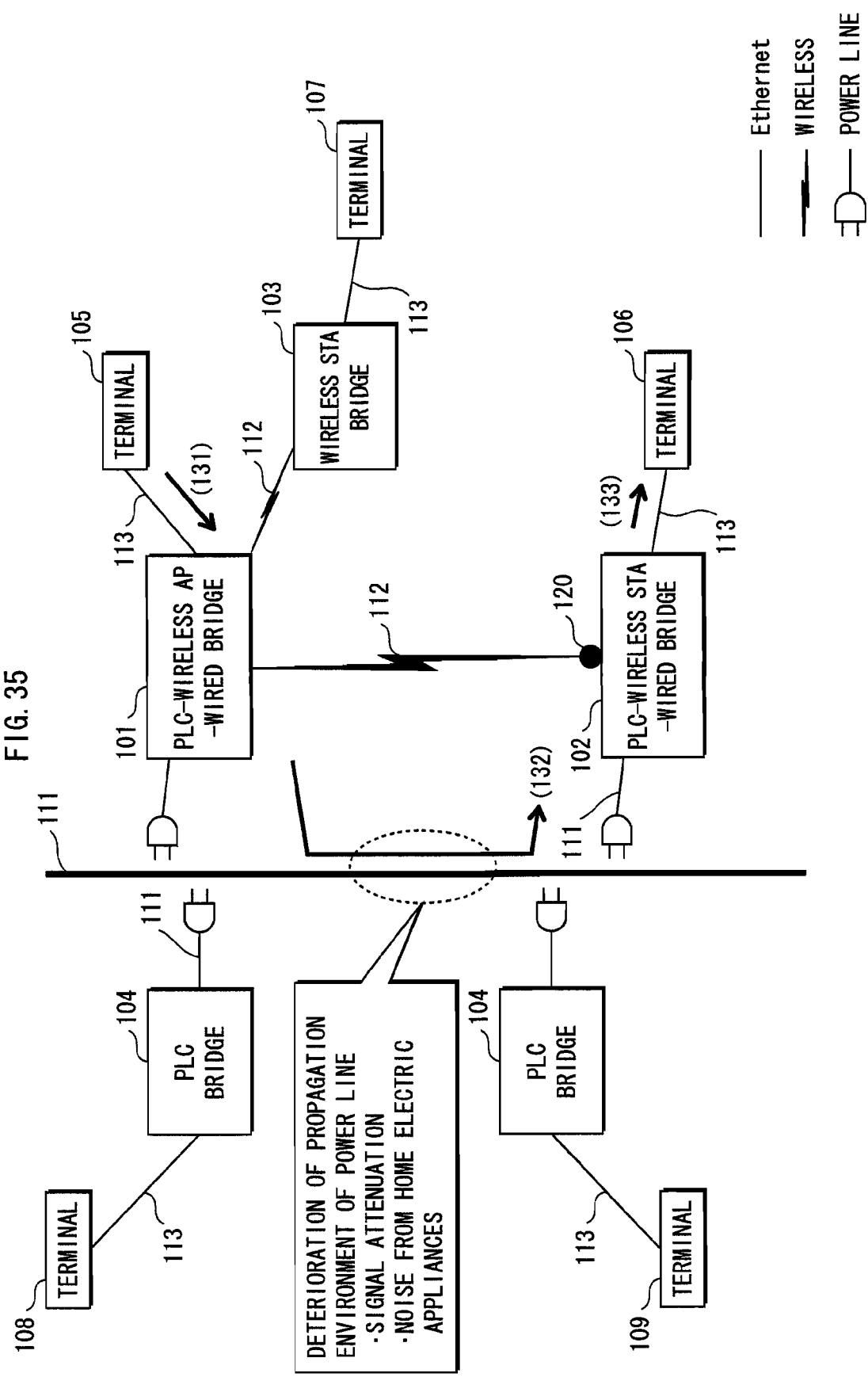

NETWORK SYSTEM AND RELAY DEVICE

TECHNICAL FIELD

The present invention relates to a network system using a spanning tree protocol, in particular to a path switching technology for data that requires a predetermined bandwidth.

BACKGROUND ART

One conventional method to avoid bridging loops is a spanning tree protocol (hereinafter, referred to as "STP")

In common networks, bridging loops occur when redundancy is provided in consideration of device failures and the like. In view of this, with use of STP, the network system places one bridge port which is on the path with a loop connection into a blocking state, that is to say, logically cuts off a physically-connected path. This forms a tree-structured network topology in a logical sense, avoiding bridging loops as a result. Accordingly, there is only one logical path from a bridge to another bridge.

In addition, when a path in the network is cut off due to a failure or the like, the network system reconfigures the tree, that is, establishes a logical path by re-placing each bridge port into either a forwarding state or the blocking state.

In other words, use of STP enables a realization of networks which are free from bridging loops and ensure redundancy by means of path reconfiguration.

Also, in recent years, a bandwidth-guarantee type communication is emerging in the field of the network. This aims to provide, by guaranteeing a particular communication bandwidth, network environments suitable for multimedia data communication and the like which can perform continuous video transmission without interruptions.

However, when the bandwidth-guarantee type communication is to be performed, there is no guarantee for a required bandwidth to be allocated when necessary, as bandwidth resources of a transmission channel which interconnect bridges are shared by all the terminals.

Hence, for networks using STP, technologies have been developed to transmit data using a path other than the logical path established by STP, and are considered applicable to the bandwidth-guaranteed communication.

The first conventional technology aims to avoid delayed arrivals of packets by decreasing a load around the root bridge and the number of bridges for the packets to pass. A bridge that has a port thereof in a blocking state (hereinafter, referred to as "blocking port") establishes a bypass path by referring to the routing information of the bridge to which the blocking port is connected (see Patent Document 1).

If a bandwidth can be allocated by using this bypass path, a bandwidth-allocated communication can be carried out by using the bypass path.

The second conventional technology aims to reestablish a bandwidth-allocated communication immediately after the network topology changes due to a path breakage or the like while the bandwidth-allocated communication is in progress. Specifically, this system allocates a bandwidth for paths including a blocking port in view of a possible path switch to these paths in the future (see Patent Document 2).

By using the communication path that is currently cut off by the blocking ports but has a transmission capacity preallocated thereon, the bandwidth-allocated communication becomes possible.

Note that the above-mentioned two technologies will be described later in detail using FIGS. 32 to 36.

Patent Document 1: Japanese Laid-Open Patent Application Publication No. H11-355337
Patent Document 2: Japanese Laid-Open Patent Application Publication No. 2005-102012

DISCLOSURE OF THE INVENTION

Problems the Invention is Going to Solve

However, in accordance with the first conventional technology mentioned above, the bypass path can be constructed only when a bridge having a blocking port and a bridge connected to the blocking port are both on the same logical path established by STP. Also, the second conventional technology has disadvantages of wasting an unused bandwidth, as a bandwidth is allocated in advance, and of requiring management devices and the like for managing potential future paths.

In view of the above, the present invention aims to provide, for an STP-applied network in which data requiring a predetermined bandwidth is transmitted, a network system which does not waste a bandwidth resource, does not require a separate managing device, and can construct a dynamic path using blocking ports, and also to provide a relay device and a terminal device to construct the network system.

Means of Solving the Problems

In order to achieve the stated aim, the present invention provides a relay device with a blocking port that is logically blocked, which is one of a plurality of relay devices each including a plurality of ports and having a spanning tree protocol applied therein. The relay device comprises a request passing unit operable to pass request data through ports, one of which may be the blocking port, the request data being used for requesting a bandwidth setting required to pass specific data through the ports, an identification information storage unit operable to acquire identification information from the request data and store therein the acquired information while the request passing unit is passing the request data through the ports, the identification information being used for identifying the specific data, and a specific data passing unit operable to allow data identified as the specific data by the identification information to pass through the blocking port by unblocking the blocking port.

EFFECTS OF THE INVENTION

According to the stated structure, the relay device of the present invention allows bandwidth request data to pass through the blocking port, enabling a search and establishment of a path including through the blocking port. Also, when allowing the bandwidth request data to pass through, the relay device stores identification information of specific data to be passed through. In this way, the path established by the bandwidth request data can be a path used exclusively by the specific data identified by the stored identification information.

In other words, the path is a temporary path for the specific data, and thus, the above relay device can establish the path without affecting the tree-structure of STP.

Also, the above request data can be an ICMP packet.

According to the stated structure, the above relay device can be easily realized, as it utilizes a conventional protocol.

Also, the present invention provides a network system comprising a plurality of relay devices and a plurality of terminal devices, in which a spanning tree protocol is applied.

Here, each of the relay devices includes a plurality of ports, and at least one of ports of the plurality of relay devices is a blocking port which is logically blocked, a relay device having the blocking port includes: an identification information storage unit storing identification information used for identifying specific data; and a data passing unit operable to allow data identified as the specific data by the identification information to pass through the blocking port by unblocking the blocking port, a first terminal device includes: a bandwidth request unit operable, before the first terminal device transmits data requiring a predetermined bandwidth to a second terminal device, to send a request through one or more of relay devices linked between the first and the second terminal devices to allocate the predetermined bandwidth; a relay device information storage unit storing relay device information related to the one or more relay devices; a detour path determination unit operable to determine, based on the relay device information, a detour path which uses the blocking port and goes through, among the relay devices linked between the first and the second terminal devices, one or more relay devices capable of allocating the predetermined bandwidth; and a data transmission unit operable to (i) instruct the bandwidth request unit to send the request and (ii) (a) if the predetermined bandwidth is allocated, transmit the bandwidth-requiring data, and (b) if the predetermined bandwidth is not able to be allocated, instruct the detour determination unit to determine the detour path and transmit the bandwidth-requiring data in such a manner that the bandwidth-requiring data is able to be identified as the specific data by the one or more relay devices on the detour path.

According to the stated structure, the above network system can establish a bandwidth-guaranteed detour path including a blocking port. This improves the success rate of bandwidth reservation in the bandwidth-guarantee type communication and enables effective utilization of the communication bandwidth resources of the entire network.

Also, since the path using the blocking port allows only the specific data to pass through, other data can be blocked.

Also, the relay device can further comprise an identification information acquiring unit operable to acquire the identification information from the request, and the identification information storage unit stores the identification information acquired by the identification information acquiring unit.

According to the stated structure, the relay device can acquire identification information of specific data from each request for allocating a bandwidth. This allows the specific data, which can pass through the detour path including a blocking port, to be changed in accordance with each detour path.

Also, the above bandwidth request unit can transmit, to the second terminal device, bandwidth request data including information on request bandwidth, which indicates the predetermined bandwidth, the relay device information storage unit extracts the relay device information from the bandwidth request data returned from the second terminal device and stores therein the relay device information, the each of the relay devices further includes a bandwidth allocating unit operable to (i) receive the bandwidth request data, (ii) make an attempt to set the request bandwidth to one of ports thereof, and (iii) output the received bandwidth request data after adding thereto a result information piece indicating whether the attempt was successful or not and information on the ports of the relay device itself, and the second terminal device includes a bandwidth response unit operable to output the bandwidth request data received thereby to the first terminal device.

According to the stated structure, while the bandwidth request data is passing through the relay device, the relay device adds information on the relay device itself to the bandwidth request data. This allows collecting information on all the relay devices on the path.

Consequently, information on the relay devices on the path can be collected every time an attempt is made to establish a path, which enables a search of a detour path.

Also, the above data transmission unit can determine that the predetermined bandwidth was not able to be allocated when at least one of result information pieces indicates negative.

According to the stated structure, the terminal device can find out if a bandwidth-allocated path is successfully established. Accordingly, if the bandwidth is not allocated, the terminal device can search a detour path, enabling a bandwidth-guaranteed communication.

Also, the relay device information storage unit can include information indicating whether each port of the one or more relay devices is in use or not, the detour path determination unit specifies, among all ports of the one or more relay devices on the detour path, at least one port which is not in use, and instructs the bandwidth request unit to transmit again the bandwidth request data, and the bandwidth allocating unit (i) makes an attempt to set the request bandwidth to the specified port, and (ii) outputs the transmitted bandwidth request data after adding thereto the result information piece and the information on the ports of the relay device itself.

According to the stated structure, the terminal device can search a detour path by specifying the relay device the detour path goes through, allowing a swift establishment of the detour path.

The present invention also provides a terminal device included in a network system which has a plurality of relay devices and a plurality of terminal devices and has a spanning tree protocol applied therein. Here, the terminal device comprises a bandwidth request unit operable, before the terminal device transmits data requiring a predetermined bandwidth to another terminal device, to send a request through one or more of relay devices linked between the terminal device and the another terminal device to allocate the predetermined bandwidth, a relay device information storage unit storing relay device information related to the one or more relay devices, a detour path determination unit operable to determine, based on the relay device information, a detour path which uses the blocking port and goes through, among the relay devices linked between the terminal device and the another terminal device, one or more relay devices capable of allocating the predetermined bandwidth, and a data transmission unit operable to (i) instruct the bandwidth request unit to send the request and (ii) (a) if the predetermined bandwidth is allocated, transmit the bandwidth-requiring data, and (b) if the predetermined bandwidth is not able to be allocated, instruct the detour determination unit to determine the detour path and transmit the bandwidth-requiring data in such a manner that the bandwidth-requiring data is able to be identified as the specific data by the one or more relay devices on the detour path.

According to the stated structure, a network system of the present invention can be easily constructed.

The present invention also provides a network system comprising a plurality of relay devices and a plurality of terminal devices, in which a spanning tree protocol is applied. Here, each of the relay devices includes a plurality of ports, and at least one of ports of the plurality of relay devices is a blocking port which is logically blocked, a first terminal device includes: a bandwidth request unit operable, before the first terminal device transmits data requiring a predetermined bandwidth to a second terminal device, to send a request through one or more of relay devices linked between the first and the second terminal devices to allocate the predetermined bandwidth; and a data transmission unit operable to (i) instruct the bandwidth request unit to send the request and (ii) if the predetermined bandwidth is allocated, transmit the bandwidth-requiring data, each of the relay devices further includes: a detection unit operable to detect, among ports of the each of the relay devices, a port at which a transmission quality of the bandwidth-requiring data has fallen below a threshold; a pseudo request unit operable to transmit, among the ports, using one or more ports which exclude the detected port and may include the blocking port, pseudo request data through one or more relay devices linked between the each of the relay devices and the second terminal device to allocate the predetermined bandwidth based on the request sent by the bandwidth request unit; and a data transmission unit operable, if the detection unit detects the port, to (i) instruct the pseudo request unit to transmit the pseudo request data and (ii) transmit the bandwidth-requiring data to, among the one or more ports, a port which has allocated the predetermined bandwidth.

According to the stated structure, the network system can establish a bandwidth-guaranteed detour path using a blocking port under instructions from the relay device, which improves the success rate of bandwidth reservation in the bandwidth-guarantee type communication and enables effective utilization of the communication bandwidth resources of the entire network.

Also, since a switch to the detour path is made only through communication between the relay devices, in a case where a network resource management device for managing connection information and transmission capacity of all the relay devices is not installed, a high-quality transmission can be maintained by searching a path cut off with use of STP and making a switch to the detour path.

Additionally, because a switch to the detour path is made only through communication between the relay devices, if the relay devices are set to automatically establish a detour path or make a switch to the detour path in a case where QoS can no longer be maintained due to a deterioration of a transmission path, an operation or control of a device on the user's side is not required. That is to say, it is also an advantage that an effect of the present invention can be achieved by only additionally implementing a new function to the relay devices.

Also, the above relay device can further comprise a pseudo request passing unit operable to pass the pseudo request data through ports one of which may be the blocking port, an identification information storage unit operable to acquire identification information from the pseudo request data and store therein the acquired information while the pseudo request passing unit is passing the pseudo request data through the ports, the identification information being used for identifying specific data, and a specific data passing unit operable to allow data identified as the specific data by the identification information to pass through the blocking port by unblocking the blocking port.

According to the stated structure, the relay device can acquire identification information of data from each request for allocating a bandwidth, allowing the specific data, which can pass through the detour path including a blocking port, to be changed in accordance with each detour path.

BRIEF DESCRIPTION OF THE DRAWINGS

FIG. 6 shows a communication flow of bandwidth-guaranteed data from the terminal 42 to the terminal 41;

FIGS. 7A to 7D show exemplary contents of a connection information storage unit 2500 of a bridge 31; FIG. 7A shows exemplary contents of a relay device address 2510; FIG. 7B shows a structure and exemplary contents of a routing table 2520; FIG. 7C shows a structure and exemplary contents of an adjacent information table 2530; and FIG. 7D shows a structure and exemplary contents of a path information table 2540;

FIGS. 8A to 8D show exemplary contents of the connection information storage unit 2500 of a bridge 36; FIG. 8A shows exemplary contents of the relay device address 2510; FIG. 8B shows a structure and exemplary contents of the routing table 2520; FIG. 8C shows a structure and exemplary contents of the adjacent information table 2530; and FIG. 8D shows a structure and exemplary contents of the path information table 2540;

FIGS. 9A to 9D show exemplary contents of the connection information storage unit 2500 of a bridge 33; FIG. 9A shows exemplary contents of the relay device address 2510; FIG. 9B shows a structure and exemplary contents of the routing table 2520; FIG. 9C shows a structure and exemplary contents of the adjacent information table 2530; and FIG. 9D shows a structure and exemplary contents of the path information table 2540;

FIG. 10 shows a structure and exemplary contents of a relay device information table 1410;

FIG. 31A shows a flowchart showing a passing/discarding of a regular ICMP packet and data frame, and FIG. 31B shows a passing/discarding of an ICMP packet and data frame of the present invention;

FIG. 34A shows a path and a detour path between terminals 106 and 105, and FIG. 34B shows a path and a detour path between a terminal 107 and the terminal 105;

FIG. 35 shows a home network including five bridges and five terminals; and

DESCRIPTION OF REFERENCE NUMERALS

Figure 1:
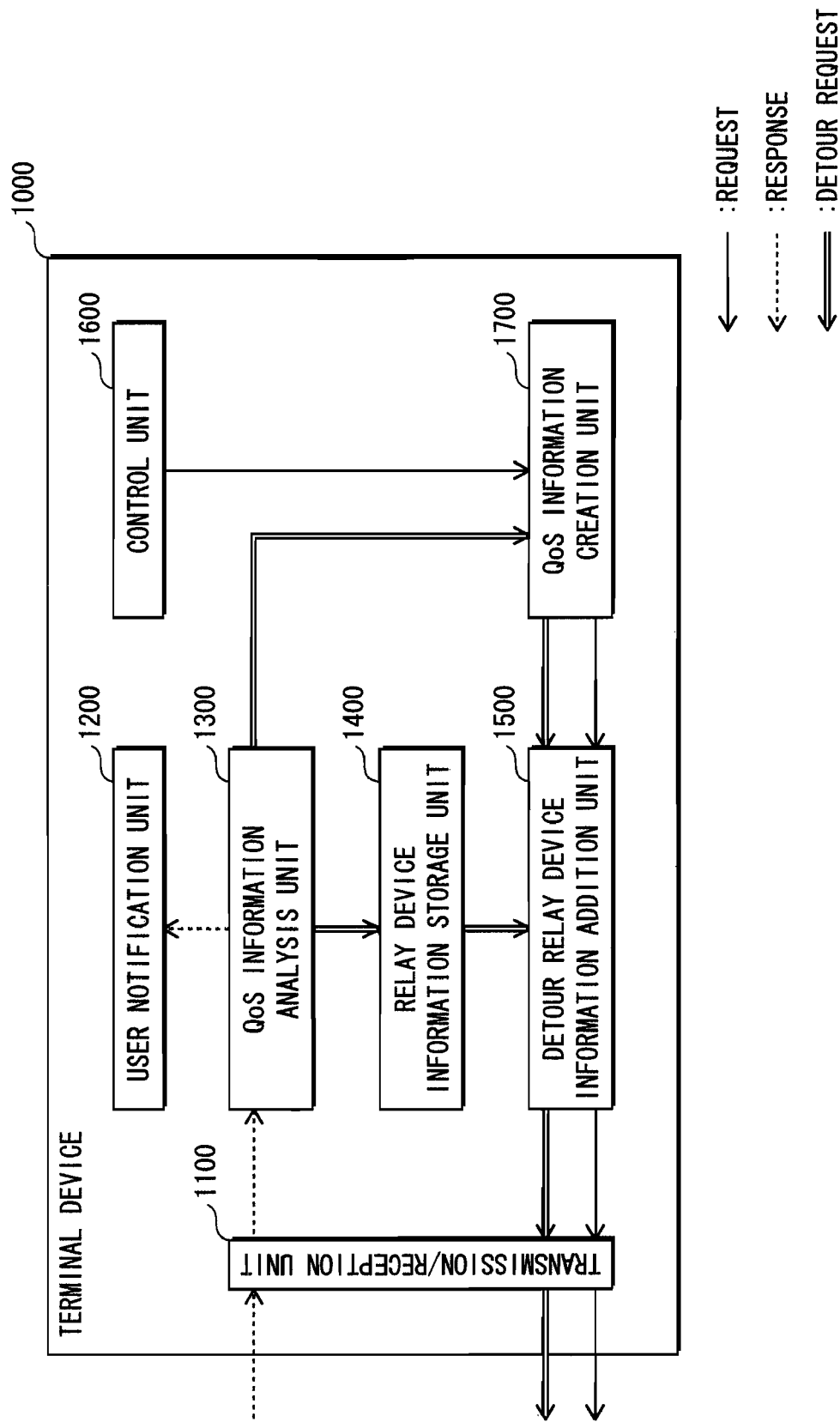
FIG. 1 shows an exemplary structure of a terminal device 1000.

1000 . . . terminal device
1100 2100 5100 . . . transmission/reception unit
1200 . . . user notification unit
1300 . . . QoS information analysis unit
1400 . . . relay device information storage unit
1410 . . . relay device information table
1500 . . . detour relay device information addition unit
1600 . . . control unit
1700 . . . QoS information creation unit
2000 5000 . . . relay device
2200 . . . QoS information/bandwidth-guaranteed data judgment unit
2300 . . . B/P reception data discard unit
2400 . . . MAC address learning unit
2500 . . . connection information storage unit
2510 . . . relay device address
2520 . . . routing table
2530 . . . adjacent information table
2540 . . . path information table
2600 . . . destination address/port determination unit
2700 . . . bandwidth setting/control unit
2800 . . . detour relay device information deletion unit
2900 . . . relay device information addition unit
3100 . . . bandwidth request ICMP packet
3200 . . . detour request ICMP packet
3300 . . . bandwidth-guaranteed data frame 5200 . . . pseudo bandwidth request generation/control unit
7000 . . . pseudo request ICMP packet

BEST MODE FOR CARRYING OUT THE INVENTION

Outline of Embodiments

The network system of the present invention establishes a detour path using blocking ports cut off by means of STP when an attempt to allocate a bandwidth with use of the only path established by STP has failed.

Also, the network system of the present invention can establish a detour path when a deterioration occurs in a traffic status or transmission status of the currently used bandwidth-guaranteed path.

In the present invention, the detour path is established to allow a transmission of particular data, and thus does not allow all kinds of data to pass through but allows only particular kinds of data to pass through. Therefore, the path is established at the start of a transmission of the particular data or at an occurrence of an interruption event and is deleted at the end of the transmission.

Also, the present invention has an advantage of enabling an establishment of a detour path with a high possibility, since a detour path is searched and established when required, and thus the path may vary from time to time.

The bandwidth-guaranteed communication reserves a bandwidth of a path between terminal devices before transmitting a data frame, and the data is transmitted only if the bandwidth is successfully reserved. When establishing a path, a bandwidth-reservation type communication protocol such as ST2 (Internet Stream Protocol Version 2) provided by IETF (Internet Engineering Task Force) or RSVP (Resource reSerVation Protocol) is used.

In the present embodiment, a bandwidth-reservation type communication protocol utilizing Echo packet (ping) of ICMP (Internet Control Message Protocol) is used.

In the present invention, while a normal path is established, information regarding relay devices on the path is collected, and a detour path is searched based on this information.

Prior to describing the embodiment, characteristics of a relay device of the present invention will be briefly described with reference to FIG. 31.

<Characteristics of Relay Device>

FIG. 31A and FIG. 31B show characteristics of a relay device of the present invention.

FIG. 31A shows a flowchart showing a passing/discarding of a regular ICMP packet and data frame, and FIG. 31B shows a passing/discarding of an ICMP packet and data frame of the present invention.

As shown in FIG. 31A, a bridge 2000 according to the present invention has a similar function to that of a regular bridge. That is, discarding a regular data frame, under the control of the spanning tree protocol, from a blocking port upon reception thereof. The same process is performed for an ICMP packet.

In the present invention, an ICMP packet is transmitted with information for a bandwidth allocation included therein, and the bandwidth is allocated at a bridge on the transmission path.

Accordingly, an ICMP packet requesting a bandwidth setting (hereinafter, referred to as "bandwidth request ICMP packet"), which is transmitted from a terminal device, allocates a bandwidth as it passes through bridges on the path established by STP (hereinafter, referred to as "normal path"). In other words, it does not pass through the blocking port of the bridge 2000.

When this normal bandwidth request fails, the terminal device transmits an ICMP packet for searching a detour path other than the normal path (hereinafter, referred to as "detour request ICMP packet").

The bridge of the present invention allows this detour request ICMP packet to pass through the blocking port and establishes a detour path (see the bridge 2000 on the left side of the arrow in FIG. 31B.)

While allowing a detour request ICMP packet to pass through, the bridge 2000 stores, into an connection information storage unit 2500, an identifier (data category etc.) of data to be transmitted using the requested bandwidth (hereinafter, referred to as "specific data") and allows the data frame, transmitted thereto, corresponding to the stored identifier to pass through the blocking port (see the bride 2000 on the right side of the arrow in FIG. 31B).

By configuring the bridge to allow only bandwidth-guaranteed specific data (hereinafter, referred to as "bandwidth-guaranteed data") to be transmitted/received from the blocking ports, it becomes possible to establish a detour path using blocking ports in a STP-applied network, enabling a path switching to maintain QoS (Quality of Service). Note that hereinafter, QoS represents a bandwidth guarantee.

The following describes two embodiments. In the first embodiment, search for a detour path is instructed by the terminal device, and in the second embodiment, search for a detour path is instructed by the relay device.

First Embodiment

Structure

In the following, a structure of a terminal device 1000 and the bridge 2000, which is a relay device, of the present invention will be described referring to FIG. 1 and FIG. 2, respectively.

FIG. 1 shows an exemplary structure of a terminal device 1000.

The terminal device 1000 includes a transmission/reception unit 1100, a user notification unit 1200, a QoS information analysis unit 1300, a relay device information storage unit 1400, a detour relay device information addition unit 1500, a control unit 1600, and a QoS information creation unit 1700.

First, the transmission/reception unit 1100 is an interface with a wired or wireless network and performs modulation/demodulation of data and media access control (MAC).

The user notification unit 1200 includes a display and the like and notifies a user of a result of the QoS information analysis unit 1300, that is, information such as whether or not the bandwidth on the path is allocated.

The QoS information analysis unit 1300 analyzes QoS information received via the transmission/reception unit 1100, and extracts relay device information of the bridge and whether or not the QoS setting has succeeded. If the bandwidth has been allocated based on the extracted information of whether or not the QoS setting has succeeded, the QoS information analysis unit 1300 processes normal data communication. If the bandwidth was not set, the QoS information analysis unit 1300 requests the QoS information creation unit 1700 to perform processing. Also, the QoS information analysis unit 1300 passes the extracted relay device information onto the relay device information storage unit 1400.

The relay device information storage unit 1400 stores the relay device information received from the QoS information analysis unit 1300.

The detour relay device information addition unit 1500 adds detour relay device information to QoS information created by the QoS information creation unit 1700 and passes the QoS information to the transmission/reception unit 1100.

The relay device information and detour relay device information will be described later referring to FIGS. 11 to 13.

The control unit 1600 which includes a keyboard and the like receives an instruction from a user and controls the terminal device 1000 based on the instruction. Specifically, for example, the control unit 1600 (i) receives an instruction to receive a video from a different terminal device and display it, (ii) performs appropriate processing in accordance with the instruction, and (iii) requests the QoS information creation unit 1700 to create a bandwidth request ICMP packet to ensure a path to the different terminal.

The QoS information creation unit 1700 creates an ICMP packet containing QoS information upon receiving a request from the control unit 1600. The QoS information, in the present embodiment, is communication bandwidth setting information.

Next, the bridge 2000 will be described using FIG. 2.

Figure 2:
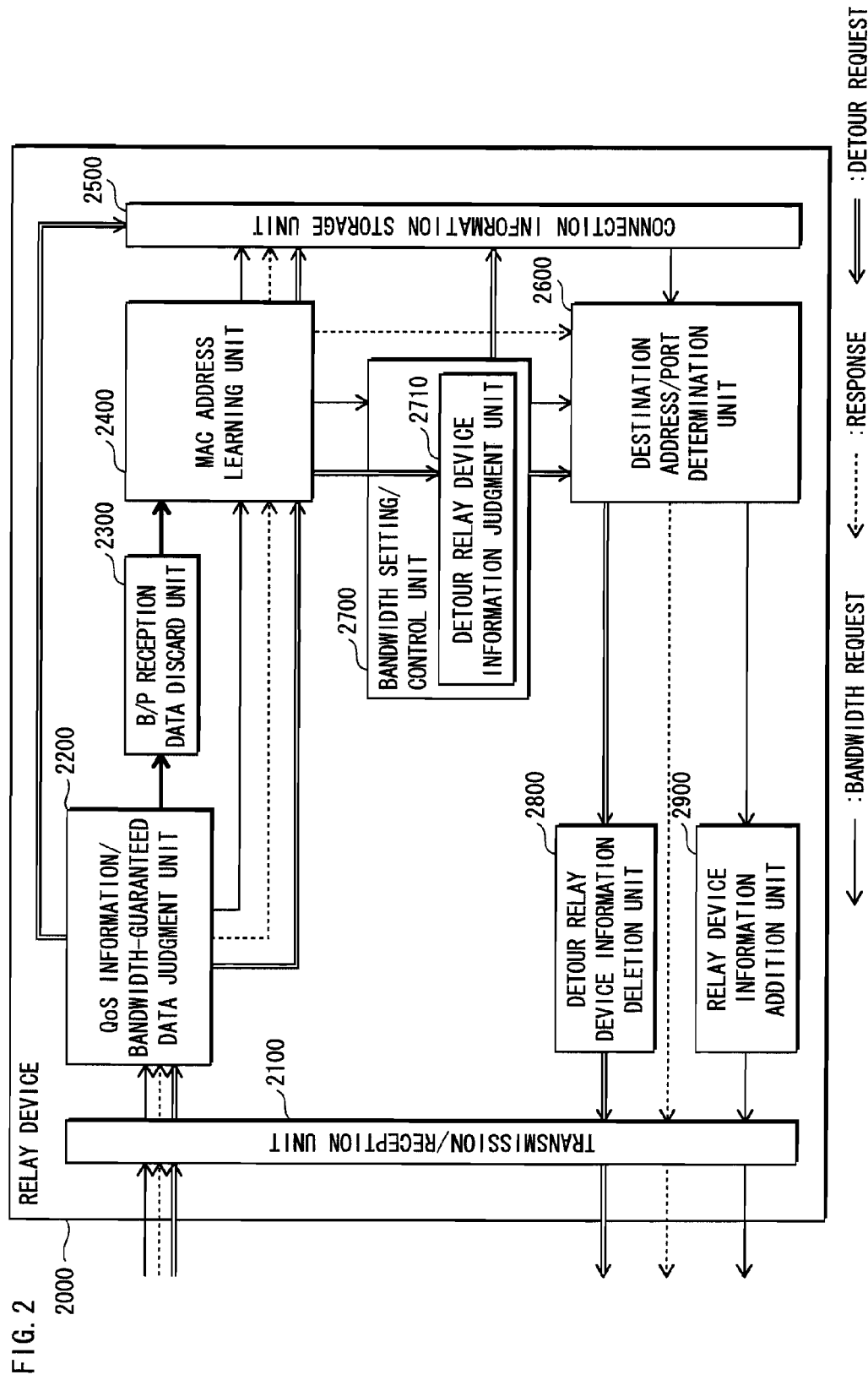
FIG. 2 shows an exemplary structure of a bridge 2000.

FIG. 2 shows an exemplary structure of the bridge 2000.

The bridge 2000 includes a transmission/reception unit 2100, a QoS information/bandwidth-guaranteed data judgment unit 2200, a B/P (Blocking Port) reception data discard unit 2300, a MAC address learning unit 2400, an connection information storage unit 2500, a destination address/port determination unit 2600, a bandwidth setting/control unit 2700, a detour relay device information deletion unit 2800, and a relay device information addition unit 2900.

First, the transmission/reception unit 2100 is an interface with a wired or wireless network and performs modulation/demodulation of data and media access control (MAC). The transmission/reception unit 2100 transmits, to the QoS information/bandwidth-guaranteed data judgment unit 2200, the received data and a receiving port number that is a port identifier of the port which received the data frame.

The QoS information/bandwidth-guaranteed data judgment unit 2200 determines whether or not the data received via the transmission/reception unit 2100 is a bandwidth request ICMP packet or bandwidth-guaranteed data. When the received data is either of these, the QoS information/bandwidth-guaranteed data judgment unit 2200 transmits the data to the MAC address learning unit 2400 along with the receiving port number. When the received data is neither of these, the QoS information/bandwidth-guaranteed data judgment unit 2200 passes the data to the B/P reception data discard unit 2300 along with the receiving port number.

Whether or not a packet is a bandwidth request ICMP packet or bandwidth-guaranteed data is determined by referring to a protocol field of an IP header or an ICMP header of the packet received via the transmission/reception unit 2100. For example, when the protocol field is "1", the packet is an ICMP packet.

Next, the B/P reception data discard unit 2300 determines whether or not the received data was received from the blocking port. If the data was received from the blocking port, the B/P reception data discard unit 2300 discards the data, and if the data was received from a port other than the blocking port, the B/P reception data discard unit 2300 transmits the data to the MAC address learning unit 2400 and performs a normal transfer process.

In other words, the bandwidth request ICMP packet and bandwidth-guaranteed data of the present invention are forwarded irrespective of whether or not they were input from the blocking port.

In the following, processes related to the bandwidth request ICMP packet or bandwidth-guaranteed data of the present invention will be described.

The MAC address learning unit 2400 learns a source MAC address of the received data and adds the address and the receiving port number to a routing table (see FIG. 7B and the like) of the connection information storage unit 2500. After the learning process, the MAC address learning unit 2400 transfers the received data to the bandwidth setting/control unit 2700 if the data is a bandwidth request ICMP packet, and transfers the received data to the destination address/port determination unit 2600 if the data is bandwidth-guaranteed data.

The connection information storage unit 2500 stores tables used in the present relay device. The details of the stored tables will be described later referring to FIGS. 7 to 10.

Next, the destination address/port determination unit 2600 determines a destination MAC address and destination port of the received data. In the determination process, the destination address/port determination unit 2600 refers to each table stored in the connection information storage unit 2500 based on the destination MAC address. It should be noted that if the destination MAC address is unlearned and not listed in the table, the received data will be forwarded to all ports of the bridge except for the receiving port.

After making the determination, the destination address/port determination unit 2600 transfers the received data to (i) the relay device information addition unit 2900 if the received data is a bandwidth request ICMP packet, (ii) the transmission/reception unit 2100 if the received data is either a response ICMP packet or bandwidth-guaranteed data, and (iii) the detour relay device information deletion unit 2800 if the received data is a detour request ICMP packet.

The bandwidth setting/control unit 2700 sets the bandwidth based on information included in QoS information and manages the QoS information. In the present embodiment, the bandwidth setting/control unit 2700 sets the requested bandwidth to an output port and manages it with a path information table 2540 of the connection information storage unit 2500.

Also, the bandwidth setting/control unit 2700 includes a detour relay device information judgment subunit 2710. When the received data is a detour request ICMP packet, the detour relay device information judgment subunit 2710 determines whether or not detour relay device information for searching a detour path has been added to the QoS information.

When the above-stated detour relay device information is determined to have been added, the bandwidth setting/control unit 2700 sets and manages the bandwidth in accordance with this information.

The detour relay device information deletion unit 2800 discards the detour relay device information if the detour relay device information attached to the detour request ICMP packet indicates the relay device itself.

The relay device information addition unit 2900 adds information related to the relay device itself, namely, the MAC address of the bridge itself, information regarding ports of the bridge itself, and the MAC address of a bridge adjacent to each of the ports if the received data is a bandwidth request ICMP packet. The added relay device information is transmitted to the source terminal device via other bridges.

The above-mentioned detour relay device information and the information on the bridge itself will be described later using FIGS. 11 and 12.

It should be noted that, in the present figure, solid arrows and double-lined arrows between function blocks indicate the data flow when a bandwidth request ICMP packet is received and the data flow when a detour request ICMP packet is received, respectively. Dotted arrows in the present figure indicate the data flow when a response ICMP packet is received. Also, the dotted arrows also indicate the data flow when bandwidth-guaranteed data is received.

<Network System>

Here, a network system used in the present embodiment will be described with reference to FIGS. 3 to 6.

Here, a terminal 41 is a Destination terminal (for example, a user side device), and a terminal 42 is a Source terminal (for example, a contents server side device).

Accordingly, when a bandwidth request ICMP packet is transmitted from the terminal 41 to the terminal 42 to allocate a bandwidth, (i) if the bandwidth is allocated, bandwidth-guaranteed data transmitted from the terminal 42 to the terminal 41, and (ii) if the bandwidth is not allocated, the terminal 41 transmits, to the terminal 42, a detour request ICMP packet to search a detour path and establishes a path on which the bandwidth has been allocated.

Now, a network structure, a path of a bandwidth request ICMP packet, a path of a detour request ICMP packet, and a path of bandwidth-guaranteed data will be briefly described referring to FIGS. 3, 4, 5, and 6, respectively.

<Network Structure>

Figure 3:
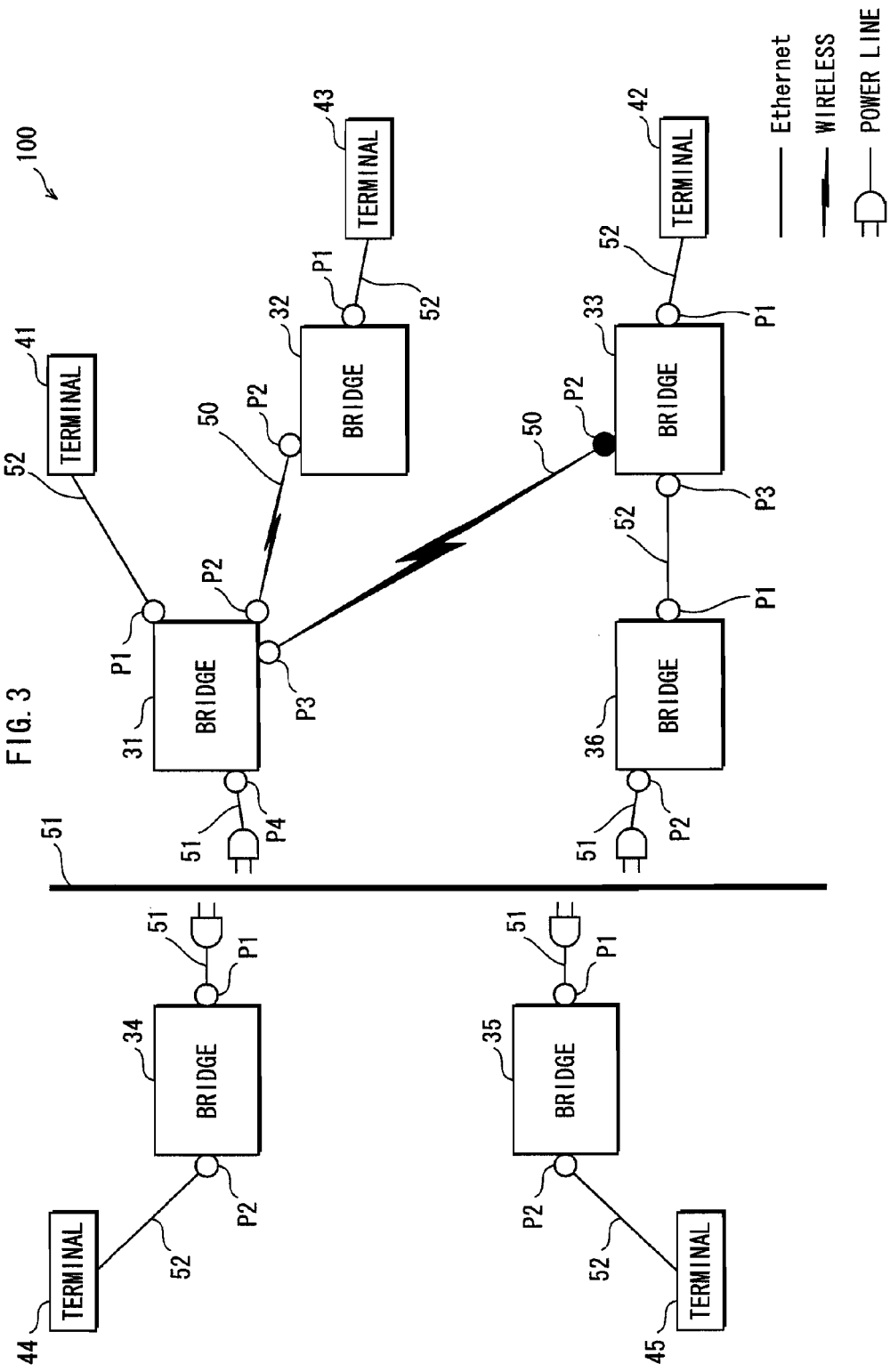
FIG. 3 shows a network system 100 of the present invention.

FIG. 3 shows a network system 100 of the present invention.

The present network system is constructed with five IP (Internet Protocol)-compliant terminal devices (41 to 45) and six bridges (31 to 36), and is connected with a power line 51, Ethernet (registered trademark), and a wireless 50.

As to ports (P1 etc.) of each bridge, a white circle denotes a forwarding port, and a black circle denotes a blocking port.

The terminal devices (41 to 45) each have a structure identical to the terminal device 1000 shown in FIG. 1; the bridges (31 to 36) each have a structure identical to the relay device 2000 shown in FIG. 2; the wireless 50 is a wireless link compliant with IEEE802.11 and the like; the power line 51 is a wired medium used in PLC (Power Line Communication); and Ethernet (registered trademark) 52 is a wired medium of IEEE 802.3 standard.

The bridge 31 interconnects the wireless, PLC and Ethernet (registered trademark). And the bridges 32 and 33 interconnect the wireless and Ethernet (registered trademark) Also, the bridges 34, 35, and 36 interconnect PLC and Ethernet (registered trademark).

The spanning tree protocol is implemented in the bridges (31 to 36). The bridge 34 is the root bridge, and a port "P2" of the bridge 33 is a blocking port.

<Path of Bandwidth Request ICMP Packet>

Figure 4:
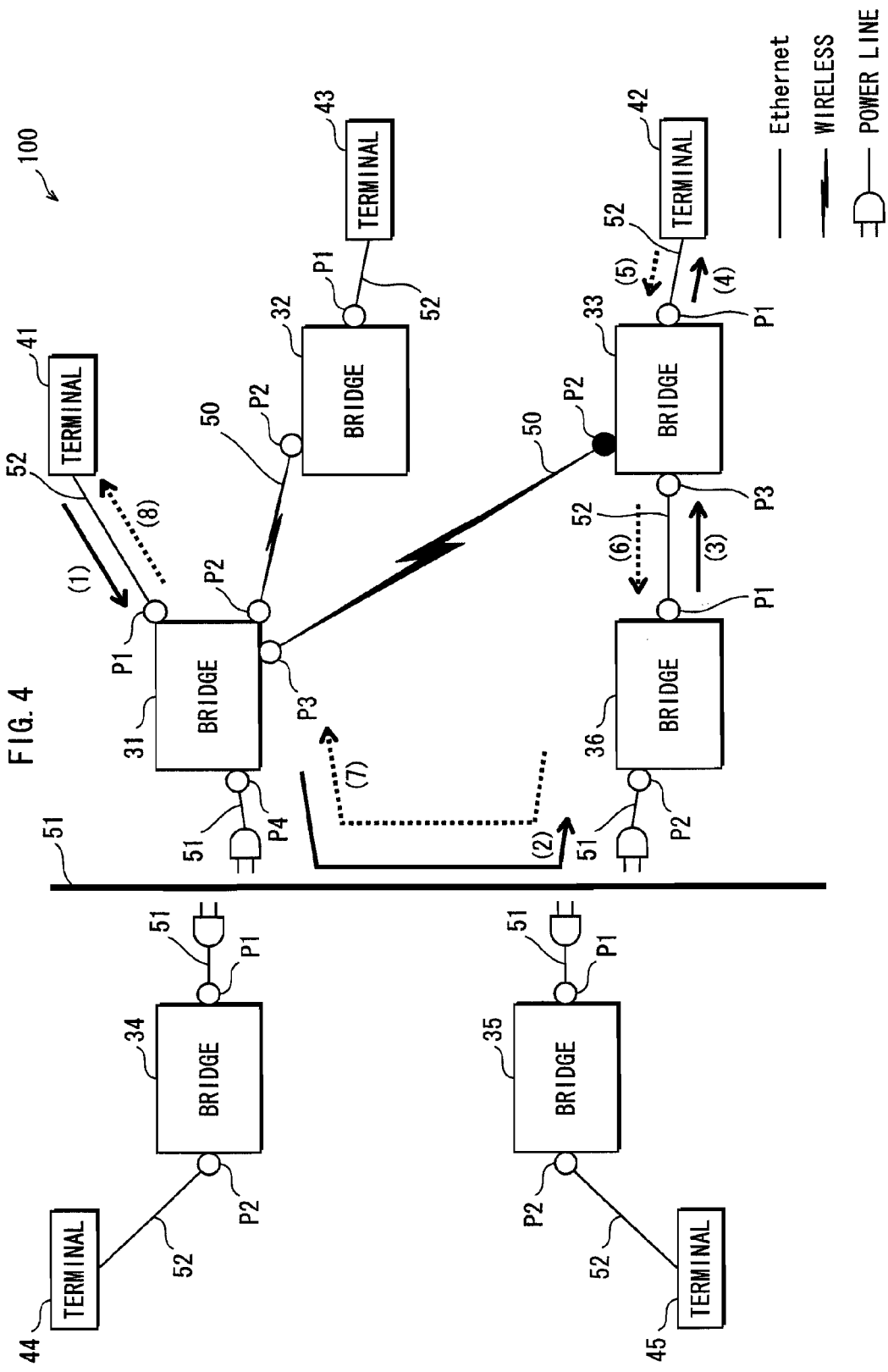
FIG. 4 shows a communication flow of a bandwidth setting request from a terminal 41 to a terminal 42.

FIG. 4 shows a communication flow of a bandwidth setting request from the terminal 41 to the terminal 42.

As indicated by solid arrows (1) to (4), a bandwidth request ICMP packet goes through the following path: terminal 41→bridge 31→bridge 36→bridge 33→terminal 42.

Meanwhile, as indicated by dotted arrows (5) to (8), a response ICMP packet corresponding to the above-mentioned bandwidth request ICMP packet is returned as follows: terminal 42→bridge 33→bridge 36→bridge 31→terminal 41.

<Path of Detour Request ICMP Packet>

Figure 5:
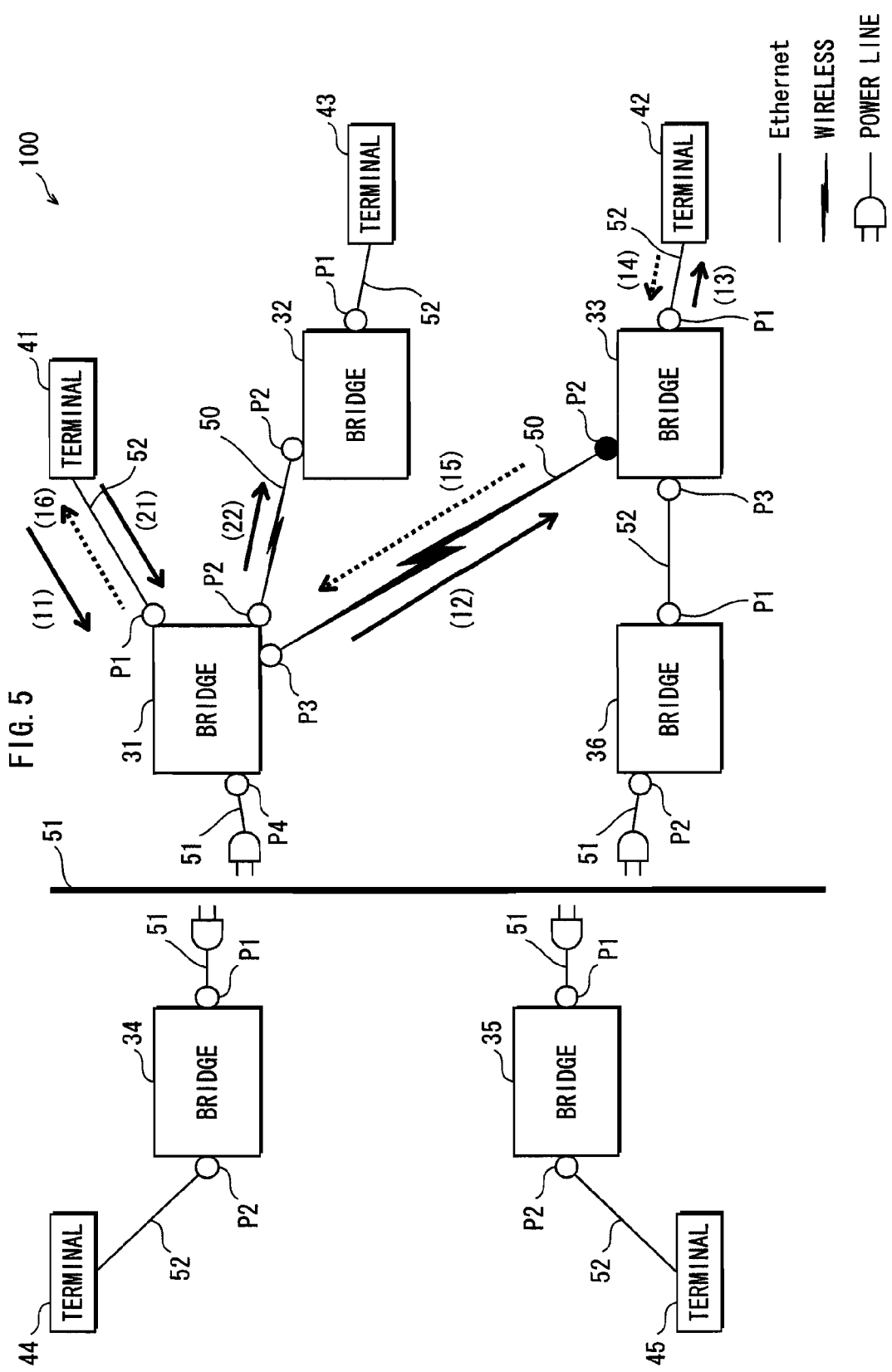
FIG. 5 shows a communication flow of a detour setting request from the terminal 41 to the terminal 42.

FIG. 5 shows a communication flow of a detour setting request from the terminal 41 to the terminal 42.

In the figure, a detour request ICMP packet searches a detour path from the port "P2" and a port "P3" of the bridge 31. The searched paths are shown by solid arrows (21) to (22) and (11) to (13).

In the detour search from the port "P3" of the bridge 31, as indicated by the solid arrows (11) to (13), the detour request ICMP packet goes through the following path: terminal 41→bridge 31→bridge 33→terminal 42.

On the other hand, the response ICMP packet corresponding to the above-mentioned detour request ICMP packet is returned as follows: terminal 42→bridge 33→bridge 31→terminal 41.

The detour search from the port "P2" of the bridge 31 fails, and the response ICMP packet is not returned.

<Transmission path of Bandwidth-Guaranteed Data>

FIG. 6 shows a communication flow of bandwidth-guaranteed data from the terminal 42 to the terminal 41.

As indicated by the bold arrows (31) to (33), a data frame of the bandwidth-guaranteed data is transmitted via the detour path as follows: terminal 42→bridge 33→bridge 31→terminal 41

<Data>

A description will be given on data used in the network system of the present invention with reference to FIGS. 7 to 13.

FIGS. 7 to 9 each show an example of data stored in the connection information storage unit 2500 of the bridge 31, bridge 36, and bridge 33, respectively; FIG. 10 shows an example of data stored in the relay device information storage unit 1400 of the terminal 41.

Figure 11:
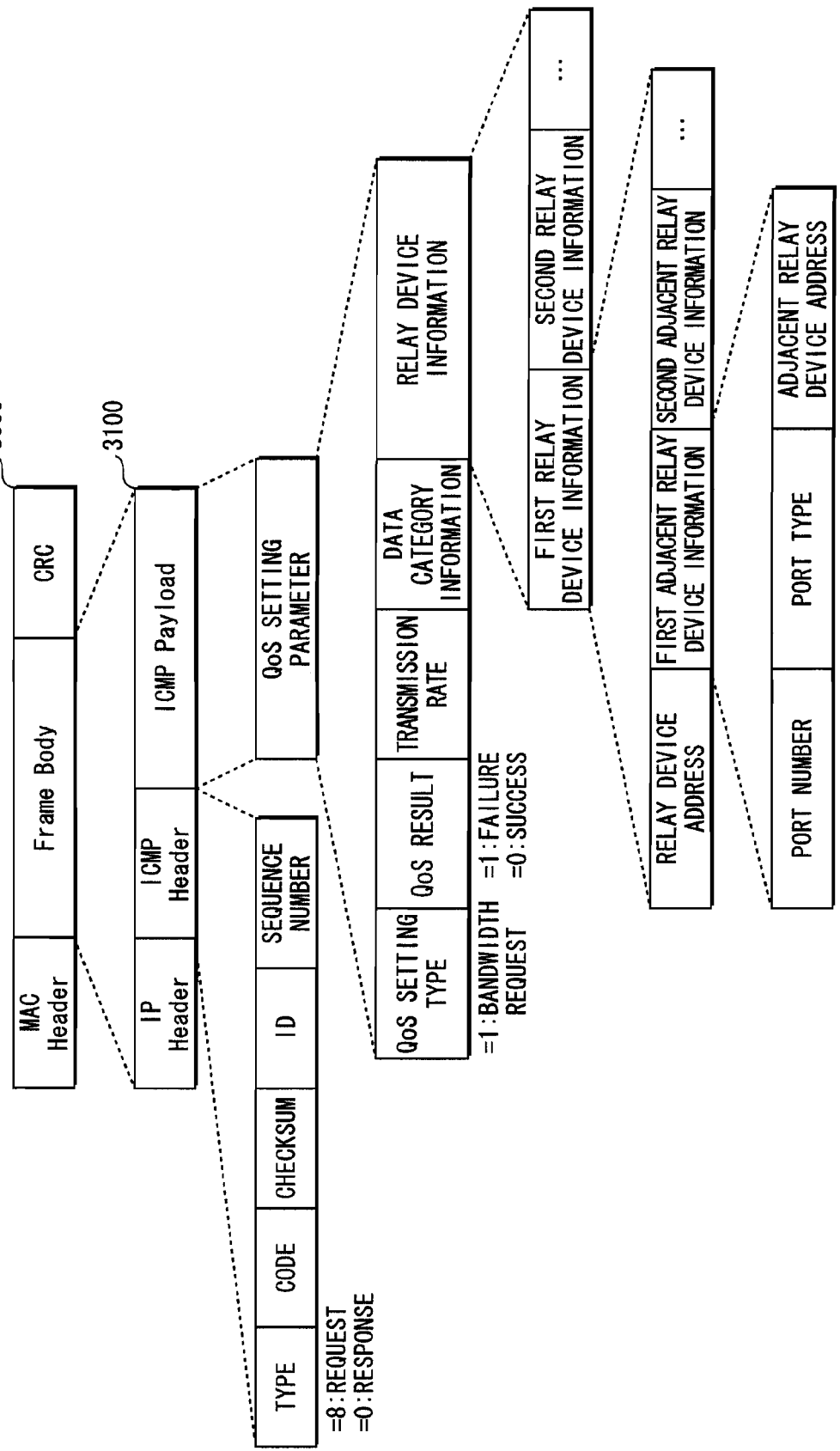
FIG. 11 shows an exemplary structure of a bandwidth request ICMP packet.
Figure 12:
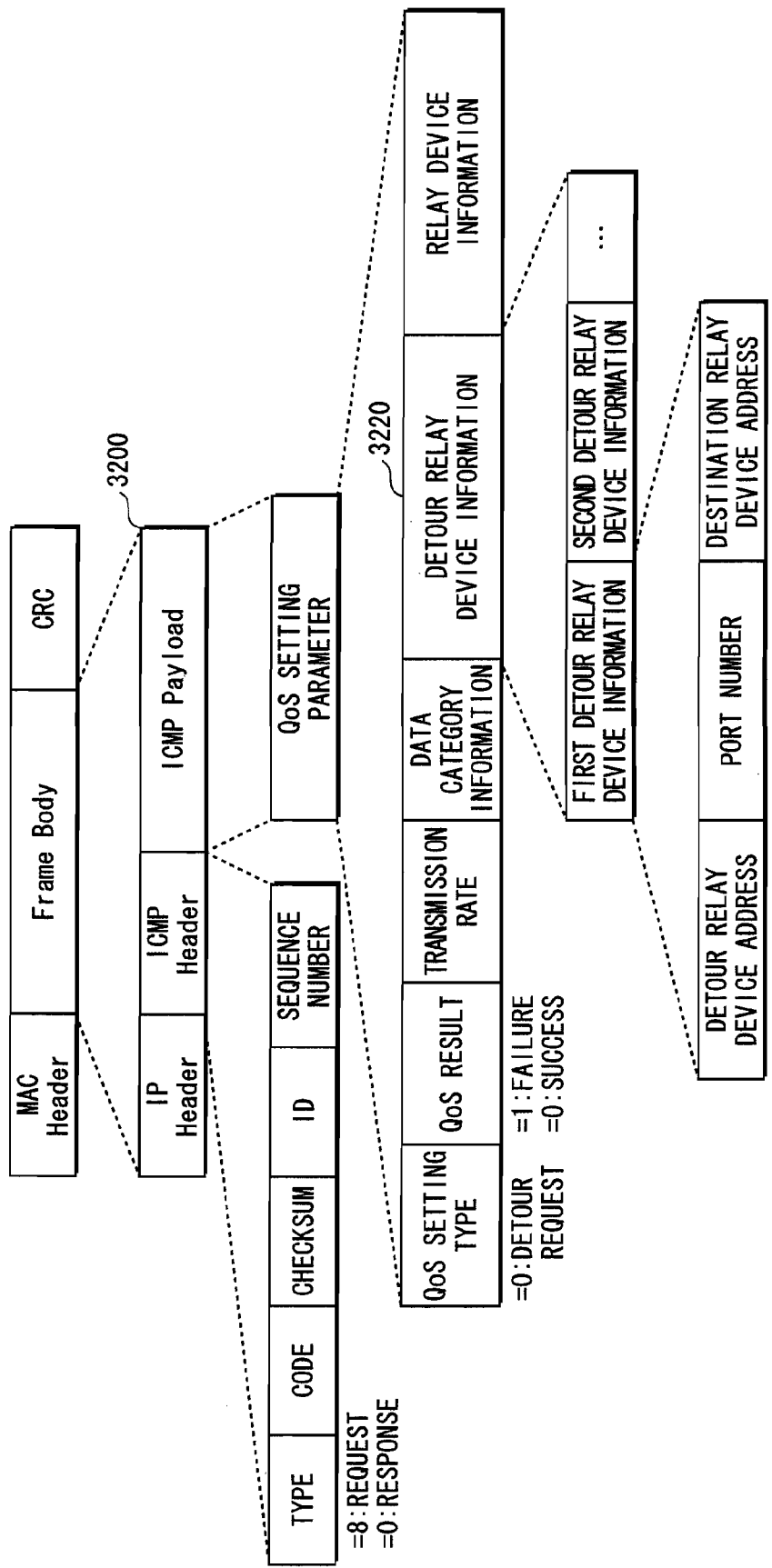
FIG. 12 shows an exemplary structure of a detour request ICMP packet 3200.

Also, FIG. 11 shows an exemplary structure of the bandwidth request ICMP packet, and FIG. 12 shows an exemplary structure of a detour request ICMP packet 3200. FIG. 13 shows an exemplary structure of a bandwidth-guaranteed data frame 3300.

<Data Stored in Connection Information Storage Unit 2500 of Bridge>

Each bridge stores data of the same structure. Here, a description will be given only on the data stored in the bridge 31.

FIG. 7 is data stored in the connection information storage unit 2500 of the bridge 31.

FIGS. 7A to 7D show data stored in the connection information storage unit 2500 of the bridge 31.

FIG. 7A shows exemplary contents of a relay device address 2510; FIG. 7B shows a structure and exemplary contents of a routing table 2520; FIG. 7C shows a structure and exemplary contents of an adjacent information table 2530; and FIG. 7D shows a structure and exemplary contents of a path information table 2540.

FIG. 7A shows the relay device address 2510 of the bridge itself. For example, the relay device address 2510 of the bridge 31 is "bridge31MAC". While "bridge31MAC" is a MAC address, here, for descriptive convenience, a MAC address is expressed by a name, instead of a number, as "xxxMAC". This will be applied throughout the rest of the present specification.

Meanwhile, the routing table 2520 in FIG. 7B includes a final destination address 2521, a port number 2522, and an adjacent relay device address 2523.

The destination address 2521 is a MAC address of a final destination terminal.

The port number 2522 is a port identifier and denoted as "P1" and the like.

The adjacent relay device address 2523 is a MAC address of a bridge to which the port is connected. This specifies a bridge when a port is connected to multiple bridges.

For example, when the final destination address of a packet is "terminal42MAC", the packet is transmitted from the port with "P4" as the port number 2522, which corresponds to "terminal42MAC" of the destination address 2521, to "bridge36MAC" of the adjacent relay device address 2523. This routing table 2520 is created by the MAC address learning unit 2400 (see FIG. 2).

The adjacent information table 2530 in FIG. 7C includes a port number 2531, a port type 2532, and an adjacent relay device address 2533.

The port number 2531 is a port identifier and the same as the port number 2522 of the routing table 2520.

The port type 2532 shows an attribute of the port indicated by the port number 2531. "F (Forwarding)" denotes a port in a forwarding state, and "B (Blocking)" denotes a blocking port which is in a logically-blocked state.

Also, the adjacent relay device address 2533 is a MAC address of a bridge or a terminal to which the port indicated by the port number 2531 is connected.

This adjacent information table 2530 is stored when STP constructs a logically tree-structured network topology. This is because, in order to determine a tree structure, STP makes bridges exchange control messages called BPDU (Bridge Protocol Data Unit) there among, which enables a determination of the root bridge, a calculation of path costs based on link costs, and a determination of status of each bridge port.

Next, the path information table 2540 in FIG. 7D includes a source address 2541, a receiving port number 2542, a destination address 2543, a destination port number 2544, a bandwidth request ID 2545, a data category 2546, and a guaranteed bandwidth 2547.

This table is created and added every time an ICMP packet requesting a bandwidth setting passes through the bridge. It contains information of an established path. The added information is deleted in cases such as (i) when a response ICMP packet corresponding to a request is not returned, (ii) when bandwidth-guaranteed data is not transmitted, and (iii) when the bridge has received an ICMP packet for freeing up the bandwidth.

The source address 2541 is a MAC address of a transmission source of a bandwidth request ICMP packet or a detour request ICMP packet. The receiving port number 2542 is the number of the port which received the above-mentioned ICMP packet.

Also, the destination address 2543 is a MAC address of a destination bridge of a bandwidth request ICMP packet or a detour request ICMP packet, and the destination port number 2544 is the number of the port which transmits the above-mentioned ICMP packet.

The reason for specifying the MAC address of the destination bridge in addition to specifying the destination port is that a bridge needs to be specified when one port is connected to multiple bridges.

The bandwidth request ID 2545 indicates an identifier of a bandwidth request, that is, indicates which of a bandwidth request ICMP packet and a detour request ICMP packet has made the bandwidth request. In other words, by referring to the bandwidth request ID, it can be determined whether the path is a normal path or a detour path, and based on which request.

The data category 2546 is an identifier of bandwidth-guaranteed data which is allowed to use the path.

The guaranteed-bandwidth 2547 indicates a bandwidth set on the path.

<Data Stored in Relay Device Information Storage Unit 1400 of Terminal>

Next, a description will be given on data stored in the relay device information storage unit 1400 of the terminal device that made a bandwidth request referring to FIG. 10. FIG. 10 shows a structure and exemplary contents of a relay device information table 1410.

This table provides relay device information included in a response ICMP packet corresponding to a bandwidth request ICMP packet, and contains information on all the bridges the bandwidth request ICMP packet passed through between the transmission source terminal and the destination terminal.

The relay device information storage unit 1410 includes a relay device address 1411, a port number 1412, a port type 1413, and an adjacent relay device address 1414.

The relay device address 1411 indicates a MAC address of a bridge.

The port number 1412 is a port identifier of the bridge, and the port type 1413 indicates an attribute of the port.

The adjacent relay device address 1414 indicates a MAC address of a bridge connected to the port.

Here, the port used for receiving the data is not listed.

The terminal 41 which intends to ensure a path refers to this table and conducts a search for a detour path.

<Bandwidth Request ICMP Packet>

Described next with FIG. 11 is a bandwidth request ICMP packet.

FIG. 11 shows an exemplary structure of the bandwidth request ICMP packet.

A MAC frame 3000 includes "MAC Header", "Frame Body", and "CRC (Cycle Redundancy Check)". The "MAC Header" contains a transmission source MAC address, a destination MAC address and the like; The "Frame Body" contains data; and the "CRC", is an error-detecting code. A bandwidth request ICMP packet 3100 is stored in the "Frame Body".

The bandwidth request ICMP packet 3100 includes "IP Header", "type", "code", "checksum", "ID", "sequence number", and "QoS setting parameter". The "IP Header" contains a transmission source IP address, a destination IP address, and a protocol; the "type" indicates a type of the ICMP packet; the "code" defines details in combination with the type; the "checksum" is an error-detection value; the "ID" is used to identify the request packet; the "sequence number" indicates a sequence number of packets for each host; and the "QoS setting parameter" is a parameter for bandwidth request.

In the present embodiment, since ICMP Echo Request is used, the protocol of the "IP Header" is "1", and the "type" is "8" when the packet is a request packet and "0" when the packet is a response packet.

Every time a bandwidth setting is requested, the value of the "ID" is changed to make the request packet and response packet correspond with each other.

Next, the "QoS setting parameter" includes "QoS setting type", "QoS result", "transmission rate", "data category information", and "relay device information". The "QoS setting type" identifies whether the request is a bandwidth request or a detour request; the "QoS result" indicates whether the bandwidth setting has succeeded or failed; the "transmission rate" indicates a bandwidth to be requested for setting; the "data category information" is an identifier of bandwidth-guaranteed data; and the "relay device information" is information on relay devices on the transmission path.

The "QoS setting type" is "1" for a bandwidth request ICMP packet, "0" for a detour request ICMP packet, and "2" for a bandwidth freeing ICMP packet. Accordingly, here, "1" has been set.

This "QoS setting type" and the "ID" together identify the packet requesting a bandwidth setting, and these two are used to set the bandwidth request ID 2545 of the path information table 2540 (see FIG. 7 and the like).

Also the "QoS result" is updated at bridges the packet passes through, and for instance, "0" is set when the bandwidth setting has succeeded, and "1" is set when the bandwidth setting has failed. It should be noted that when "1" has been already set, it will not be overwritten.

Also, the "data category information" is set to the data category 2546 of the path information table 2540 (see FIG. 7 and the like) at each bridge the packet passes through. In the present embodiment, the terminal side specifies a unique ID, for instance, "A001" etc. in the "data category information" of the packet.

Other than a unique ID, this "data category information" can be a unique identifier including the IP address and port number of the Source terminal (transport layer), and the IP address and port number of the Destination terminal (transport layer) which are included in the bandwidth setting request or detour path bandwidth setting request. This unique identifier can be constructed similarly from a data frame. In this way, the "data category information" can be created at each bridge even if it is not included in a transmitted request ICMP packet, which enables a determination of whether the data frame should be guaranteed a bandwidth or not based on whether the data category is the same.

The "relay device information" is information added at each bridge the packet passes. In a bandwidth request ICMP packet, information on each bridge the packet passes through is added as "n-th relay device information", and the entire set of information is returned to the source terminal as it is in a corresponding response packet.

Therefore, the "relay device information" has not been added yet when a terminal device transmits a bandwidth request ICMP packet, but is included in a response ICMP packet.

The "n-th relay device information" includes "relay device address" which is a MAC address of a bridge the packet passed and "n-th adjacent relay device information" which is information on all the adjacent bridges. The "n-th adjacent relay device information" includes "port number" which indicates a port, "port type" which indicates whether the port is a blocking port or not, and "adjacent relay device address" which is a MAC address of the bridge.

The "n-th relay device information" includes information on ports except for the receiving port of the present request packet. The information is contained in the adjacent information tables 2530 of the bridges the packet passed through (see FIG. 7 and the like).

<Detour Request ICMP Packet>

FIG. 12 shows an exemplary structure of the detour request ICMP packet 3200.

A description will be given only on differences from the bandwidth request ICMP packet 3100.

First, "0" is set for the "QoS setting type".

Also, it is different in that "detour relay device information" 3220 is added.

This "detour relay device information" 3220 is, unlike the "relay device information", set when the terminal device transmits a detour request ICMP packet.

The "detour relay device information" 3220 includes "detour relay device address", "port number", and "destination relay device address". The "detour relay device address" is a MAC address of a bridge, the "port number" is a port identifier, and the "destination relay device address" is a MAC address of a bridge connected to the port. The path specified by this "detour relay device information" 3220 is set by relay devices so as to be a different path from the path bandwidth request ICMP packet passed.

<Bandwidth-Guaranteed Data Frame>

Figure 13:
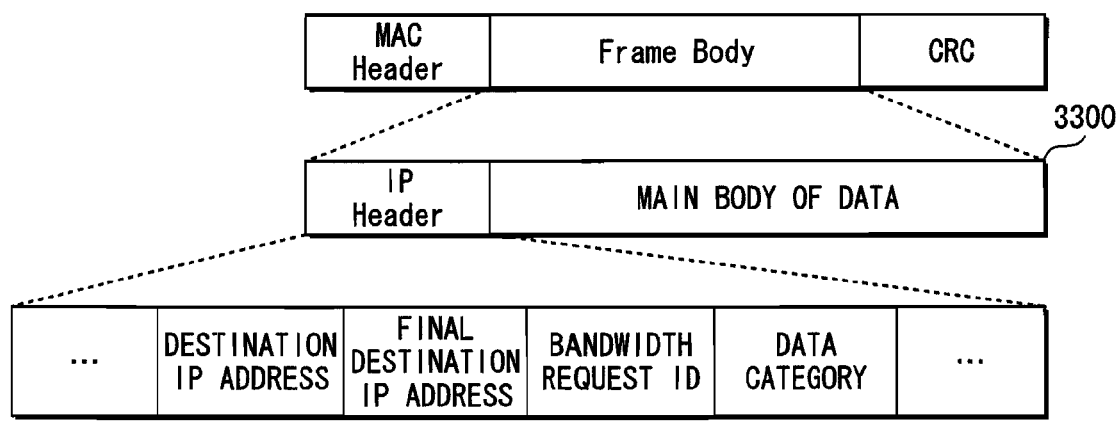
FIG. 13 shows an exemplary structure of a bandwidth-guaranteed data frame 3300.

FIG. 13 shows an exemplary structure of the bandwidth-guaranteed data frame 3300.

The bandwidth-guaranteed data frame 3300 includes "data category" which is an identifier of data stored in "main body of data", and "bandwidth request ID" which indicates which path is to be passed, along with the "IP Header", "destination IP address", and "final destination IP address".

The "bandwidth request ID" is compared with the bandwidth request ID 2545 of the path information table 2540 (see FIG. 7 and the like) stored by each bridge and output from a port of the path, the bandwidth request ID 2545 of which matches the "bandwidth request ID". For example, in FIG. 7D, when the "bandwidth request ID" is "detour 001" and the "data category" is "AP001", the bandwidth-guaranteed data frame 3300 will be output from "P3" of the destination port number 2544 with the destination address 2543 as "bridge33MAC".

<Operations>

In the following, a description will be given on operations for ensuring a detour path in accordance with the network system of the present invention with reference to FIGS. 14 to 17.

Here, operations of a terminal device are described in two parts, and operations of a relay device are described in four parts.

Specifically, the first part of the operations of the terminal device is a process of transmitting a bandwidth request ICMP packet, and the second part is a process of receiving a response ICMP packet and transmitting a detour request ICMP packet.

Also, the first part of the operations of the relay device is processing when a bandwidth request ICMP packet is received, the second part is processing when a response ICMP packet is received, the third part is processing when a detour request ICMP packet is received, and the fourth part is processing when a bandwidth-guaranteed data frame is received.

These processes will be described following normal procedures.

It should be noted that a process on a response ICMP packet corresponding to a bandwidth request ICMP packet and a process on a response ICMP packet corresponding to a detour path ICMP packet is the same.

<Terminal Device: Process of Transmitting Bandwidth Request ICMP Packet>

Described next is how the terminal device executes a process of transmitting a bandwidth request ICMP packet.

The terminal 41 transmits a bandwidth request ICMP packet in order to allocate a communication bandwidth on a Source-Destination basis with the terminal 42.

First, upon receiving an instruction from the user for a bandwidth-guaranteed communication, the control unit 1600 requests the QoS information creation unit 1700 to create QoS information.

Having received the request, the QoS information creation unit 1700 creates QoS information based on the request, stores it in an ICMP packet, and transmits to the detour relay device information addition unit 1500.

This ICMP packet includes information related to QoS such as a communication bandwidth desired to be allocated (unit: bps) (hereinafter, referred to as "desired bandwidth to be allocated", the IP address of the Source terminal, the port number of the Source terminal (transport layer), the IP address of the Destination terminal, and the port number of the Destination terminal (transport layer) (see FIG. 11).

The detour relay device information addition unit 1500 does not add detour relay device information to a first bandwidth setting request, that is, a bandwidth request ICMP packet, and forwards it to the transmission/reception unit 1100.

The transmission/reception unit 1100 transmits the bandwidth request ICMP packet to the bridge 31 (see the solid arrow (1) in FIG. 4).

<Relay Device: Processing when Bandwidth Request Packet is Received>

Having received the bandwidth request ICMP packet from the terminal 41, the bridge 31 attempts to allocate a communication bandwidth of the power line 51 between the bridges 31 and 35 in accordance with the "transmission rate" included in the bandwidth setting request, which indicates the desired bandwidth to be allocated.

Figure 14:
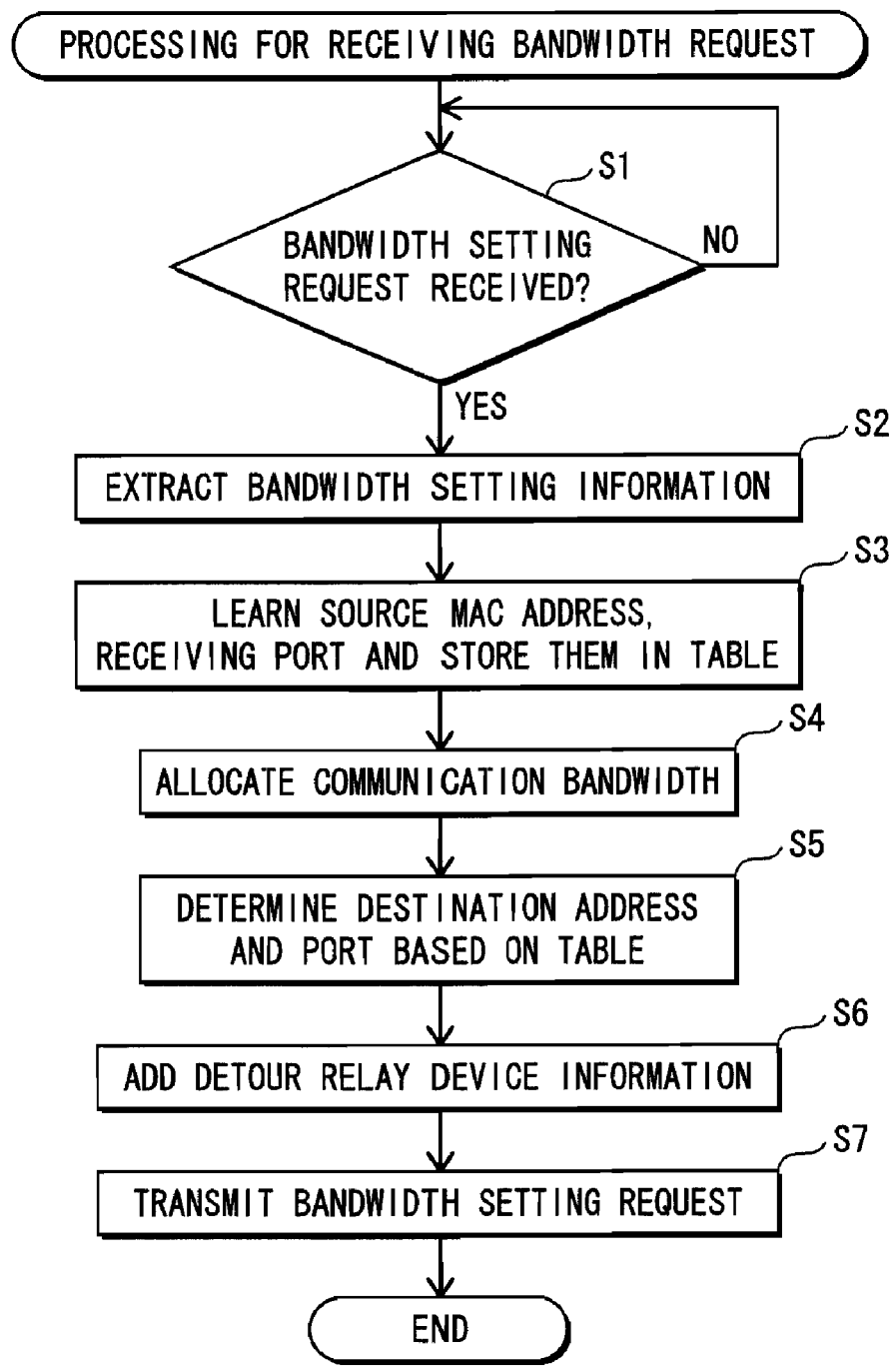
FIG. 14 is a flowchart showing processing when a bandwidth request ICMP packet is received.

Described next with reference to FIG. 14 is a process performed by the bridge 31 upon receiving the bandwidth ICMP packet. FIG. 14 is a flowchart showing processing when the bandwidth request ICMP packet is received.

Having received the bandwidth request ICMP packet, the transmission/reception unit 2100 identifies which of the ports P1 to P4 received the packet. Here, it was received by the port "P1".

After that, the transmission/reception unit 2100 transmits the receiving port number "P1" and packet to the QoS information/bandwidth-guaranteed data judgment unit 2200.

The QoS information/bandwidth-guaranteed data judgment unit 2200 determines whether or not the received packet is a bandwidth request ICMP packet by referring to the "QoS setting type" (see FIG. 11 and the like). If the "QoS setting type" is "1", the QoS information/bandwidth-guaranteed data judgment unit 2200 determines the received packet to be a bandwidth setting request (step S1: YES), extracts the "ID" from the received packet and stores it in the bandwidth request ID 2545, and transmits the packet and the receiving port number to the MAC address learning unit 2400 (step S2).

The MAC address learning unit 2400 learns the source MAC address "terminal41MAC" from the received receiving port number and the received packet, and stores the receiving port number and source MAC address in correspondence with each other into the connection information storage unit 2500.

The receiving port number and source MAC address are stored in the receiving port number 2542 and source address 2541 of the path information table 2540, respectively (see step S3, FIG. 7D).

Next, the MAC address learning unit 2400 forwards the received packet to the bandwidth setting/control unit 2700.

The bandwidth setting/control unit 2700 then transmits the packet to the detour relay device information judgment subunit 2710 to judge if information on detour relay device has been added. Here, it is determined that the addition has not been made as the "QoS setting type" is "1", which does not indicate a detour request.

The bandwidth setting/control unit 2700 attempts to allocate the communication bandwidth of the power line 51 between the bridges 31 and 36 for the desired bandwidth to be allocated specified by the "transmission rate" (see FIG. 11) (step S4).

If the desired bandwidth is allocated successfully, the bandwidth setting/control unit 2700 then stores the "transmission rate" and "data category information" included in the packet into the guaranteed bandwidth 2547 and data category 2546, respectively, and without setting any parameter in the "QoS result" (see FIG. 11) of the packet, forwards the packet to the destination address/port determination unit 2600.

Here, the reason for not setting any parameter in the "QoS result" is that if the "QoS result" is "1 (failure)" it needs to remain as it is, and if "0 (success)", it does not need to be changed.

When the desired bandwidth could not be allocated, the bandwidth setting/control unit 2700 sets "1" (bandwidth setting failed) in the "QoS result" and forwards the packet to the destination address/port determination unit 2600.

One reason for not being able to allocate a communication bandwidth, for instance, may be that the terminals 44 and 45 are already conducting a bandwidth-guaranteed communication using the power line 51.

Having received the packet, the destination address/port determination unit 2600 refers to the routing table 2520 of the connection information storage unit 2500 and determines the destination MAC address and transmitting port.

If the destination MAC address is unlearned and does not exist, all ports of the bridge but the receiving port will be designated as the transmitting ports.

Here, it is assumed that the destination MAC address has been learned, and since the destination MAC address is "terminal42MAC", the destination MAC address is determined to be "bridge36MAC" as indicated by the adjacent relay device address 2523, and the transmitting port is determined to be "P4" as indicated by the port number 2522 (step S5).

The determined destination MAC address and transmitting port are stored in the destination address 2543 and transmitting port number 2544, respectively.

Next, the destination address/port determination unit 2600 forwards the packet to the relay device information addition unit 2900 if the packet is a bandwidth request ICMP packet, that is, if the "QoS setting type" is "1".

The relay device information addition unit 2900 adds information regarding the bridges included in the relay device address 2510 and adjacent information table 2530 (excluding the bridge determined to be the destination and the bridge the receiving port is connected to) to the packet as "first relay device information" (see step S6, FIG. 11).

In other words, there are four bridges, the bridges 34, 35, 32, and 33, which are adjacent to the bridge 31. Here, however, when the MAC address of the bridge adjacent to the port is unknown due to unlearned or the like, only the information on the port to be output from is added instead of the MAC address of the adjacent bridge. This destination-specifying information will be necessary when the terminal 41 searches a detour path.

Next, the relay device information addition unit 2900 transfers the packet to the transmission/reception unit 2100, and the transmission/reception unit 2100 transmits the packet, that is, the bandwidth request ICMP packet, to the bridge 36 (step S7, see the solid arrow (2) in FIG. 4).

Having received the bandwidth request ICMP packet from the bridge 31, the bridge 36 operates in a similar way to the bridge 31, and transmits the bandwidth request ICMP packet to the bridge 33 (see the solid arrow (3) in FIG. 4). The bridge 33 operates in the similar way, and transmits the bandwidth request ICMP packet to the terminal 42 (see the solid arrow (4) in FIG. 4).

<Relay Device: Processing when Response ICMP Packet is Received>

Having received the bandwidth request ICMP packet, the terminal 42 returns a bandwidth setting response for the bandwidth setting request, a response ICMP packet, to the bridge 33 (see the dotted arrow (5) in FIG. 4).

In this response ICMP packet, the "type" (see FIG. 11) of the received bandwidth request ICMP packet is changed to "0", and the terminal 41 is set as the final destination address.

This response ICMP packet is returned to the terminal 41 via the bridges, which the bandwidth request ICMP packet passed, in reverse order. In other words, the bridge 33 returns the response ICMP packet to the bridge 36 (see the dotted arrow (6) in FIG. 4), the bridge 36 then returns it to the bridge 31 (see the dotted arrow (7) in FIG. 4), and then the bridge 31 returns it to the terminal 41 (see the dotted arrow (8) in FIG. 4).

Figure 15:
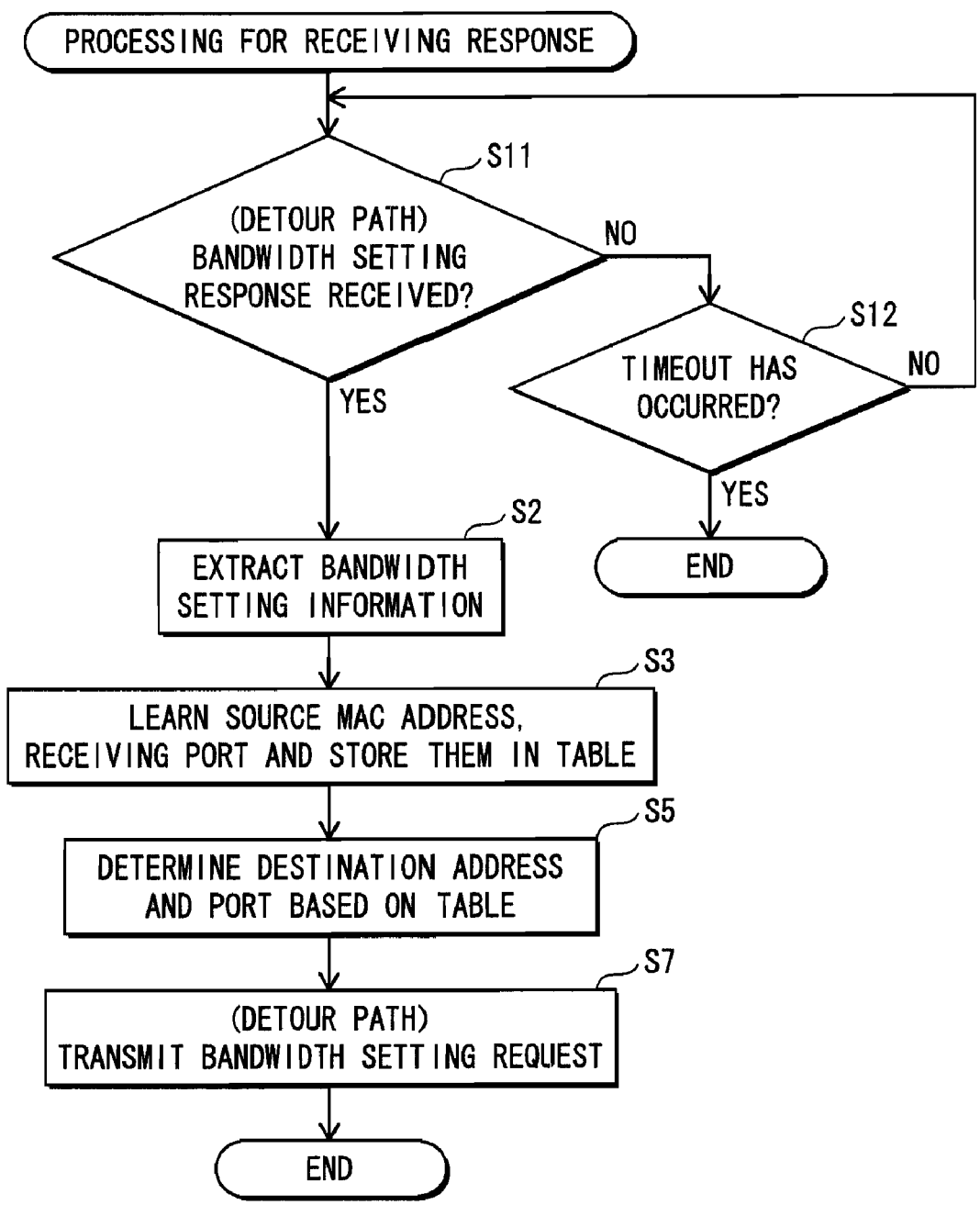
FIG. 15 is a flowchart showing processing when a response ICMP packet is received.

Described next with reference to FIG. 15 is a process in which the bridge receives the response ICMP packet, processes it within the bridge, and transmits a bandwidth setting response.

FIG. 15 is a flowchart showing processing when the response ICMP packet is received.

Each bridge activates a timer upon completing a relay transmission of the bandwidth request ICMP packet (step S11). When a response ICMP packet is not received after a predetermined time has passed (step S11: NO), the process times out (step S12: YES), and, after the time out, all the bandwidth request ICMP packets heading for the same final destination address will be discarded upon reception. The request which has timed out will be deleted from the path information table 2540 based on the bandwidth request ID 2545.

Other operations (steps 2, 3, 5, and 7) are the same as those of the relay device, as described in FIG. 14, which are performed when a bandwidth request ICMP packet is received except that an allocation of the communication bandwidth (step S4 in FIG. 14) and an addition of the destination-specifying information (step S6 in FIG. 24) are not performed.

<Terminal Device: Process of Transmitting Detour Request ICMP Packet>

Having received the response ICMP packet, the transmission/reception unit 1100 of the terminal 41 forwards it to the QoS information analysis unit 1300 which then refers to the "QoS result" added to the received packet and determines the result of the attempt on allocating the bandwidth.

When the bandwidth setting has succeeded, that is, when the "QoS result" (see FIG. 11) is "0", the QoS information analysis unit 1300 notifies the user notification unit 1200 accordingly, and the user notification unit 1200 notifies the user. Following that, based on the user's instruction, the terminal 41 requests the terminal 42 to transmit a bandwidth-guaranteed data frame.

When the bandwidth setting failed, that is, when the "QoS result" (see FIG. 11) is "1", the attempt to allocate the desired communication bandwidth is judged to have failed.

When the desired bandwidth could not be allocated, the QoS information analysis unit 1300 creates the relay device table 1410 (see FIG. 19) from the "relay device information" (see FIG. 11) included in the response ICMP packet and stores it in the relay device information storage unit 1400.

This relay device table 1410 indicates which path branches from which bridge on the path (bridge 41→bridge 31→bridge 36→bridge 33→terminal 42).

Normally, in a bridge-connected network with STP, there is only one path from the terminal 41 to terminal 42 (terminal 41→bridge 31→bridge 36→bridge 33→terminal 42), and a communication cannot be conducted via other paths.

In the present invention, the detour path which is cut by the blocking port "P2" of the bridge 33 is used to confirm whether or not the desired communication bandwidth can be allocated.

In the present embodiment, five branches are shown. These are [1] a branch connecting the bridge 31 to the bridge 32, [2] a branch connecting the bridge 31 to the bridge 33, [3] a branch connecting the bridge 31 to the bridge 34, [4] a branch connecting the bridge 31 to the bridge 35, and [5] a branch connecting the bridge 33 to the bridge 31 (see FIG. 10).

The terminal 41 adds information on one of the branches indicated in the relay device table 1410 to the bandwidth setting request and retransmits it, that is, create a detour request ICMP packet and outputs it. Here, the added information is the "detour relay device information" (see FIG. 12).

The bridge which has received the detour request ICMP packet with the added detour relay device information transmits the packet to the specified branch.

In other words, by replacing this detour relay device information, up to five detour paths can be searched. Also, multiple pieces of detour relay device information can be specified.

Here, the detour path will be attempted to be allocated using the above-mentioned branch [1]. Naturally, it can be attempted using another path. The determination procedure of a search sequence for the detour path relies on the system.

<[1] Branch Connecting Bridge 31 to Bridge 32>

This detour path cannot be established as it does not lead to the terminal 42.

The following is a brief description.

In this case, the terminal 41 transmits the detour request ICMP packet to the bridge 31 (see a solid arrow (21) in FIG. 5).

The bridge 31 allocates a communication bandwidth between the bridges 31 and 32 and transmits the detour request ICMP packet in order to connect to the bridge 32 (see a solid arrow (22) in FIG. 5).

The bridge 32 receives the detour request ICMP packet, but there is only one relay destination, the terminal 43. Accordingly, the bridge 32 discards this detour request ICMP packet.

The QoS information analysis unit 1300 of the terminal 41 determines that there is no response for the detour request ICMP packet after a predetermined time has passed without receiving a corresponding response packet, detects a timeout accordingly, and transmits a detour request ICMP packet which has next detour relay device information added thereon. As the next detour relay device information, for instance, information specifying the branch [2] which connects the bridge 31 to the bridge 34 can be used.

Also, the communication bandwidth of the wireless 50 allocated between the bridges 31 and 32 is released by the bridge automatically as a data frame is determined not to be transmitted within Inactivity Interval value. As a result, a communication bandwidth allocated for an unnecessary path is released.

<[2] Branch Connecting Bridge 31 to Bridge 33>

Having determined that the path through the branch [1] could not be established, the terminal 42 then attempts with the branch [2] which connects the bridge 31 to the bridge 33.

First, the QoS information analysis unit 1300 of the terminal 41 transmits an instruction to the QoS information creation unit 1700 to create a next detour request ICMP packet.

Having received the instruction, the QoS information creation unit 1700 creates a detour request ICMP packet for the branch path [2] and forwards the created packet to the detour relay device information addition unit 1500.

The detour relay device information addition unit 1500 refers to the relay device information storage unit 1410 and adds thereto the detour relay device information on the branch from the bridge 31 to the bridge 33.

Here, "bridge31MAC" of the relay device address 1411, "P3" of the port number 1412, and "bridge33MAC" of the adjacent relay device address 1414 which all are of the relay device information table 1410 are set to "first detour relay device information", specifically, to "detour device address", "port number", "destination relay device address", respectively. These are pieces of information used for the bridge 31 to connect to the bridge 33.

Following that, the detour request ICMP packet is forwarded to the transmission/reception unit 1100 which then transmits it to the bridge 31 (see a solid arrow (11) in FIG. 5).

<Relay Device: Processing when Detour Request ICMP Packet is Received>

Figure 16:
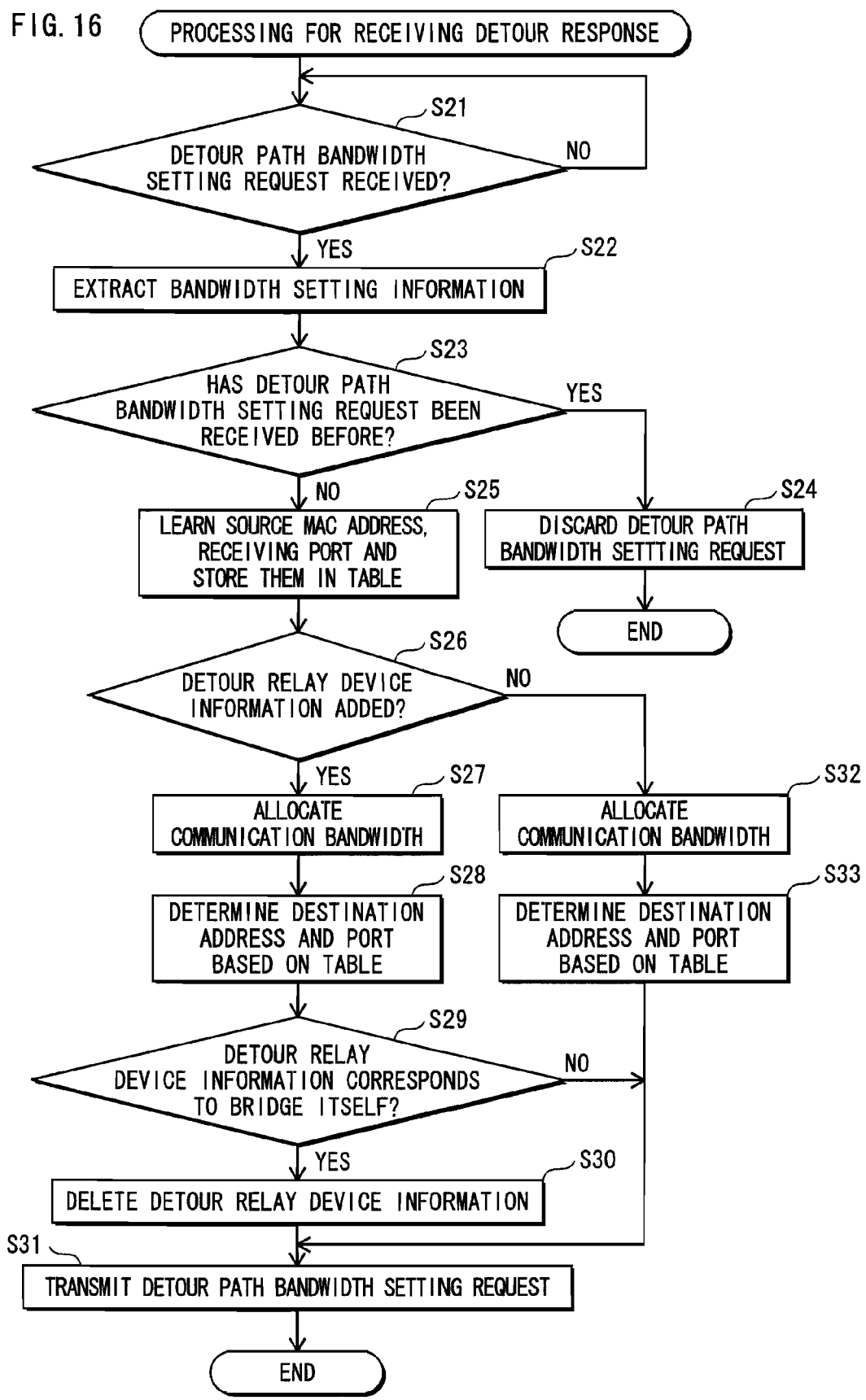
FIG. 16 is a flowchart showing processing when a detour request ICMP packet is received.

Described next with reference to FIG. 16 is a process performed by the bridge 31 upon reception of a detour request ICMP packet. FIG. 16 is a flowchart showing processing when the detour request ICMP packet is received.

The transmission/reception unit 2100 identifies the port which received the detour request ICMP packet (step S21) Here, the port "P1" received it.

After that, the transmission/reception unit 2100 transmits the receiving port number "P1" and the detour request ICMP packet to the QoS information/bandwidth-guaranteed data judgment unit 2200.

The QoS information/bandwidth-guaranteed data judgment unit 2200 then, in order to judge whether or not the received packet is a bandwidth request ICMP packet, refers to the "QoS setting type" (see FIG. 11 and the like), which is "0", and determines the received packet to be a detour request ICMP packet (step S21: YES). The QoS information/bandwidth-guaranteed data judgment unit 2200 then retrieves the "ID" from the received packet and stores it in the bandwidth request ID 2545 (step S22). For instance, it is stored as "detour001"

Here, if this unique identifier already exists in the table (step S23: YES), that is, if "detour001" of the present packet already exists in the bandwidth request ID 2545 of the path information table 2540, the QoS information/bandwidth-guaranteed data judgment unit 2200 discards this detour request ICMP packet based on the judgment this detour path bandwidth setting information has already been received in the past (step S24).

The QoS information/bandwidth-guaranteed data judgment unit 2200 transmits the detour request ICMP packet which is received for the first time and the receiving port number "P1" to the MAC address learning unit 2400 (step S23: NO).

The MAC address learning unit 2400 learns the received receiving port number and the source MAC address and stores, into the source address 2541 and the receiving port number 2542, the receiving port number and the source MAC address in correspondence with the bandwidth request ID 2545 of the path information table 2540 (step S25).

Next, the MAC address learning unit 2400 forwards only the detour request ICMP packet to the bandwidth setting/control unit 2700.

The bandwidth setting/control unit 2700 then makes the detour relay device information judgment subunit 2710 judge whether the forwarded packet has the detour relay device information added thereon or not (step S26).

If the bandwidth setting/control unit 2700 determines that the detour relay device information has not been added, the bandwidth setting/control unit 2700 identifies the desired bandwidth to be allocated included in the packet, allocates the bandwidth as is the case with a normal bandwidth request, and determines the destination address and transmitting port (step S32, step S33; step S4 and step S5 in FIG. 14). When the detour relay device information has not been added, the detour process has been already completed and the normal STP process is performed.

If the bandwidth setting/control unit 2700 determines that the detour relay device information has been added (step S26: YES), the bandwidth setting/control unit 2700 identifies the desired bandwidth to be allocated which is included in the packet. The bandwidth setting/control unit 2700 then allocates the bandwidth in accordance with the added detour relay device information, that is, in accordance with information on the bridge itself, which is included in the detour relay device information if it exists (step S27). Here, the bandwidth setting/control unit 2700 attempts to allocate a communication bandwidth of the wireless 50 between the bridges 31 and 33.

If the communication bandwidth is successfully allocated, the bandwidth setting/control unit 2700 stores, into the guaranteed bandwidth 2547 and the data category 2546, the "transmission rate" and "data category information", which are included in the packet, and forwards the packet to the destination address/port determination unit 2600 without setting any parameter in the "QoS result" (see FIG. 12) in the packet.

Here, "AP001" is set in the data category 2546.

Setting of the data category 2546 and guaranteed bandwidth 2547 is performed only when the communication bandwidth is successfully allocated, that is, the setting is not performed when the attempt to allocate the communication bandwidth failed. In case of a failure, the bandwidth setting/control unit 2700 sets "1" in the "QoS result" of the detour request ICMP packet, which indicates that the bandwidth failed, and forwards the packet to the destination address/port determination unit 2600.

The destination address/port determination unit 2600 refers to the routing table 2520 and determines the destination MAC address and the transmitting port. Also, the destination address/port determination unit 2600 sets the determined destination MAC address and transmitting port in the destination address 2543 and transmitting port number 2544 of the path information table 2540, respectively.

Here, the destination MAC address is the MAC address of the bridge 33, "bridge33MAC", and the transmitting port is "P3" which is a wireless port connecting to the bridge 33 (step S28).

The destination address/port determination unit 2600 forwards the packet to the detour relay device information deletion unit 2800.

The detour relay device information deletion unit 2800 performs the following if the detour relay device information is added to the received packet and the information corresponds to the bridge itself, that is, the MAC address is the same as that of the bridge 33 (step S29): (a) deleting the added detour relay device information (step S30), and (b) forwarding the packet, from which the detour relay device information has been deleted, to the transmission/reception unit 2100 (step S31).

Even in a case where detour relay device information has been added to the received packet, if the detour relay device information does not correspond to the bridge itself, the detour relay device information deletion unit 2800 transfers the packet to the transmission/reception unit 2100 without deleting the destination-specifying information (step S29: NO, step S31).

The transmission/reception unit 2100 transmits this detour request ICMP packet to the wireless 50 (see the solid arrow (12) in FIG. 5).

Having received the detour request ICMP packet, the bridge 33 operates within itself in a similar way to the bridge 31 and transmits the detour request ICMP packet to the terminal 42 (see the solid arrow (13) in FIG. 5).

Here, while the bridge 33 receives the detour request ICMP packet from the blocking port P2, the detour path bandwidth setting request will not be discarded due to the function of the QoS information/bandwidth-guaranteed data judgment unit 2200. That is to say, in the present embodiment, QoS information such as a detour path bandwidth setting request is allowed to be transmitted/received from the blocking port.

In accordance with this structure, the relay device of the present invention provides an advantage of being able to set a detour path from the relay terminal that is connected to the blocking port.

The following is a brief description of a detour path bandwidth setting response.

This operation is the same as the transmission process of the response packet to the bandwidth request ICMP packet, which was described using FIG. 15.

Briefly, the terminal 42 returns a response ICMP packet to the bridge 33 in response to the detour request ICMP packet (see a dotted arrow (14) in FIG. 5). The bridge 33 returns the response ICMP packet to the bridge 31 (see a dotted arrow (15) in FIG. 5), and the bridge 31 returns it to the terminal 41 (see a dotted arrow (16) in FIG. 5).

By performing the above-mentioned processes, the terminals 41 and 42 can allocate, by using a path through the blocking port P2 blocked by the spanning tree protocol, the communication bandwidth of the path (terminal 41-bridge 31-bridge 33-terminal 42).

<Relay Device Processing when Bandwidth-Guaranteed Data Frame is Received>

Figure 17:
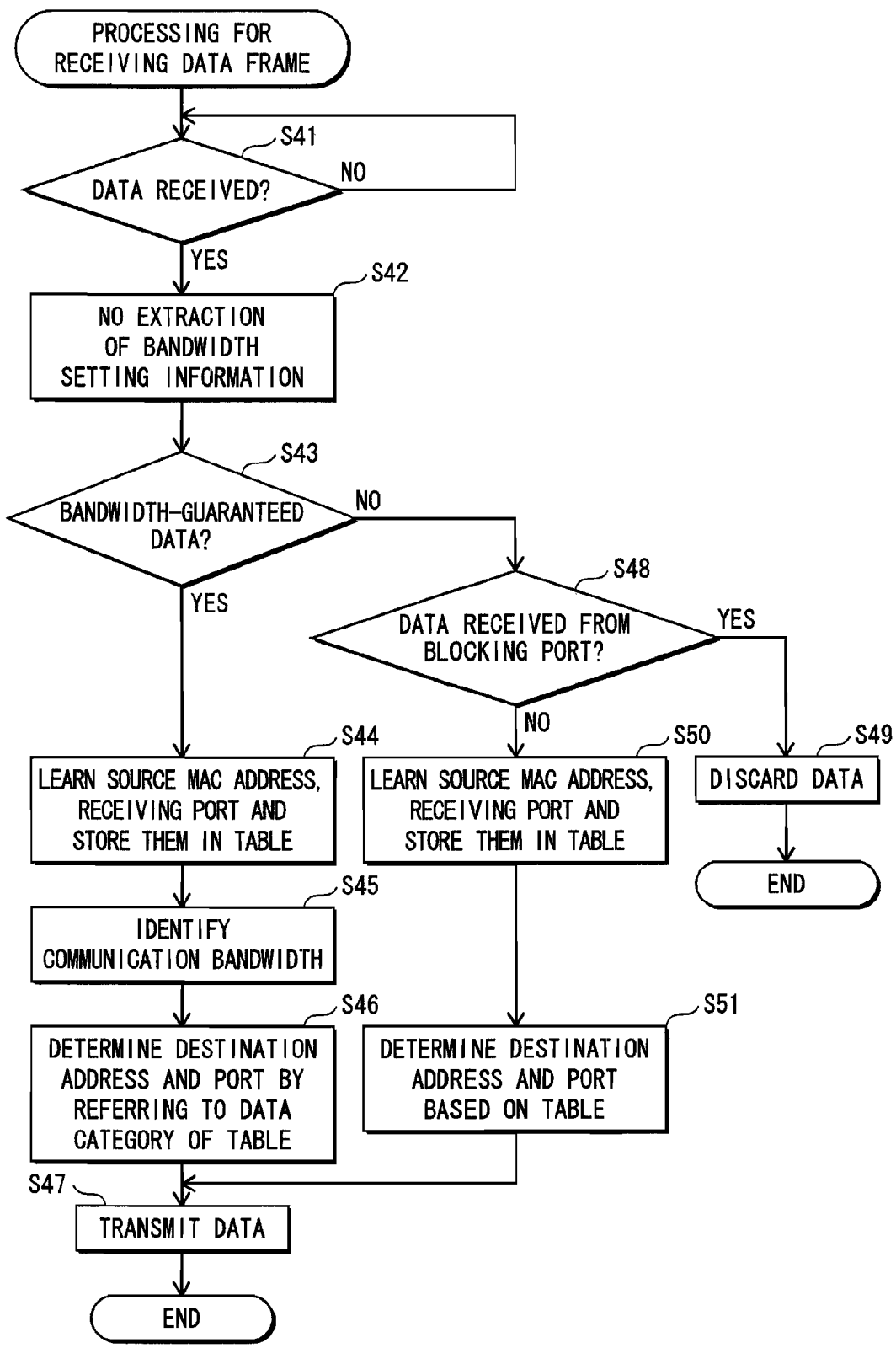
FIG. 17 is a flowchart showing processing by a bridge when a data frame is received.

Described below with reference to FIG. 17 is a data transmission through the path between the terminal 41 that functions as the Destination terminal and the terminal 42 that functions as the Source terminal (41-31-33-42), for which the communication bandwidth has been allocated.

FIG. 17 is a flowchart showing processing by a bridge when a data frame is received.

The terminal 42 transmits data to the bridge 33 (see a bold arrow (31) in FIG. 6).

The transmission/reception unit 2100 of the bridge 33 identifies which port received the data. Here, the port "P1" received the data (step S41).

After that, the transmission/reception unit 2100 transmits this receiving port number and the data frame to the QoS information/bandwidth-guaranteed data judgment unit 2200.

The QoS information/bandwidth-guaranteed data judgment unit 2200 determines that the received data is not ICMP data, based on the protocol of the IP header (step S42), and determines whether or not the data is bandwidth-guaranteed data by searching the data category 2546 of the path information table 2540 of the connection information storage unit 2500.

If the data category 2546 includes the "data category" in the IP header of the data frame, the QoS information/bandwidth-guaranteed data judgment unit 2200 determines that the data is bandwidth-guaranteed data (step S43: YES).

when the data is bandwidth-guaranteed data, the QoS information/bandwidth-guaranteed data judgment unit 2200 transmits the data frame and the receiving port number to the MAC address learning unit 2400.

The MAC address learning unit 2400 learns the received receiving port number and the source MAC address of the data frame and stores them into the receiving port number 2542 and the source address 2541 of the path information table 2540, respectively (step S44).

Next, the MAC address learning unit 2400 forwards the data frame to be bandwidth-guaranteed to the bandwidth setting/control unit 2700 which then identifies the communication bandwidth to be allocated by referring to the guaranteed bandwidth 2547 of the path information table 2540 and forwards the data frame to the destination address/port determination unit 2600 (step S45).

Upon reception of the data frame to be bandwidth-guaranteed, the destination address/port determination unit 2600 determines the destination MAC address and transmitting port based on the data category 2546 of the path information table 2540 (step S45) and transmits the data frame via the transmission/reception unit 2100 (step S46, a bold arrow (32) in FIG. 6).

Upon reception of the data, the bridge 31 operates within itself in a similar way to the above-mentioned way and transmits the data to the terminal 41 (a bold arrow (33) in FIG. 6).

On the other hand, when the data category 2546 does not contain the "data category" in the IP header of the received data frame, the QoS information/bandwidth-guaranteed data judgment unit 2200 determines that the data is not to be bandwidth-guaranteed, and transmits the data frame and the receiving port information to the B/P reception data discard unit 2300.

The B/P reception data discard unit 2300 (a) discards the received data (step S49) if the receiving port number is a blocking port (step S48: YES), and (b) transmits the data frame and receiving port information to the MAC address learning unit 2400 if the receiving port number is not a blocking port (step S48: NO).

The MAC address learning unit 2400 learns the source MAC address and the receiving port, stores them in the routing table 2520, and transmits the data to the destination address/port determination unit 2600.

The destination address/port determination unit 2600 determines the destination address and port (step S51) and transmits the data via the transmission/reception unit 2100 (step S47).

As described above, in a case where the terminal 42 that functions as the Source terminal transmits data to the terminal 41 that functions as the Destination terminal, even when the only path established by the spanning tree protocol (terminal 42-bridge 33-bridge 36-bridge 31-terminal 41) cannot provide a bandwidth-guaranteed transmission due to lack of communication bandwidth, a bandwidth-guaranteed transmission becomes possible by passing through the above-mentioned path (terminal 42-bridge 33-bridge 31-terminal 41).

In other words, in the present invention, QoS information such as a bandwidth setting request or a detour path bandwidth setting request creates a path information table 2540 of each relay bridge, thereby allowing each relay bridge to transmit only data which is to be bandwidth-guaranteed with use of a detour path based on respective information tables 2540.

That is to say, in the present embodiment, only bandwidth-guaranteed data is allowed to be transmitted through a detour path by referring to the data category 2546 created based on QoS information such as a bandwidth setting request or detour path bandwidth setting request. By using a structure in which only the registered data can be transmitted/received from a blocking port, a detour path using the blocking port can be established.

<Modification>

Here, a description will be given on an example of specifying multiple pieces of detour relay device information, that is, establishing a detour path using a bridge which is not on a STP path, with reference to FIGS. 18 and 19.

<Path of Bandwidth Request ICMP Packet>

Figure 18:
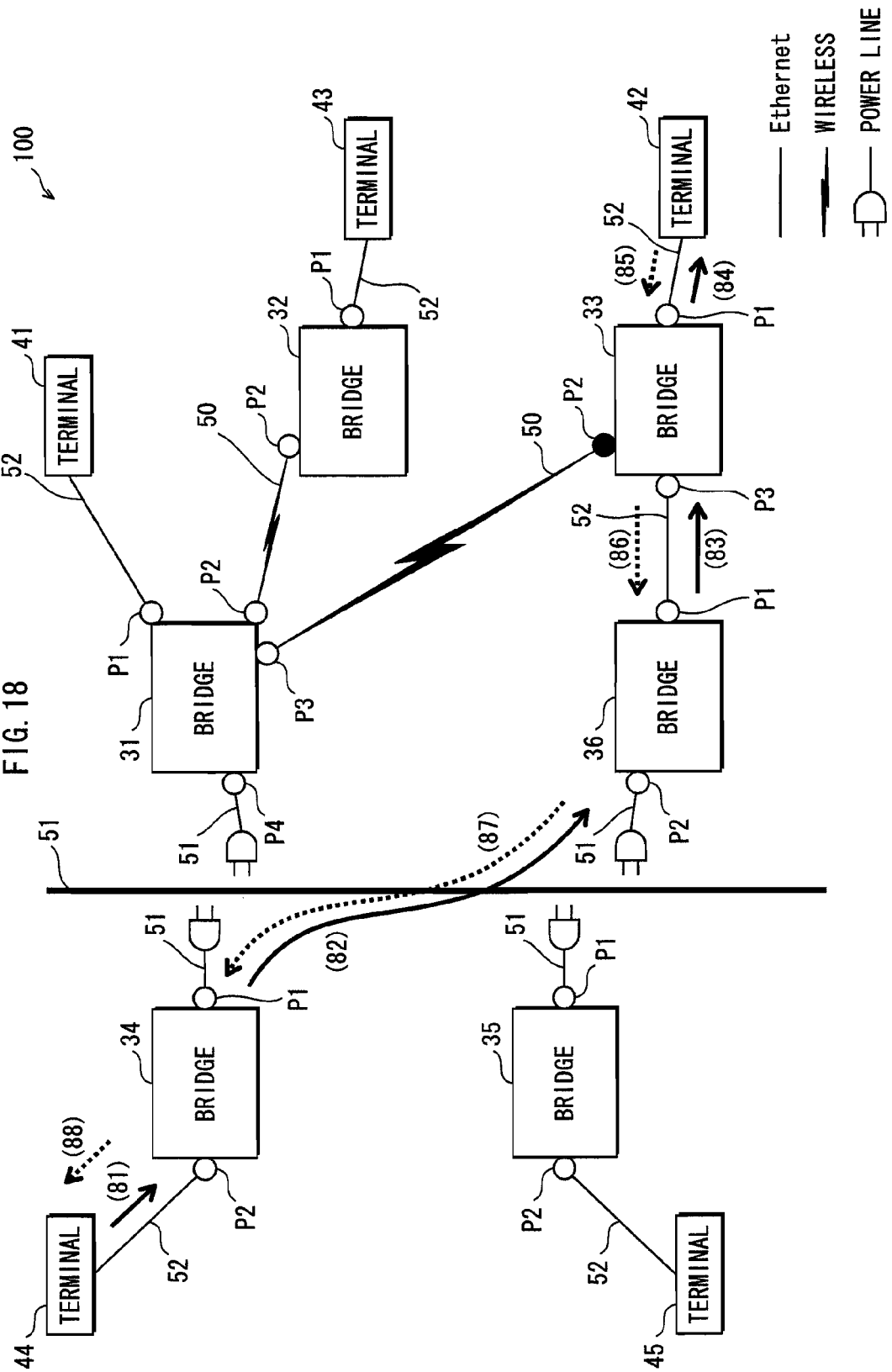
FIG. 18 shows a communication flow of the bandwidth setting request from a terminal 44 to the terminal 42.

FIG. 18 shows a communication flow of the bandwidth setting request from a terminal 44 to the terminal 42.

The bandwidth request ICMP packet passes through the following path, as shown by solid arrows (81) to (84): terminal 44→bridge 34→bridge 36→bridge 33→terminal 42.

Also, as shown by dotted arrows (85) to (88), a response ICMP packet corresponding to the above-mentioned packet is returned as follows: terminal 42→bridge 33→bridge 36→bridge 34→terminal 44.

<Path of Detour Request ICMP Packet>

Figure 19:
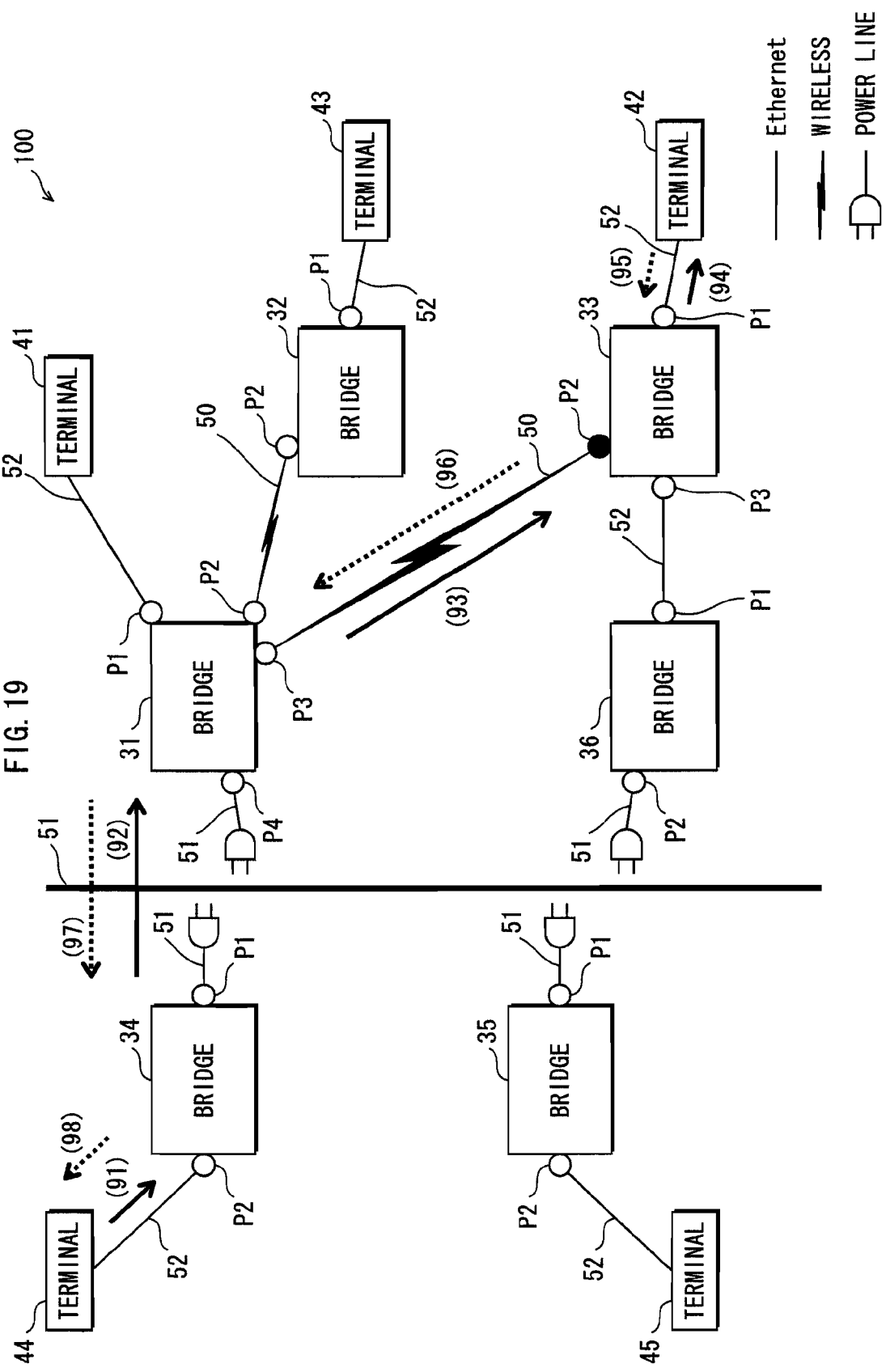
FIG. 19 shows a communication flow of a detour request from the terminal 44 to the terminal 42.

FIG. 19 shows a communication flow of a detour request from the terminal 44 to the terminal 42.

The path indicated by solid arrows (91) to (94) shows how the detour request ICMP packet establishes a detour path from the terminal 44 through the port "P1" of the bridge 34 and "P3" of the bridge 31.

When a bandwidth could not be allocated on the STP path, the terminal 44 adds, to the detour request ICMP packet, "detour relay device information" which specifies that the packet goes through the bridges 34 and 31, and transmits the detour request ICMP packet to the bridge 34 (see a solid arrow (91)).

For the "first detour relay device information", specifically, "bridge34MAC", "P1", and "bridge31MAC" are set to the "detour relay device address", "port number", and "destination relay device address", respectively; and for the "second detour relay device", specifically, "bridge31MAC", "-", and "bridge33MAC" are set to the "detour relay device address", "port number", and "destination relay device address", respectively. The sign "-" in the "port number" indicates that the transmitting port for the "destination relay device address" is unknown. This is because the relay device information table 1410 does not have information regarding this bridge 33, as it is not on the STP path.

Having received the detour request ICMP packet from the terminal 44, the bridge 34 forwards the packet from the port "P1" of the "port number" to the bridge "bridge31MAC" of the "destination relay device address" in accordance with the "first detour relay device information" whose "detour relay device address" is "bridge34MAC" (see a solid arrow (92)).

Having received the packet, the bridge 31 forwards the packet in accordance with the "second detour relay device information" whose "detour relay device address" is "bridge31MAC".

However, since "-" is set in the "port number", the bridge 31 determines the port number connecting to "bridge33MAC" of the "destination relay device address" by referring to the routing table 2520 in the bridge 31 itself, and forwards the packet (see a solid arrow (93)). If the table does not contain the corresponding port number, the bridge 31 forwards the packet to all ports except the receiving port.

Having received the packet, the bridge 33 forwards the received packet to the terminal 42 (see a solid arrow (94)).

Also, as indicated by dotted arrows (95) to (98), a response ICMP packet corresponding to the above-mentioned detour request ICMP packet is returned as follows: terminal 42→bridge 33→bridge 31→bridge 34→terminal 44.

<Transmission path of Bandwidth-Guaranteed Data>

On the detour path, a data frame of bandwidth-guaranteed data is transmitted as follows: terminal 42→bridge 33→bridge 31→bridge 34→terminal 44.

Second Embodiment

In the first embodiment, when a bandwidth-guaranteed path cannot be established, the terminal device which sent the bandwidth request ICMP packet creates and transmits a detour request ICMP packet to search a detour path.

In the present embodiment, unlike in the first embodiment, it is not the terminal device but a relay device on the path which searches a detour path.

In the present embodiment, when QoS (bandwidth-guaranteed) communication cannot be maintained due to a deterioration of a transmission path from the relay device itself or the like, a relay device establishes a detour path and switches the transmission path to the detour path so that QoS communication can be continuously used.

By switching to the detour path, it becomes possible to continuously provide a high-quality transmission for the user.

Also, when the relay device is set to automatically start establishing a detour path and to switch to the detour path, equipment on the user side does not need to be operated or controlled. Consequently, an advantageous effect of the present invention can be obtained simply by implementing an additional new function to the relay device.

<Outline>

When a relay device of the present embodiment detects a deterioration in a path quality, the relay device which has detected the deterioration transmits a bandwidth request ICMP packet and secures a path.

The bandwidth request ICMP packet transmitted by this relay device (hereinafter, referred to as "pseudo request ICMP packet") makes use of the bandwidth request ICMP packet transmitted by the terminal device to establish the first path.

<Structure>

Figure 20:
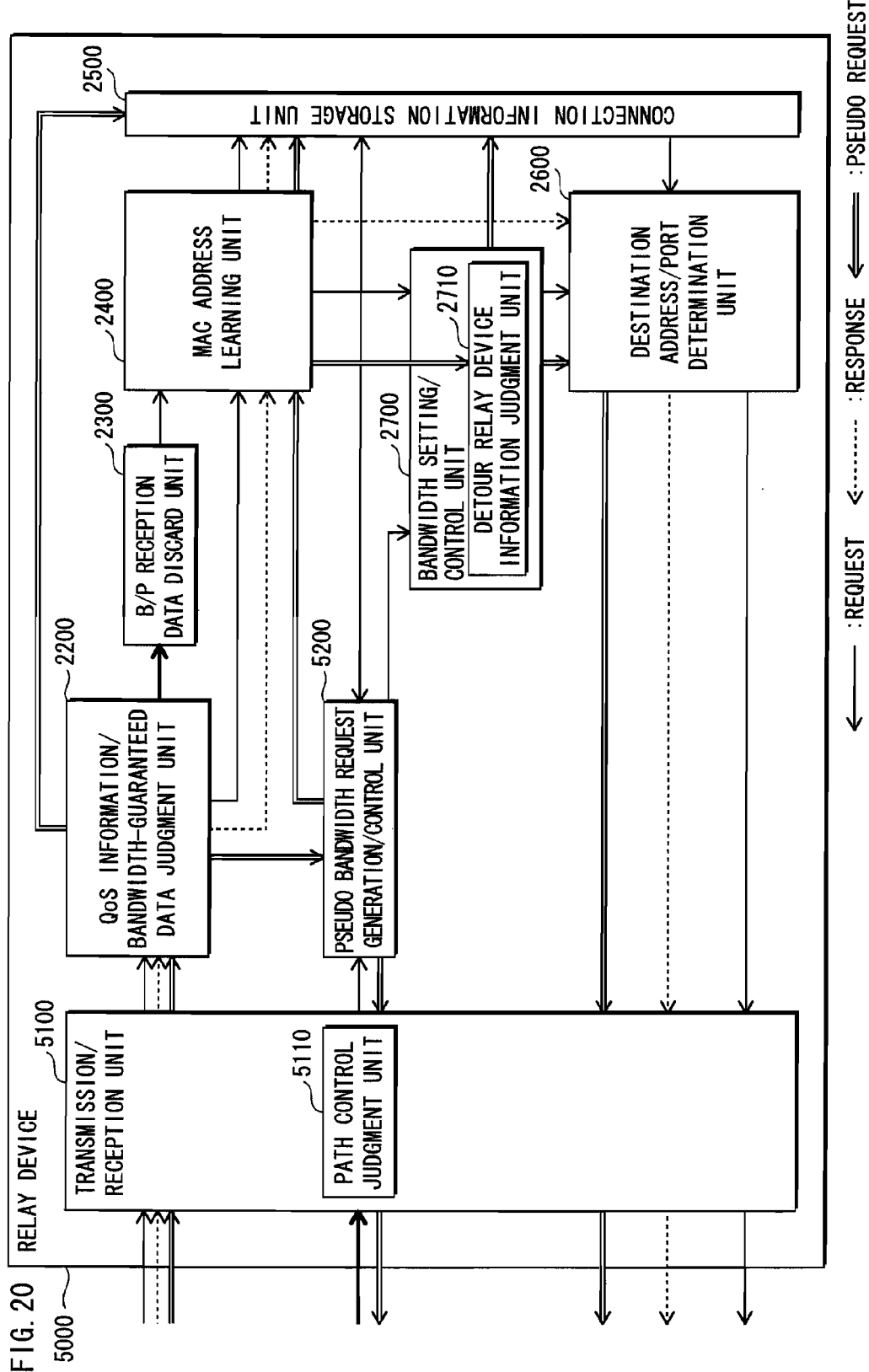
FIG. 20 shows an exemplary structure of a bridge 5000 of a second embodiment.

FIG. 20 shows an exemplary structure of a bridge 5000 of the second embodiment. The terminal device of the present embodiment is a terminal device which performs a normal bandwidth-guaranteed communication.

While the bridge 5000 has nearly the same functions as the bridge 2000 of the first embodiment, the bridge 5000 is different from the bridge 2000 in the following three aspects. Here, only the differences will be described.

Firstly, a transmission/reception unit 5100 includes a path control judgment subunit 5110, and secondly, the bridge 5000 includes a pseudo bandwidth request generation/control unit 5200.

And thirdly, the bridge 5000 does not include a bandwidth setting/control unit 2700 and a detour relay device information deletion unit 2800. This is because the relay device itself searches a path, making it unnecessary for the terminal to collect information on a relay device on the path.

The path control judgment subunit 5110 detects such as whether or not the set QoS (bandwidth guarantee) has been maintained and determines whether or not the path needs to be switched to another path. When the path control judgment subunit 5110 determines that there is a need to switch to another path, it notifies the pseudo bandwidth request generation/control unit 5200 accordingly.

The pseudo bandwidth request generation/control unit 5200 generates and manages a pseudo request ICMP packet used in the present embodiment.

Figure 21:
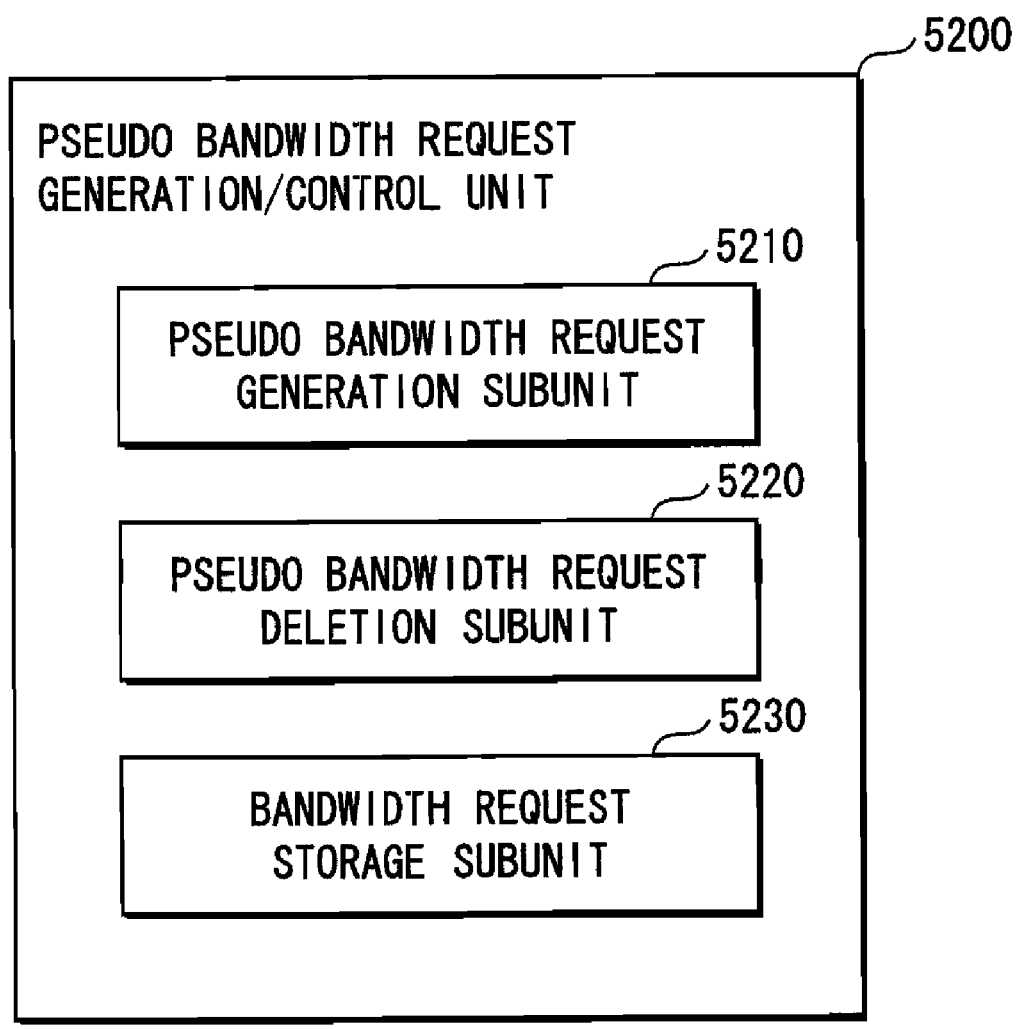
FIG. 21 shows an exemplary structure of a pseudo bandwidth request generation/management unit 5200.

FIG. 21 shows an exemplary structure of the pseudo bandwidth request generation/management unit 5200.

The pseudo bandwidth request generation/control unit 5200 includes a pseudo bandwidth request generation subunit 5210, a pseudo bandwidth request deletion subunit 5220, and a bandwidth request storage subunit 5230.

The pseudo bandwidth request generation subunit 5210, under a direction from the path control judgment subunit 5110, generates a pseudo request ICMP packet based on the bandwidth request ICMP packet stored in the bandwidth request storage subunit 5230.

The pseudo request ICMP packet is an ICMP dummy packet generated by a bridge. A bridge does not have an IP layer, and cannot generate IP packets such as ICMP on its own. Therefore, a structure of an ICMP packet which has been pre-stored in the bandwidth request storage subunit 5230 is used to generate the pseudo request ICMP packet.

Upon reception of a response ICMP packet corresponding to a pseudo request ICMP packet, the pseudo bandwidth request deletion subunit 5220 determines whether or not the response ICMP packet corresponds to the pseudo request ICMP packet the bridge itself created and transmitted, and deletes the response ICMP packet if the response packet corresponds to the packet it created.

The bandwidth request storage subunit 5230 stores a bandwidth request ICMP packet created and transmitted by the terminal device.

<Network System>

A network system used to describe the present embodiment is similar in structure to that of the first embodiment.

First, a communication flow will be described using FIGS. 22 to 25.

<Path of Bandwidth Request ICMP Packet>

Figure 22:
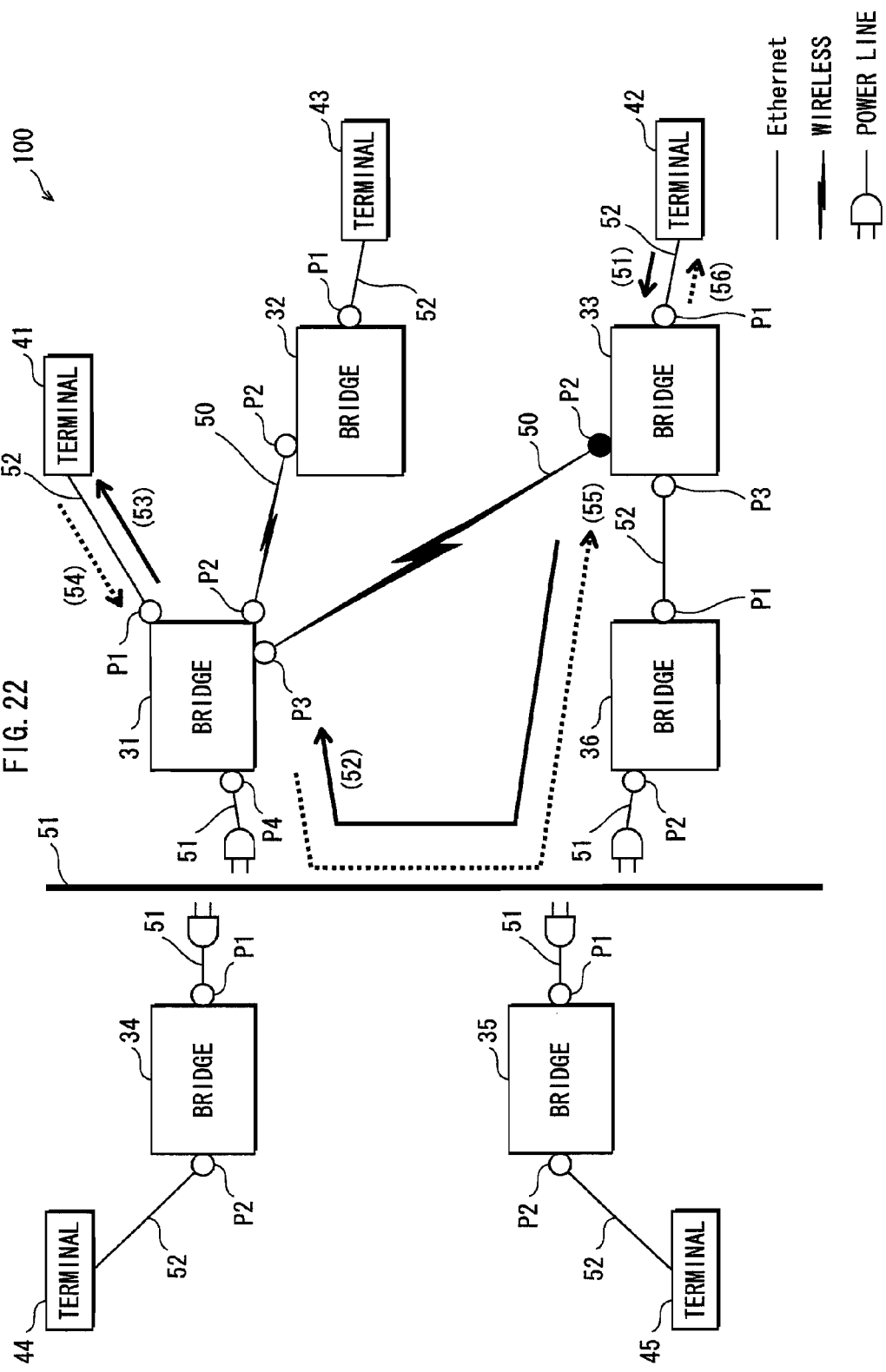
FIG. 22 shows a communication flow of bandwidth setting request from the terminal 42 to the terminal 41.

FIG. 22 shows a communication flow of bandwidth setting request from the terminal 42 to the terminal 41.

As shown by solid arrows (51) to (53), a bandwidth request ICMP packet passes through the following path: terminal 42→bridge 33→bridge 36→bridge 31→terminal 41.

Also, as shown by dotted arrows (54) to (56), a response ICMP packet corresponding to the above packet is returned as follows: terminal 42→bridge 33→bridge 36→bridge 31→terminal 41.

Figure 23:
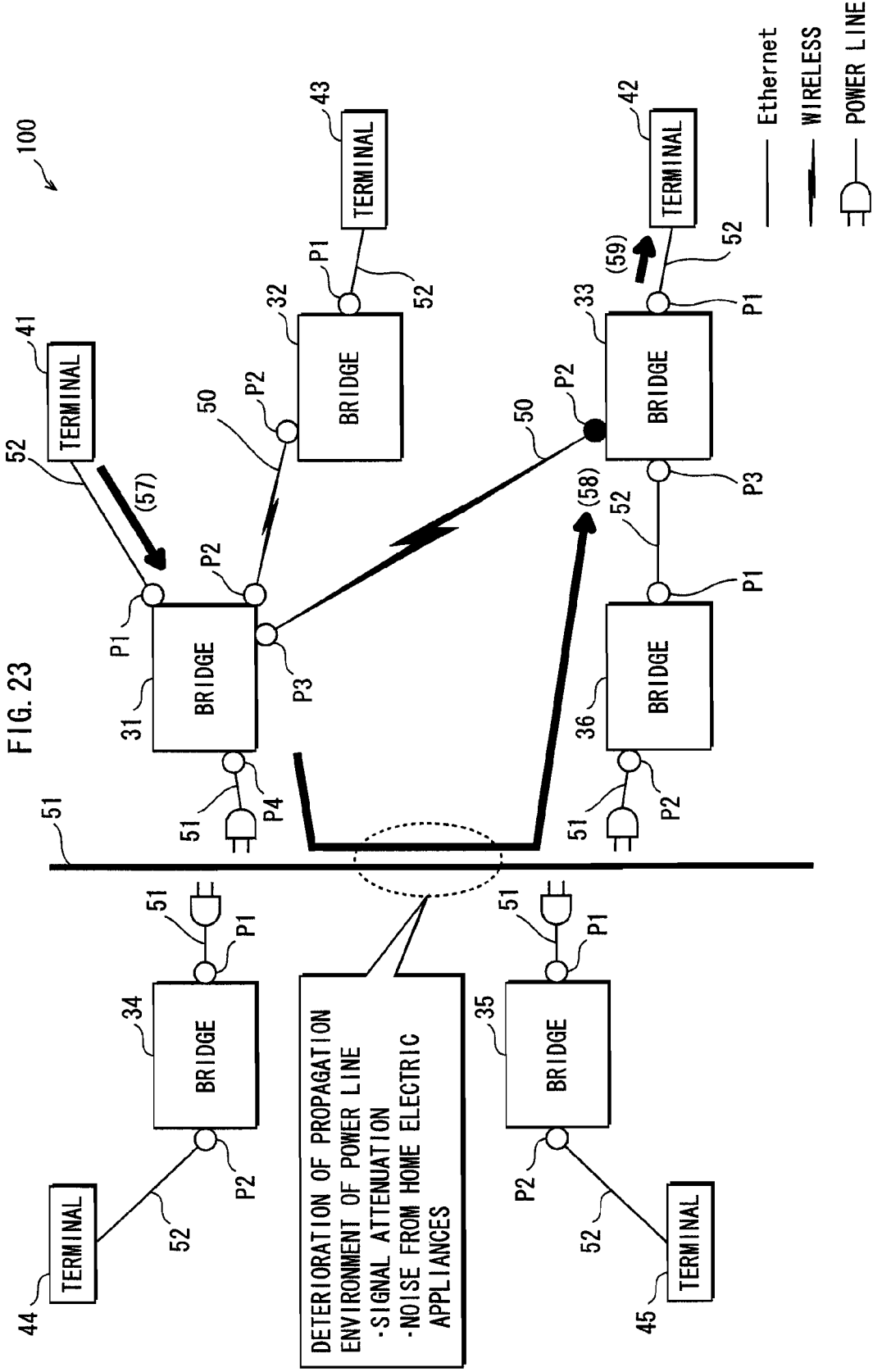
FIG. 23 shows a communication flow of bandwidth-guaranteed data from the terminal 41 to the terminal 42.

FIG. 23 shows a communication flow of bandwidth-guaranteed data from the terminal 41 to the terminal 42.

On the detour path, a data frame of bandwidth-guaranteed data is sent in the following order, as shown by bold arrows (57) to (59): terminal 41→bridge 31→bridge 36→bridge 33→terminal 42.

It is assumed that a communication quality of the path between the bridges 31 and 36 has deteriorated while transmitting bandwidth-guaranteed data.

The communication quality deteriorates, for example, when noise from a household electric product using an AC power source is incorporated into the power line 51, deteriorating a transmission environment of the power line 51, with packet errors occurring frequently.

The bridge 31 detects the deterioration of the communication quality and searches a detour path. The bridge 31 can detect the deterioration by detecting an increased number of retransmissions. Or, for instance, the deterioration can be detected by the bridge 31 as a result of a notification sent to the bridge 31 from the bridge 36, which calculates a packet error rate.

<Path of Pseudo Request ICMP Packet>

Figure 24:
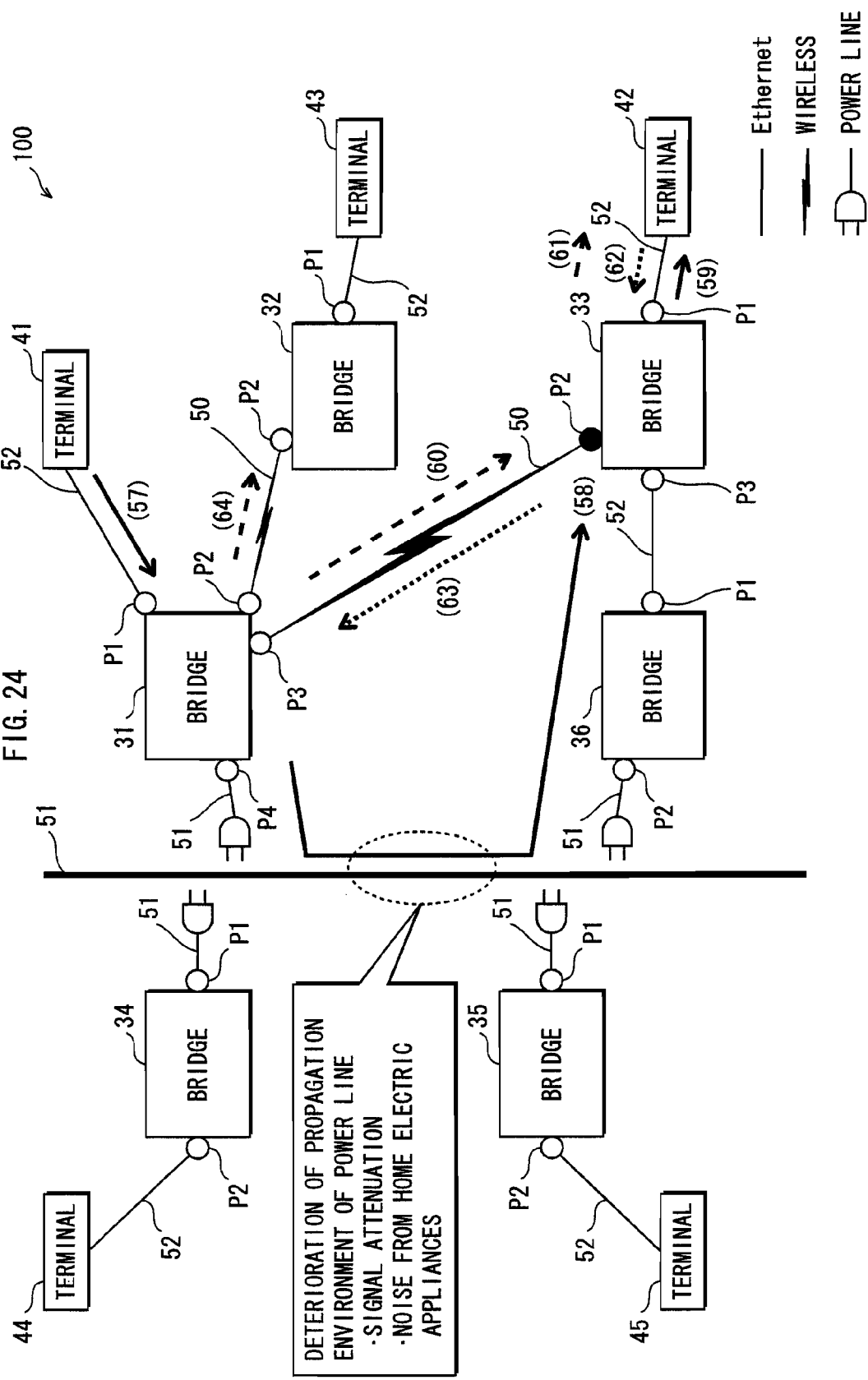
FIG. 24 shows a communication flow of a pseudo request from a bridge 31 to a bridge 33.

FIG. 24 shows a communication flow of a pseudo request from a bridge 31 to a bridge 33.

In a search for a detour from the port "P3" of the bridge 31, the pseudo request ICMP packet is routed from the bridge 31→bridge 33, as indicated by a dotted arrow (60).

And, a response ICMP packet corresponding to the above-mentioned packet is returned from the bridge 33→bridge 31, as indicated by a dotted arrow (63).

A search for a detour from the port "P2" of the bridge 31 (dotted arrow (64)) fails, and as a result, a response ICMP will not be returned.

Figure 25:
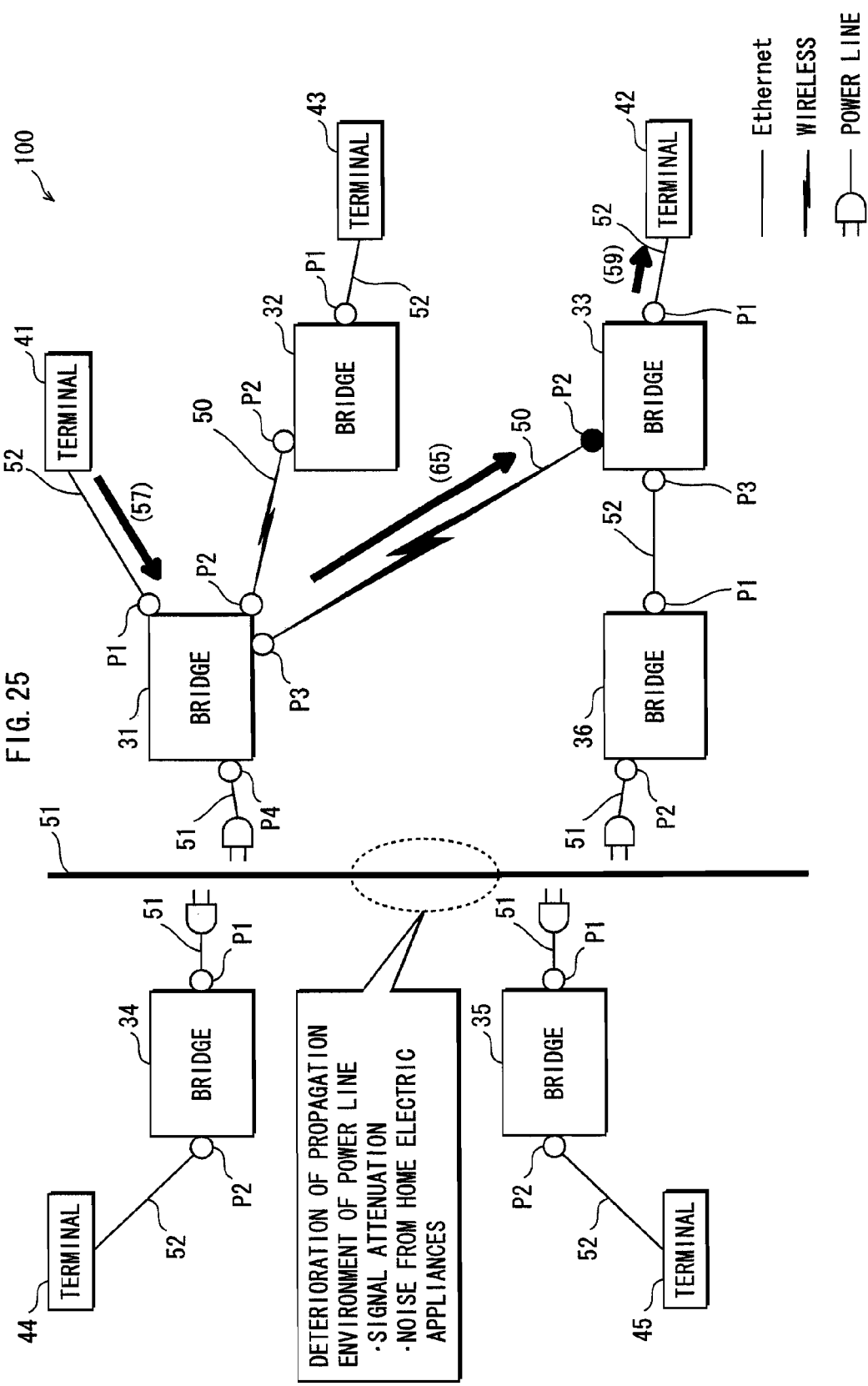
FIG. 25 shows a communication flow of bandwidth-guaranteed data from the terminal 41 to the terminal 42.

FIG. 25 shows a communication flow of bandwidth-guaranteed data from the terminal 41 to the terminal 42.

In a detour path, a data frame of bandwidth-guaranteed data is sent in the following order, as shown by bold arrows (57), (65), and (59): terminal 41→bridge 31→bridge 33→terminal 42.

<Data>

A table stored in the connection information storage unit 2500 of each relay device 5000 is the same as that of the first embodiment (see FIG. 7 and the like). It should be noted, however, that the bandwidth request ID 2545 of the path information table 2540 is set with a pseudo packet identifier 7200, which will be described later (see FIG. 26).

It should be also noted that the relay device information table 1410 is not stored in the terminal, as the terminal device does not have functional features unique to the present invention.

<Pseudo Request ICMP Packet>

Figure 26:
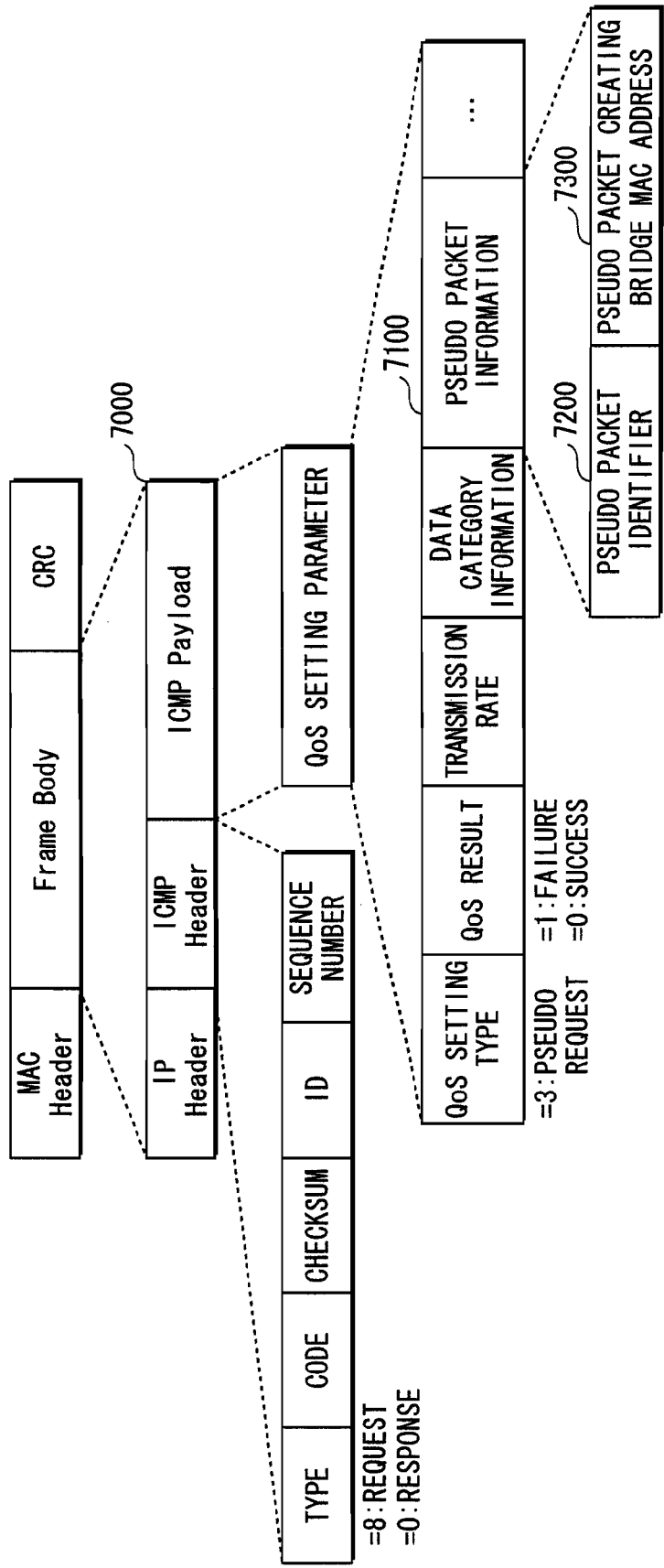
FIG. 26 shows an exemplary structure of a pseudo request ICMP packet 7000.

FIG. 26 shows an exemplary structure of a pseudo request ICMP packet 7000.

The structure of the pseudo request ICMP packet 7000 is almost the same as that of the bandwidth request ICMP packet 3100 of the first embodiment.

One difference is that while "relay device information" is added to the bandwidth request ICMP packet 3100 every time the packet 3100 passes through a bridge, for the pseudo request ICMP packet 7000, pseudo packet information 7100, which indicates that the present ICMP packet is a pseudo request ICMP packet and which bridge created the present packet, is added.

Also, another difference is that the "data category information" is not set by the terminal device. This is because that the bandwidth request ICMP packet of the present invention is transmitted from a regular terminal device, and the "data category information" is created and set by a bridge.

Note that "3" being set in the "QoS setting type" indicates that the present packet is a pseudo request ICMP packet.

The pseudo packet information 7100 includes the pseudo packet identifier 7200 and a pseudo packet creating bridge MAC address 7300.

The pseudo packet identifier 7200 is an identifier arbitrarily determined by the bridge which created the pseudo request ICMP packet, and the pseudo packet creating bridge MAC address 7300 is a MAC address of the bridge which created the pseudo request ICMP packet.

The pseudo packet information 7100 makes it possible to determine which bridge created the pseudo ICMP packet and which pseudo request packet the present pseudo ICMP packet is.

It should be noted that while a pseudo bandwidth request ICMP packet is called "pseudo" as it is created by a bridge, functions of the ICMP itself are the same as those of the packet created and transmitted by a terminal, an original IP terminal.

<Operations>

Next, operations by the network system of the present embodiment for ensuring a detour path will be described using FIGS. 27 to 30.

<Terminal Device: Process of Transmitting Bandwidth Request ICMP Packet>

This process is the same as the process normally performed by the terminal device when requesting a bandwidth, and is the same as that in the first embodiment.

The terminal 42 transmits a bandwidth request ICMP packet to the bridge 33 (see a solid arrow (51) in FIG. 22). This bandwidth request ICMP packet is the same as the packet shown in FIG. 11 except that it does not include the "data category information" and "relay device information".

<Relay Device: Processing when Bandwidth Request ICMP Packet is Received>

Figure 27:
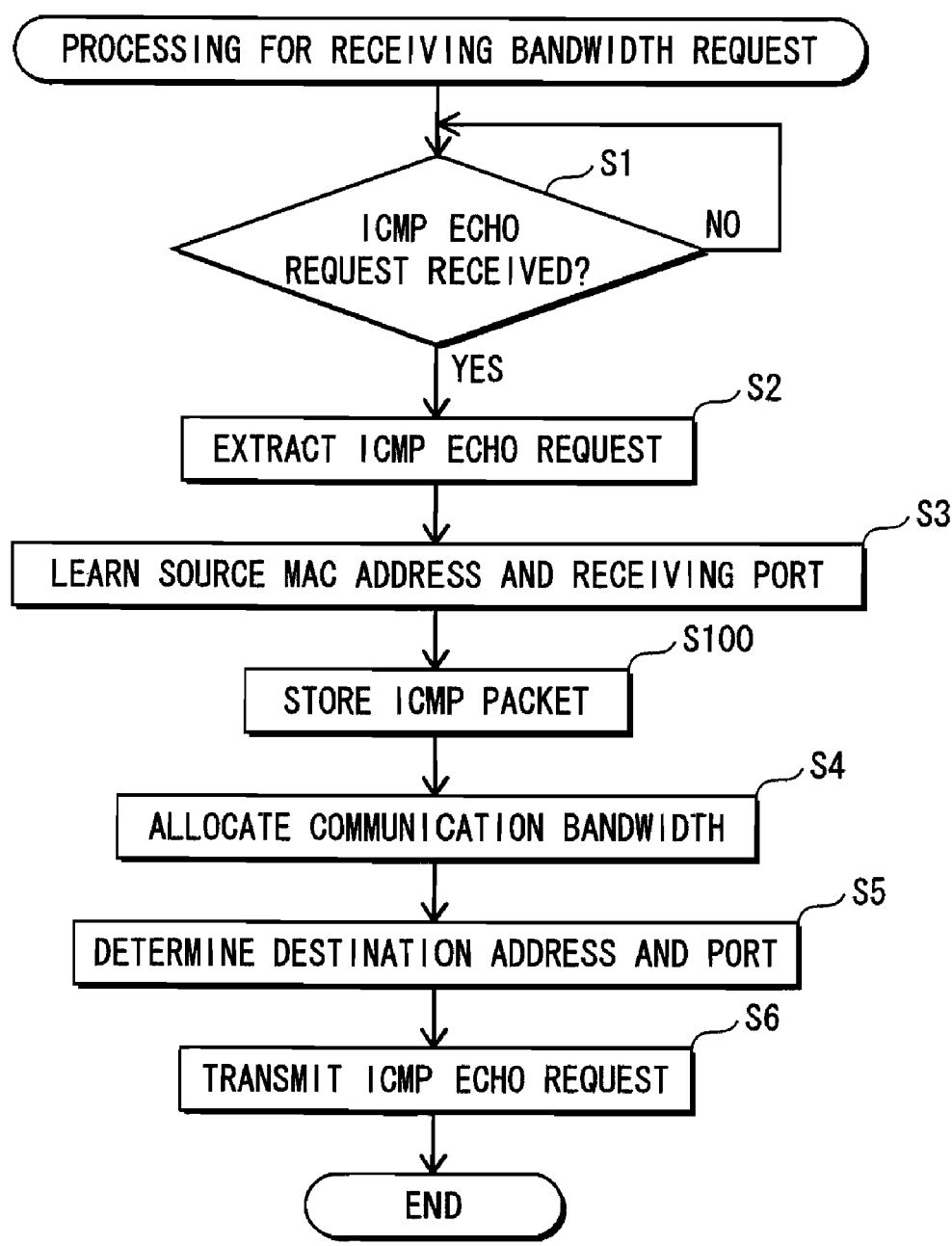
FIG. 27 is a flowchart showing processing when a bandwidth request ICMP packet is received.

FIG. 27 is a flowchart showing processing when a bandwidth request ICMP packet is received.

The process performed upon receiving the bandwidth request ICMP packet is approximately the same as the process performed by the bridge of the first embodiment, as shown in FIG. 14. A difference is that the QoS information/bandwidth-guaranteed data judgment unit 2200 stores the received bandwidth request ICMP packet into the bandwidth request storage subunit 5230 (step S100).

Other steps S1 to S6 are the same as those in the process described using FIG. 14.

<Relay Device: Pseudo Request ICMP Packet Generation Process>

Figure 28:
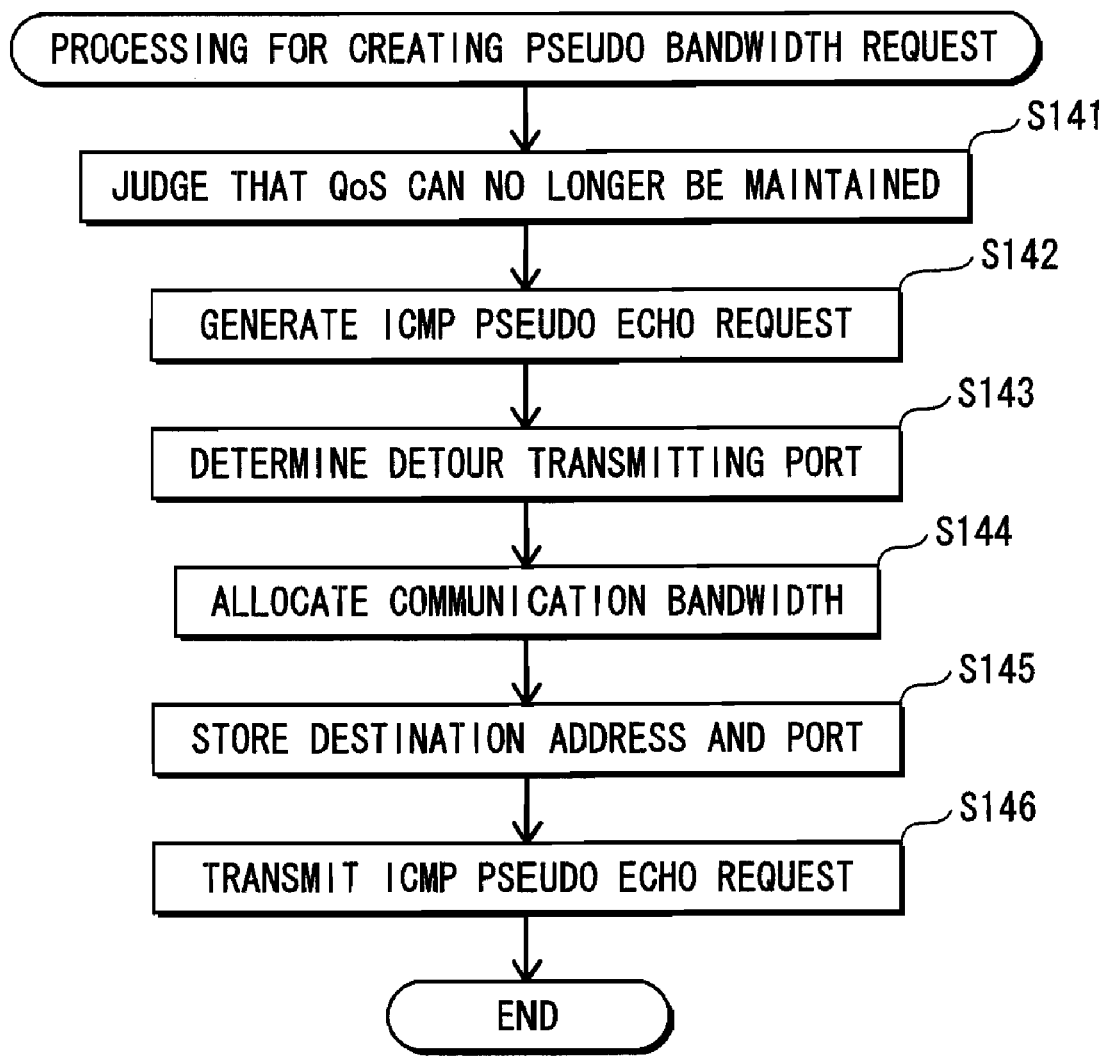
FIG. 28 is a flowchart showing a generating process of a pseudo request ICMP packet.

FIG. 28 is a flowchart showing a generating process of a pseudo request ICMP packet.

If the path control judgment subunit 5110 detects a deterioration of a communication quality while transmitting bandwidth-guaranteed data (step S141) and determines that the bandwidth cannot be guaranteed, the path control judgment subunit 5110 requests the pseudo bandwidth request generation/management unit 5200 to search a detour path.

Here, as shown in FIG. 23, it is assumed that the communication from the bridge 31 to the bridge 36 deteriorated.

The bridge 31 determines that QoS guarantee cannot be maintained despite the fact that the bandwidth is allocated and the data transmission is bandwidth-guaranteed, due to the deterioration of the transmission environment of the power line 51.

Upon receiving the request, the pseudo bandwidth request generation/management unit 5200 instructs the pseudo bandwidth request generation subunit 5210 to perform a generation.

Upon receiving the request, the pseudo bandwidth request generation subunit 5210 generates a pseudo request ICMP packet by adding the pseudo packet information 7100 to the bandwidth request ICMP packet stored in the bandwidth request storage subunit 5230 (step S142). For the pseudo packet identifier 7200 of the pseudo packet information 7100, an arbitrary value is set as an identifier, and "bridge31MAC" is set in the pseudo packet creating bridge MAC address 7300.

The arbitrary value set to the pseudo packet identifier 7200 is stored in the bandwidth request ID 2545.

Following that, the pseudo request ICMP packet is transmitted to ports which are not currently sending out a data frame.

These ports can be blocking ports or forwarding ports. This is because in the present embodiment, an ICMP packet can be transmitted/received regardless of whether the port is a blocking port or a forwarding port.

Specifically, the bridge 31 transmits the packet to a port other than the receiving port P1 and transmitting port P4, that is, to either the port P2 or port P3. The bridge 31 selects one of these at random (step S143).

After the step S143, the pseudo bandwidth request generation/management unit 5200 forwards the created pseudo request ICMP packet to the bandwidth setting/control unit 2700. The bandwidth setting/control unit 2700 then attempts to allocate a communication bandwidth for the desired bandwidth specified by the "transmission rate" (see FIG. 26) between the bridge 31 and the bridge which is connected to the selected port (step S144).

First, the bandwidth setting/control unit 2700 attempts to allocate a bandwidth between the bridge 32 and the wireless link, using the port P2. Here, it is assumed that the bandwidth to the bridge 32 could not be allocated.

Next, the bandwidth setting/control unit 2700 attempts to allocate a bandwidth to the bridge 33 using the port P3.

Here, a description will be given on a case where the bandwidth is successfully allocated with use of the port P3.

The result that the desired bandwidth is allocated is reflected by setting the "QoS result" of the packet accordingly, that is, "0" is set therein, and a unique identifier including the IP address and port number (transport layer) of both the Source terminal and Destination terminal is set to the "data category information".

Additionally, the bandwidth setting/control unit 2700 transmits the packet to the destination address/port determination unit 2600 after storing the "transmission rate" and "data category information" included in the packet to the guaranteed bandwidth 2547 and data category 2546 of the path information table 2540, respectively.

Having received the packet, the destination address/port determination unit 2600 refers to the adjacent information table 2530 of the connection information storage unit 2500 to determine the destination MAC address and transmitting port, and stores them in the destination address 2543 and transmission pot number 2544 of the path information table 2540, respectively (step S145). Here, the transmitting port is "P3", and "bridge33MAC" in the adjacent relay device address 2533, which corresponds to "P3" in the port number 2531, is set to the destination MAC address.

Following the above process, the destination address/port determination unit 2600 transmits the packet via the transmission/reception unit 5100 (step S146).

<Relay Device: Processing when Pseudo Request ICMP Packet is Received>

Figure 29:
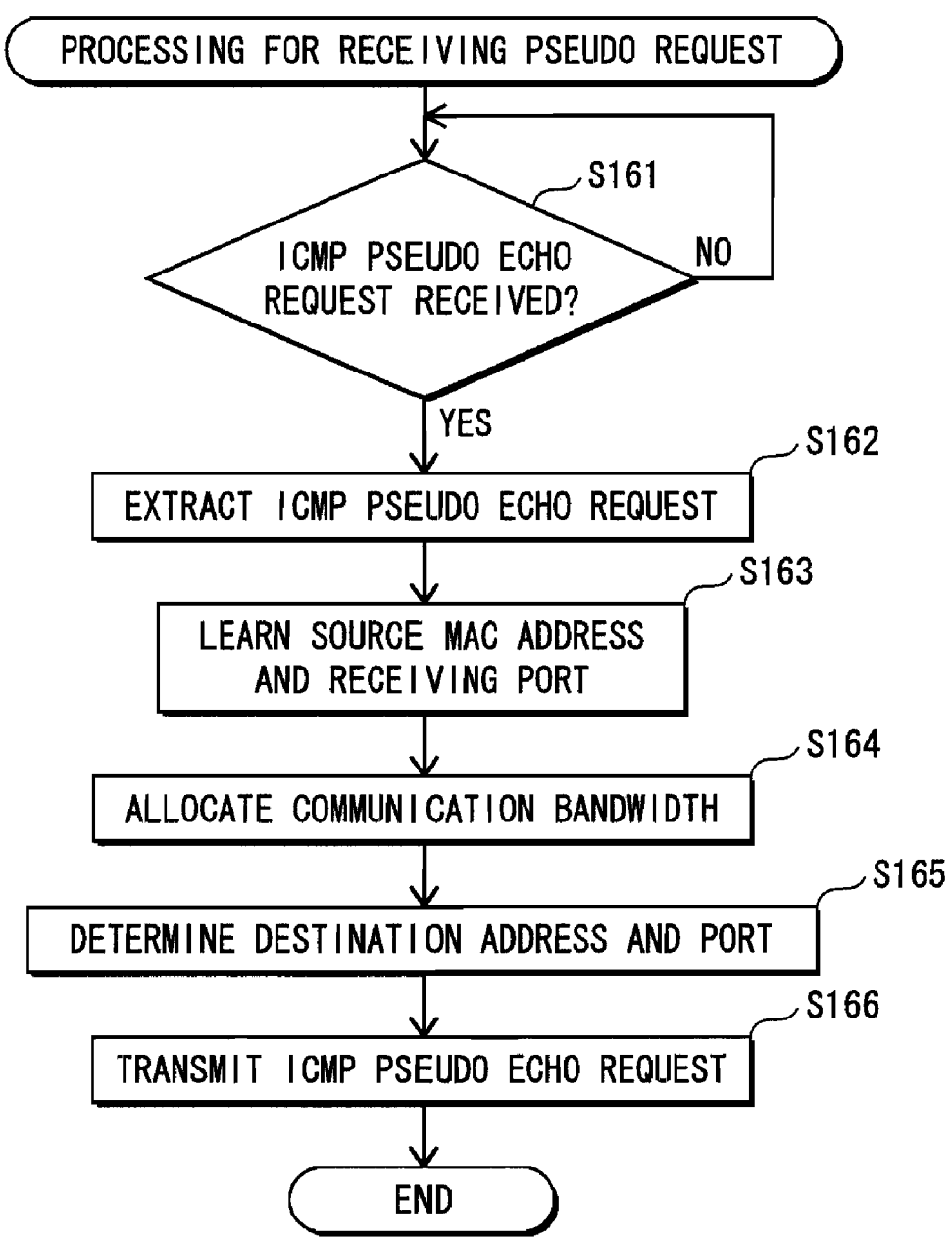
FIG. 29 is a flowchart showing processing when a pseudo request ICMP packet is received.

FIG. 29 is a flowchart showing processing when a pseudo request ICMP packet is received.

This process is approximately the same as the process performed by the bridge of the first embodiment shown in FIG. 14. Differences are that the bandwidth request ICMP packet is a pseudo request ICMP packet, and the same process is performed upon receipt from a blocking port.

The steps S1 to S6 in FIG. 14 correspond to steps S161 to S166 in FIG. 29.

<Relay Device: Process Performed upon Receiving Pseudo Response ICMP Packet>

Figure 30:
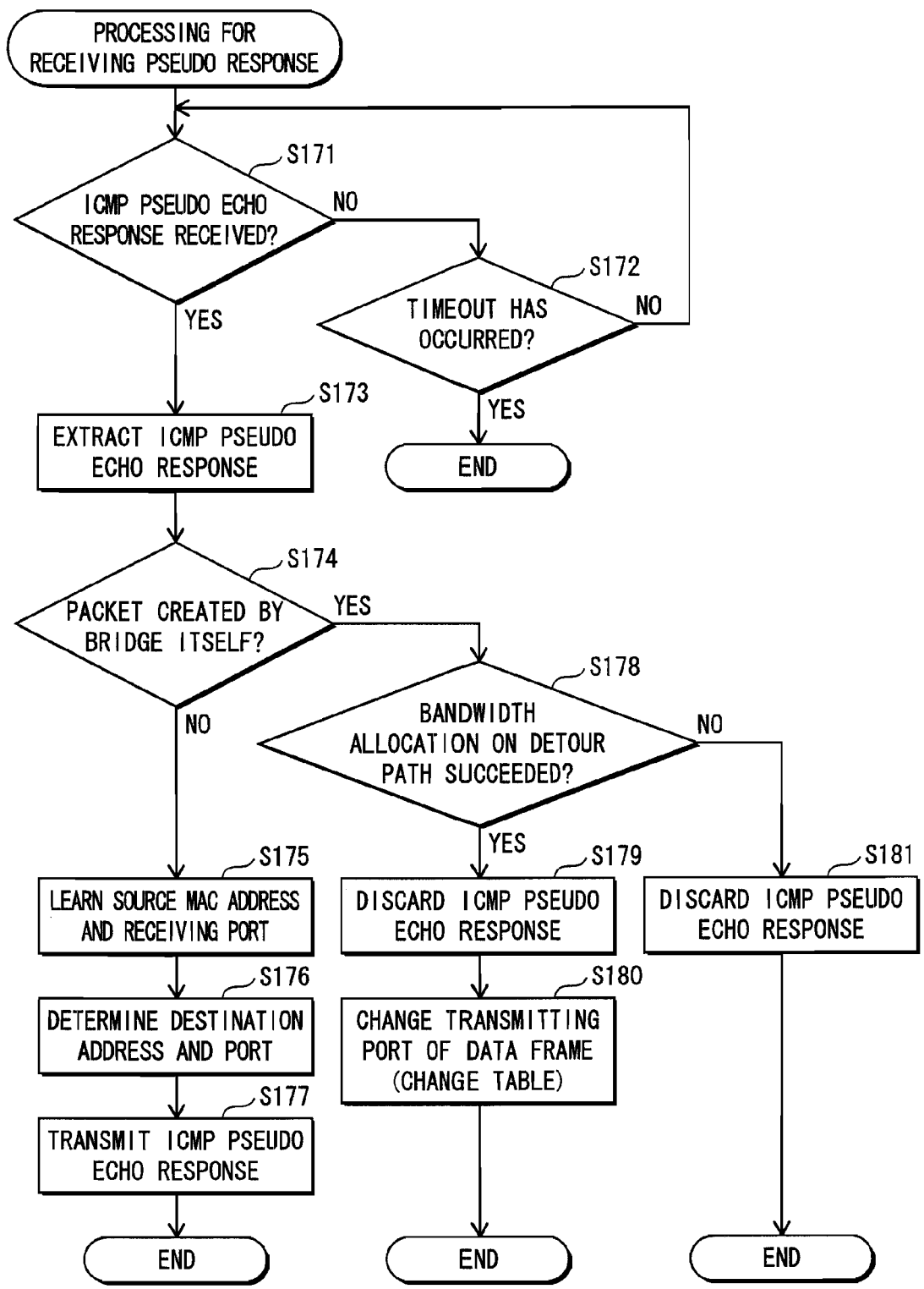
FIG. 30 is a flowchart showing processing when a response ICMP packet corresponding to a pseudo request ICMP packet is received.

FIG. 30 is a flowchart showing processing when a response ICMP packet corresponding to the pseudo request ICMP packet is received.

First, upon receiving the packet, the terminal 42 identifies it to be a pseudo request ICMP packet from the terminal 41, and prepares an ICMP echo response, as in the processing when a normal ICMP packet is received. In this process, an ICMP Payload of the pseudo request ICMP packet is copied onto the ICMP echo response. Accordingly, the ICMP echo response created by the terminal 42 naturally is a response ICMP packet corresponding to the pseudo request ICMP packet (hereinafter, referred to as "pseudo response ICMP packet".

The terminal 42 transmits the pseudo response ICMP packet to the bridge 33 (see a dotted arrow (62) in FIG. 24).

After transmitting the pseudo request ICMP packet, the bridge 33 (a) discards the request if a predetermined time has passed (step S172: YES), and (b) determines, if having received pseudo response ICMP packet (step S171, step S173), whether the received response ICMP packet corresponds to the pseudo request ICMP packet created by the bridge itself (step S174).

This judgment is performed by the pseudo bandwidth request deletion subunit 5220 with use of the pseudo packet identifier 7200 and pseudo packet creating bridge MAC address 7300 included in the pseudo response ICMP packet.

That is, when the pseudo packet creating bridge MAC address 7300 is identical to the relay device address 2510 and a value stored in the bandwidth request ID 2545 is identical to the pseudo packet identifier 7200, the pseudo request ICMP packet is determined to have been generated by the bridge itself.

If the bridge 33 determines that the pseudo response ICMP packet was not created by the bridge 33 itself (step S174: NO), the bridge 33 learns the source MAC address (step S175), refers to the connection information storage unit 2500 to obtain the source address and receiving port of the received pseudo response ICMP packet, assign these for the destination address and transmitting port, respectively (step S176), and stores them in the connection information storage unit 2500.

After that, the bridge 33 transmits the pseudo response ICMP packet to the next bridge 31 (step S177, a dotted arrow (63) in FIG. 24).

The bridge 31, upon receiving the pseudo response ICMP packet, determines whether the pseudo response ICMP packet was created by the bridge 31 itself, as in the step with the bridge 33 (step S174). If the pseudo response ICMP packet is judged to be created and transmitted by the bridge 31 itself (step S174: YES), the bridge 31 refers to the "QoS result" of the pseudo response ICMP packet (step S178, see FIG. 26).

If the "QoS result" indicates that the bandwidth allocation failed (step S178: NO), it is determined that a detour path up to the terminal 42 was searched but the bandwidth could not be allocated, and the pseudo bandwidth request deletion subunit 5220 discards the pseudo response ICMP packet (step S181).

If the "QoS result" indicates that the bandwidth allocation has succeeded (step S178: YES), it is determined that the detour path up to the terminal 42 was searched and the bandwidth has been successfully allocation.

In this case, the bridge 31 does not forward the pseudo request ICMP packet to the terminal 36, and the pseudo bandwidth request deletion subunit 5220 discards the pseudo response ICMP packet (step S179). This is in order to prevent the terminal 41 from receiving a pseudo response ICMP packet without transmitting a pseudo request ICMP packet.

As a result of the above processes, with use of the pseudo request ICMP packet created by the bridge 31, a detour path between the bridge 31 and terminal 42 can be searched and the bandwidth on the path can be successfully allocated.

Additionally, here, a consideration is given to a case where the bridge 31 creates a pseudo request ICMP packet and transmits it to the wireless port of the bridge 32. The bridge 32, upon receiving the pseudo request ICMP packet, looks for a destination to send the pseudo request ICMP packet to. The bridge 32, however, determines that it is only connected to the terminal 43 and has no connection to the Destination terminal 42, refraining from transmitting the pseudo request ICMP packet as a result. The bridge 31 detects a timeout if a pseudo response ICMP packet corresponding to the pseudo request ICMP packet does not arrive within a predetermined time (step S172). In this way, the bridge 31 can determine that there is no detour path to the terminal 42 from the bridge 32.

<Relay Device: Processing when Bandwidth-Guaranteed Data Frame is Received>

After a detour path is searched from the bridge 31 to the terminal 42 via the bridge 33 and a bandwidth allocation on the detour path is completed, the path used for data transmission is switched to the established detour path.

The bridge 31 starts transmitting the data frames, which have been transmitted to the port P4, to the port P3 leading to the detour path on which a new bandwidth allocation is made. In this process, the current destination port and destination MAC address are changed to the destination port and destination MAC address on the detour path based on the data category information in the connection information storage unit 2500.

Consequently, data frame transmissions can be switched to use the detour path by referring to the table henceforth.

The data frame transmissions switched to the detour path are routed as follows as shown in FIG. 25: terminal 41→bridge 31→bridge 32→terminal 42.

As a result, a detour path can be established without passing through the power line 51 the transmission environment of which has deteriorated, and the bandwidth-guaranteed QoS can be maintained.

<Relay Device: Releasing Old Path>

Here, a description will be given on releasing the communication bandwidth of the old path which was used before switching the path.

The bridge 31 transmits a bandwidth request ICMP packet for releasing the bandwidth (the QoS setting type, a QoS setting parameter, is set to releasing bandwidth) to the terminal, 42 via the old path. Each bridge releases the allocated bandwidth upon receiving a bandwidth request ICMP packet for releasing the bandwidth.

Or, after the path for the data frames is switched, each bridge on the old path can make a judgment that a data frame will not arrive within the Inactivity Interval value, automatically releasing the old path as a result of the judgment.

In accordance with the above-mentioned process, the communication bandwidth of the old path can be released.

That is to say, as described in the above, when the bridge 31 determines that the QoS of the power line 51 cannot be maintained, the bridge 31 creates a pseudo request ICMP packet, allocates a bandwidth on a path which enables a transmission to the terminal 42 with use of the pseudo request ICMP packet and switches the path. This allows the user to continue to use the QoS communication.

<Supplementary>

Up to now, the network system in accordance with the present invention has been described based on the embodiments. However, the network system can be modified partially, and naturally, the present invention is not limited to the above-mentioned embodiments.

(1) In the embodiments, a bandwidth setting request and bandwidth setting response of a-bandwidth-reservation type communication protocol are used as QoS information transmitted by a terminal device. However, the QoS information is not limited to these, and it can be a priority control based on a packet priority, or can be an admission control.

Also, the information transmitted by the terminal device can be detour path search information for searching another detour path, instead of limiting it to the QoS information.

Additionally, while QoS is defined as bandwidth guarantee, QoS is not limited this, and can be a priority control based on a packet priority, or can be an admission control.

(2) In the embodiments, a relay device adds detour destination information to a bandwidth setting request. However, the relay device can add the detour destination information to a bandwidth setting response instead. In accordance with this, a packet size of the bandwidth setting request can be downsized.

(3) In the embodiments, PLC and Ethernet (registered trademark) are stated as wired networks. However, there is no restriction here, and they can be other wired media such as IEEE1394 and USB. Also a wireless can be specifically named such as IEEE802.11, IEEE802.15, or IEEE802.16.

In addition, in the present embodiments, the network is configured to include relay devices and terminal devices with both a wired network and wireless network. However, the network can have only a wired network, or only a wireless network, alternately.

(4) In the present embodiments, a bridge is used as a relay device. However, the relay device is not limited to this, and can be a switching hub, a router or a gateway which can have the spanning tree protocol implemented therein and do not correspond to the IP layer.

(5) In the second embodiment, a construction of a detour path and a switch to the detour path are triggered as the QoS can no longer be maintained as a result of a deterioration of a transmission path status. There is no restriction on this, however, and the construction of the detour path and the switch to the detour path can be performed in accordance with a path switching request from another relay device or terminal device.

Additionally, in the second embodiment, a deterioration of a transmission path status of the power line is stated as a reason for not being able to maintain the QoS any longer. There is no restriction to this, however, and unsustainability of the QoS can be attributed to a deterioration of the transmission path status of another medium such as a wireless or a coaxial cable.

(6) As an application of the second embodiment, the following method can be used as well. That is, when a bridge which determined that QoS could no longer be maintained due to an environmental deterioration of the transmission path (hereinafter, referred to as "bridge A"); does not have a different transmitting port for a detour, (a) the bridge A requests a bridge to which the data-frame receiving port of the bridge A is connected (hereinafter, referred to as "bridge B") to search a detour path, and (b) the bridge B establishes a detour path by using a pseudo request ICMP packet if the bridge B has another transmitting port for a detour. In this way, the bridge B can perform the path switching.

Further, as another application of the second embodiment, when the path that is currently transmitting data frames and the detour path partially overlap with each other, a structure can be implemented to determine the overlapping and avoid an overlapping allocation when allocating a bandwidth to establish a detour path.

(7) While there is only one detour path in the embodiments, there can be more than one.

(8) In the embodiments, ICMP is used as a bandwidth-reservation type communication protocol. However, it is not limited to this, and can use a different bandwidth-reservation type communication protocol or a communication protocol for QoS.

(9) The structures of the embodiments may typically be realized as an LSI, which is an integrated circuit. These structures may be separately accumulated as an individual chip. Or, part or all of these structures may be included on one chip. Here, the LSI may be an IC, a system LSI, a super LSI, or ultra LSI, depending on the degree of integration. Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI. If a semiconductor technology or related technologies give birth to a new circuit-integrating technology that would replace the LSI, such technologies may be used for integrating the functional blocks. One such possibility is an application of biotechnology.

(10) The structures of the embodiments can be realized with a program recording medium for executing an entirety or portion of its functions.

It is also possible to circulate/distribute a program for CPU to execute each control process for realizing each function (see FIG. 14 and the like) by recording the program on a recording medium or using various communication channels. The recording media can be an IC card, an optical disc, a flexible disc, a ROM, a flash memory or the like. The circulated/distributed program is made available for use by being stored in a memory or the like that can be read by the CPU of an apparatus, and each function of the terminal devices and relay devices described in the embodiments is realized by execution of the program by the CPU.

<First Prior Art>

The first prior art which was briefly explained above is describe below with use of FIGS. 32 to 34.

Figure 32:
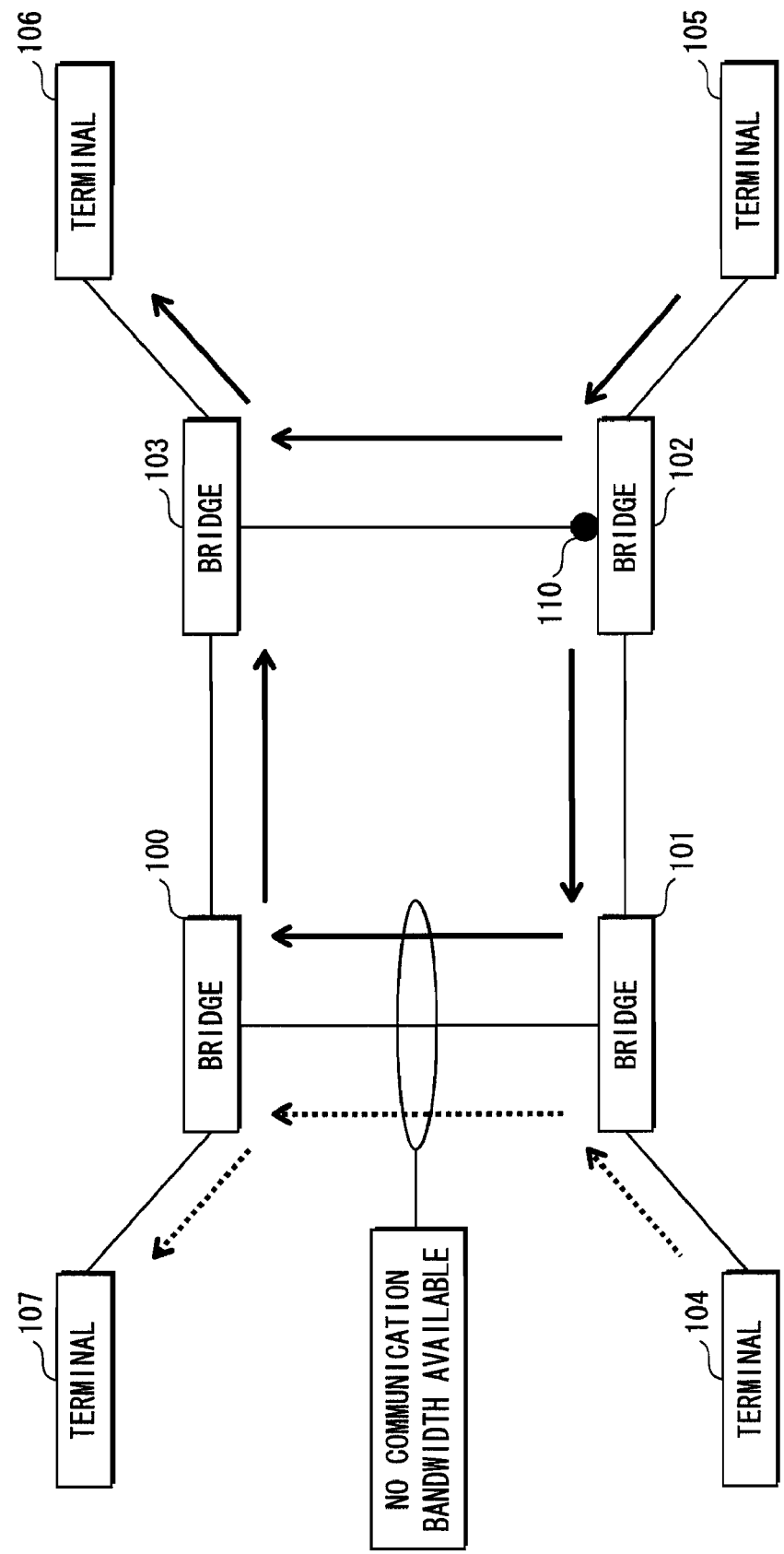
FIG. 32 shows a network including four bridges and four terminals.

FIG. 32 shows a network including four bridges and four terminals. Here, it is assumed that a bridge 100 is a root bridge. Also, a port 110 of a bridge 102 is a blocking port preventing loops on the path by logically blocking the port.

Here, when a terminal 105 transmits data to a terminal 106, there is only one transmission path as indicated by FIG. 12: 105-102-101-100-103-106 (solid arrows in FIG. 32).

However, assuming that it is a bandwidth-guaranteed communication, bandwidth resources on transmission paths connecting bridges are shared by all terminals, and thus this path (105-102-101-100-103-106) cannot always guarantee a communication bandwidth.

For instance, assuming that the maximum communication bandwidth between the bridges 100 and 101 is 10 Mbps, and the terminals 104 and 107 are conducting a data transmission for which a bandwidth of 10 Mbps is guaranteed, using the path 104-101-100-107 (dotted arrows in FIG. 32). In other words, currently, there is no bandwidth available for use between the bridges 100 and 101. Here, if the terminal 105 desires to conduct a bandwidth-guaranteed data transmission of 10 Mbps to the terminal 106, the only path 105-102-101-100-103-106 cannot be used for the above-mentioned bandwidth-guaranteed data transmission, as there is no communication bandwidth available between the bridges 100 and 101.

Figure 33:
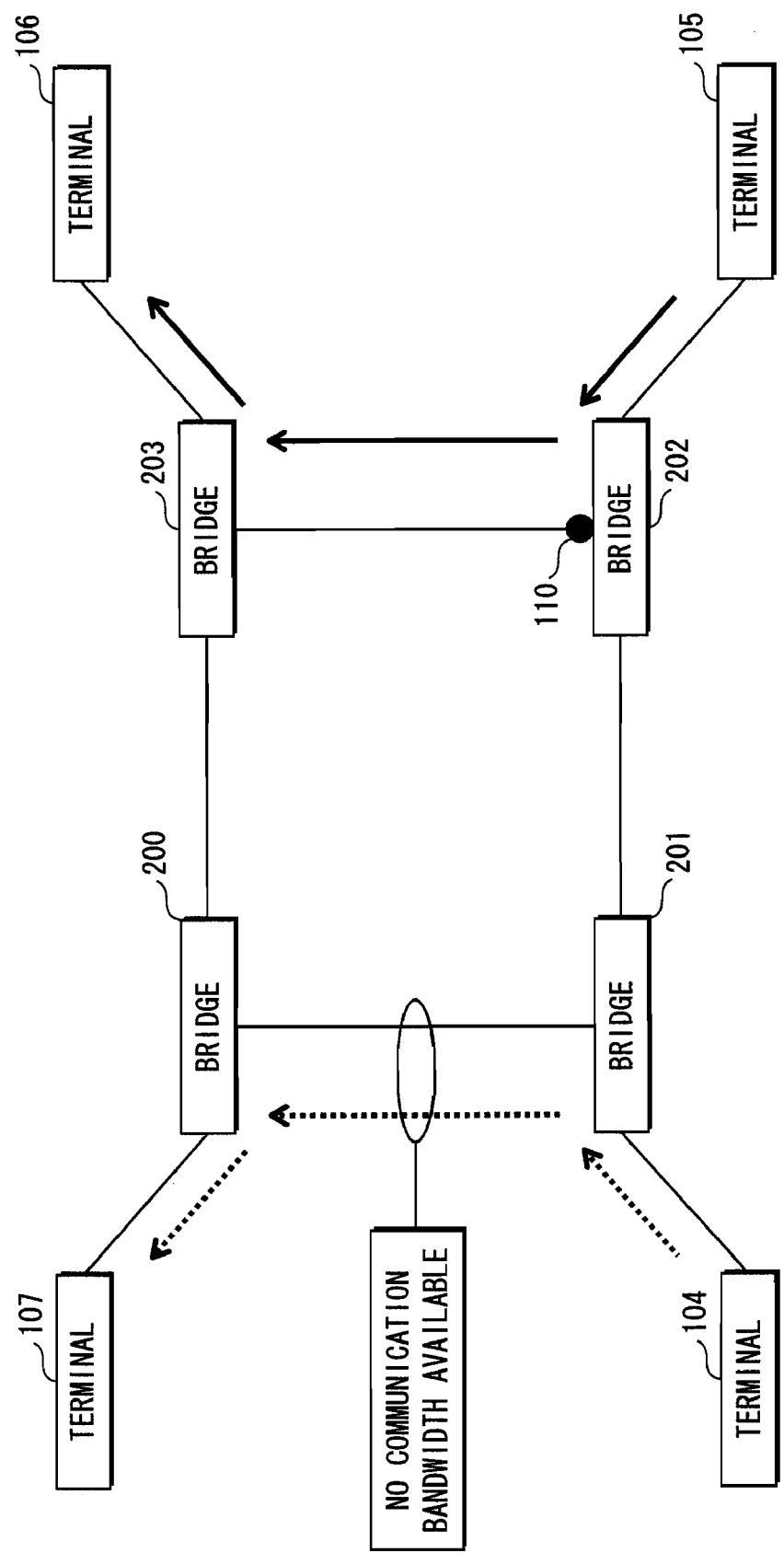
FIG. 33 shows a bypass path construction method disclosed in Patent Document 1.

One method to solve this problem is a bypass path construction method (for an example, see Patent Document 1). FIG. 33 shows the bypass path construction method disclosed in Patent Document 1. Here, a bridge 200 is a root bridge, and a port 110 of a bridge 202 is a blocking port.

According to the bypass path construction method, the bridge 202 requests for and acquires routing information retained by a bridge 203 to which the blocking port 110 is connected. The bridge 202 constructs a bypass path using the blocking port by overwriting a routing table based on the acquired routing information (solid arrows in FIG. 33).

As a result, when the terminal 105 transmits bandwidth-guaranteed data to the terminal 106, the path 105-202-203-106 is used for the transmission, providing a solution for the problem which occurs when there is no communication bandwidth available between the bridges 200 and 201.

However, while, in accordance with the method of patent Document 1, the bridge with the blocking port and the bridge to which the port is connected can construct a detour path by exchanging routing information, a detour path which branches using a bridge other than the above-mentioned bridges cannot be constructed, which limits the detour path construction method.

For example, in FIG. 34A, the bridge 200 is a root bridge, the port 110 is a blocking port, and the terminal 106 is conducting a data transmission using the only path to the terminal 105 (106-203-200-201-202-105) (dotted arrows in FIG. 34A). Here, it is assumed that there is no communication bandwidth available for the transmission path between the bridges 201 and 202. In this case, the method of Patent Document 1 can construct a path 106-203-202-105 (dotted arrows in FIG. 34) which does not go through the transmission path between the bridges 200 and 201.

On the other hand, in FIG. 34B, the bridge 200 is a root bridge, the port 110 is a blocking port, and the terminal 107 is conducting a data transmission using the only path to the terminal 105 (107-200-201-202-105) (solid arrows in FIG. 34B). Here, it is assumed that there is no communication bandwidth available for the transmission path between the bridges 200 and 201. In this case, the method of Patent Document 1 only constructs a detour path between the bridge 202 having the blocking port and the bridge 203 to which the blocking port is connected. That is, it cannot construct a path 107-200-203-202-105 (dotted arrows in FIG. 34B) which does not go through the bridges 200 and 201, since the method does not enable the bridge 200 to construct a detour path to the bridge 203.

In other words, the method of Patent Document 1 cannot construct a detour path which branches from a bridge other than the bridge having the blocking port and the bridge to which the blocking port is connected, presenting a problem of limiting the detour path construction method.

<Second Prior Art>

The second prior art which was briefly explained above is describe below with use of FIGS. 35 and 36.

FIG. 35 shows a home network including five bridges and five terminals.

A power line 111 (or electrical lamp line) is a wired media used in PLC (Power Line Communication); a wireless 112 is a wireless link compliant with IEEE802.11 and the like; and Ethernet (registered trademark) 113 is a wired medium of IEEE 802.3 standard.

A PLC-wireless AP (Access Point)-wired bridge 101 and a PLC-wireless STA (STATION)-wired bridge 102 interconnects the power line 111, wireless 112 and Ethernet (registered trademark). A wireless STA bridge 103 interconnects the wireless 112 and Ethernet (registered trademark) 113. A PLC bridge 104 interconnects the power line 111 and Ethernet (registered trademark) 113. Terminals 105 to 109 are IP (Internet Protocol)-compatible terminals equipped with a connecting terminal for Ethernet (registered trademark). The spanning tree protocol is implemented in all bridges, where the network topology is logically tree-structured with a blocking port 120.

FIG. 35 shows that the terminal 106, a device such as a TV or PC operated by a user for a viewing, is streaming video contents data from the terminal 105, a video contents server. The transmission path of the video contents is as follows: 105→131→101→132→102→133→106. Also, here, by using a bandwidth-reservation type communication protocol such as RSVP (Resource reservation Protocol), the communication path between the terminals 105 and 106 is bandwidth-guaranteed (QoS: Quality Of Service).

Here, it is assumed that a transmission environment of the power line 111 deteriorates due to an incorporation of noise from a household electric product using an AC power source, causing a packet error to occur frequently on a transmission path 132. As a result, the video is distorted due to increased packet errors of the video contents in spite of the fact that a communication bandwidth of the transmission path 132 is allocated for the bandwidth (QoS)-guaranteed transmission.

In this case, another communication path cannot be used since there is only one communication path from the terminal 105 to the terminal 106 in accordance with the spanning tree protocol. As a result, the transmission needs to be maintained regardless of this high packet error rate, which hinders the realization of a high-quality transmission.

One method to solve this problem is to set up a network resource management device and allocates a communication bandwidth on a path to which the transmission path may be switched in the future (for an example, see Patent Document 2).

Figure 36:
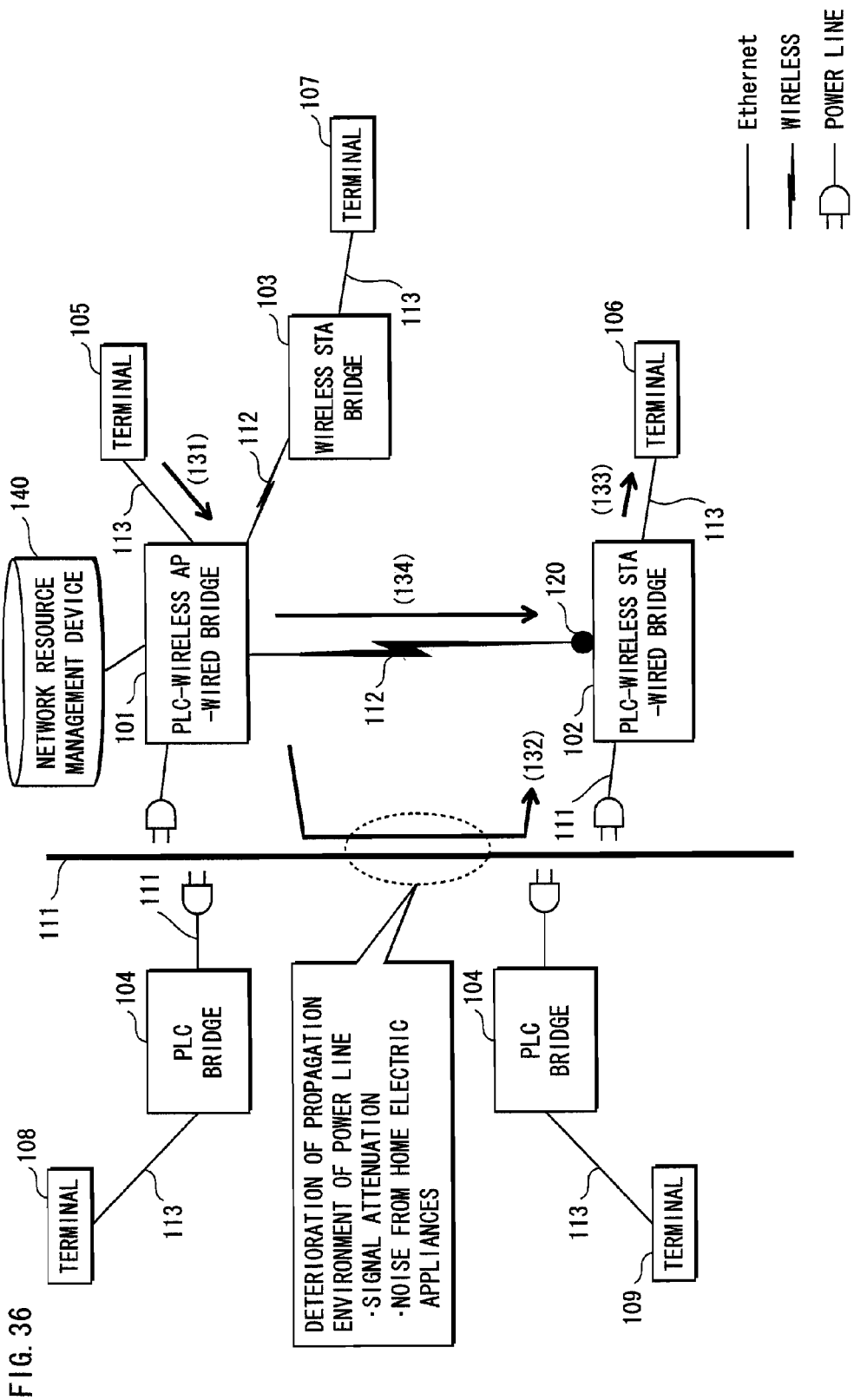
FIG. 36 shows a structure of a home network using a method disclosed in Patent Document 2.

FIG. 36 shows a structure of a home network using the method disclosed in Patent Document 2.

First, a network resource management device is set up in the network and recognizes such as connecting information and possible transmission capacity of each bridge. Also, the network resource management device 140 allocates a communication bandwidth of the transmission path 134 by allocating (reserving) the communication bandwidth in advance for a communication path to which a transmission path may be switched to in the future. In this way, when a packet error occurs frequently due to a deterioration of the transmission environment of the power line 111 on the transmission path 132 caused by an incorporation of noise from a household electric product using an AC power source, the transmission path 134 can be used as a new communication path, enabling a continuation of the high-quality QoS transmission.

However, since the method of Patent Document 2 allocates, in advance, a transmission capacity of a communication path to which a transmission path may be switched, the allocated transmission capacity is wasted when not used. Especially, a wireless transmission or PLC transmission is smaller in transmission capacity compared to Ethernet (registered trademark), thus, reducing the available transmission capacity by allocating its bandwidth in advance lacks efficiency as it may affect a new transmission path.

INDUSTRIAL APPLICABILITY

The relay device of the present invention can be applied to a bridge that interconnects a PLC, wireless, Ethernet (registered trademark)(IEEE802.3 standard), IEEE1394, USB and the like included in a customer premise network. Also, the terminal device of the present invention can be applied to various network-compatible AV devices and network-compatible home electric appliances such as a TV, a PC, a DVD/HDD player, a camera and the like. Structuring a customer premise network using the relay device and terminal device of the present invention is advantageous in realizing a bandwidth-guarantee type communication of the customer premise network.

The relay device and terminal device of the present invention can also be applied to a public network, temporary network and the like.

The invention claimed is:

1. A relay device with a blocking port that is logically blocked, which is one of a plurality of relay devices each including a plurality of ports and having a spanning tree protocol applied therein, the relay device comprising:
    request passing means for judging whether a received data frame is request data transmitted from a terminal device requesting a predetermined bandwidth prior to transmitting a data frame requiring the predetermined bandwidth and specifying a detour path that uses the blocking port, and when judged affirmatively, passing the request data through the blocking port without discarding the request data;
    identification information storage means for acquiring identification information from the request data and storing therein the acquired identification information while the request passing means is passing the request data through the blocking port, the identification information being used for identifying specific data; and
    specific data passing means for allowing data identified as the specific data by the identification information to pass through the blocking port by unblocking the blocking port.

2. The relay device of claim 1, wherein the request data is an ICMP packet.

3. A network system comprising a plurality of relay devices and a plurality of terminal devices, in which a spanning tree protocol is applied, wherein
    a first terminal device includes:
    bandwidth request means for, before the first terminal device transmits a data frame requiring a predetermined bandwidth to a second terminal device, sending first request data through one or more of the plurality of relay devices linked between the first and the second terminal devices to allocate the predetermined bandwidth;
    relay device information storage means for storing relay device information related to the one or more of the plurality of relay devices;
    detour path determination means for, when the predetermined bandwidth cannot be allocated based on the first request data, transmitting second request data specifying a detour path that uses at least one blocking port, based on the relay device information, the second request data including identification information for setting to a relay device having the at least one blocking port, data to be transmitted through the at least one blocking port as specific data; and data transmission means for transmitting the data frame requiring the predetermined bandwidth, each of the relay devices includes a plurality of ports, and at least one of the ports of the plurality of relay devices is the at least one blocking port which is logically blocked;

the relay device having the at least one blocking port includes:

request passing means for judging whether a received data frame is the second request data or not, and when judged affirmatively, passing the second request data through the at least one blocking port without discarding the second request data;

identification information storage means for acquiring identification information from the second request data and storing therein the acquired identification information while the request passing means is passing the second request data through the at least one blocking port, the identification information being used for identifying the specific data; and specific data passing means for allowing a data frame identified as the specific data by the identification information to pass through the at least one blocking port by unblocking the at least one blocking port.

4. The network system of claim 3, wherein the first request data transmitted by the bandwidth request means of the first terminal device to the second terminal device includes bandwidth request data including information on request bandwidth which indicates the predetermined bandwidth, the relay device information storage means extracts the relay device information from bandwidth request data returned from the second terminal device and stores therein the relay device information, the relay device information being related to whether each port of each relay device is in use or not, the each of the relay devices further includes bandwidth allocating means for (i) receiving the bandwidth request data, (ii) attempting to set the request bandwidth to a specified one of the ports thereof, and (iii) outputting the received bandwidth request data after adding thereto a result information piece indicating whether the attempt was successful or not and information on the ports of the relay device itself other than the specified port, and the second terminal device includes bandwidth response means for outputting the bandwidth request data received thereby to the first terminal device.

5. The network system of claim 4, wherein the data transmission means determines that the predetermined bandwidth could not be allocated when at least one of result information pieces indicates negative.

6. A terminal device included in a network system which has a plurality of relay devices and a plurality of terminal devices and has a spanning tree protocol applied therein, the terminal device comprising:

bandwidth request means for, before the terminal device transmits data requiring a predetermined bandwidth to another terminal device, transmitting first request data through one or more of the plurality of relay devices linked between the terminal device and the another terminal device to allocate the predetermined bandwidth;

relay device information storage means for storing relay device information related to the one or more of the plurality of relay devices;

detour path determination means for, when the predetermined bandwidth cannot be allocated based on the first request data, transmitting second request data specifying a detour path that uses at least one blocking port, based on the relay device information; and data transmission means for transmitting the data requiring the predetermined bandwidth, wherein a relay device having the at least one blocking port is set in advance to pass the second request data through the at least one blocking port, and the second request data includes identification information for setting, to the relay device, data to be transmitted through the at least one blocking port as specific data.

7. A passing method used by a relay device with a blocking port that is logically blocked, the relay device being one of a plurality of relay devices each including a plurality of ports and having a spanning tree protocol applied therein, the passing method comprising:

a request passing step of judging whether a received data frame is request data transmitted from a terminal device requesting a predetermined bandwidth prior to transmitting a data frame requiring the predetermined bandwidth and specifying a detour path that uses the blocking port, and when judged affirmatively, passing the request data through the blocking port without discarding the request data;

an identification information storing step of acquiring identification information from the request data and storing the acquired identification information in a memory while the request passing means is passing the request data through the blocking port, the identification information being used for identifying specific data; and a specific data passing step of allowing data identified as the specific data by the identification information to pass through the blocking port by unblocking the blocking port.

8. A non-transitory computer-readable recording medium on which a computer program is recorded, the computer program causing a relay device with a blocking port that is logically blocked to execute passing processing, the relay device being one of a plurality of relay devices each including a plurality of ports and having a spanning tree protocol applied therein, the passing processing including:

a request passing step of judging whether a received data frame is request data transmitted from a terminal device requesting a predetermined bandwidth prior to transmitting a data frame requiring the predetermined bandwidth and specifying a detour path that uses the blocking port, and when judged affirmatively, passing the request data through the blocking port without discarding the request data;

an identification information storing step of acquiring identification information from the request data and storing the acquired identification information in a memory while the request passing step is passing the request data through the blocking port, the identification information being used for identifying specific data; and a specific data passing step of allowing data identified as the specific data by the identification information to pass through the blocking port by unblocking the blocking port.

9. An integrated circuit used in a relay device with a blocking port that is logically blocked, the relay device being one of a plurality of relay devices each including a plurality of ports and having a spanning tree protocol applied therein, the integrated circuit comprising:

request passing means for judging whether a received data frame, transmitted from a terminal device requesting a predetermined bandwidth prior to transmitting a data frame requiring the predetermined bandwidth, is request data specifying a detour path that uses the blocking port, and when judged affirmatively, pass the request data through the blocking port without discarding the request data;

identification information storage means for acquiring identification information from the request data and storing therein the acquired identification information while the request passing means is passing the request data through the blocking port, the identification information being used for identifying specific data; and specific data passing means for allowing data identified as the specific data by the identification information to pass through the blocking port by unblocking the blocking port.

\* \* \* \* \*